(12) United States Patent
Myers

(10) Patent No.: US 6,836,879 B1
(45) Date of Patent: Dec. 28, 2004

(54) OBJECT ORIENTED OPERATING SYSTEM

(75) Inventor: Nicholas Simon Myers, London (GB)

(73) Assignee: Symbian Limited, London (GB)

( * ) Notice: Subject to any disclaimer, the term of this patent is extended or adjusted under 35 U.S.C. 154(b) by 0 days.

(21) Appl. No.: 09/242,383

(22) PCT Filed: Jun. 12, 1998

(86) PCT No.: PCT/GB98/01717

§ 371 (c)(1),
(2), (4) Date: Feb. 12, 1999

(87) PCT Pub. No.: WO98/57258

PCT Pub. Date: Dec. 17, 1998

(30) Foreign Application Priority Data

Jun. 13, 1997 (GB) ............................................. 9712455

(51) Int. Cl.[7] ............................................... G06F 9/44
(52) U.S. Cl. ...................... 717/116; 717/107; 717/108; 717/165
(58) Field of Search ................. 717/106–119, 162–165, 717/104

(56) References Cited

U.S. PATENT DOCUMENTS 5,787,431 A * 7/1998 Shaughnessy ............... 707/100

OTHER PUBLICATIONS

Henricson et al., "Programming in C++ Rules and Recommendations", Ellemtel Telecommunication Systems, http://intra.engr.uark.edu/~baker/Ellemtel–rules.pdf , pp. 1–88, 1992.*

Cowlishaw, "The REXX Language A practical Approach to Programming", Prentice Hall P T R, pp.: 1–23, 139–150, 1990.*

Michel, "Getting Started with Object REXX", IBM Germany German Software Development, http://citeseer.nj.nec.com/361441.html, pp.: 1–21, Aug. 1996.*

* cited by examiner

Primary Examiner—Wei Y. Zhen
Assistant Examiner—Ted T. Vo
(74) Attorney, Agent, or Firm—Knobbe Martens Olson & Bear LLP

(57) ABSTRACT

An object oriented operating system handles all objects related to text strings as belonging to one of three classes, in which each class performs a different function and at least one such class is modified to do so in a way that reduces code and cycle overhead. This reduces executable code overhead to minimise the amount of memory required, and allows execution in a minimum number of cycles to minimise power consumption. The operating system is particularly well suited to ROM based mobile computing devices.

32 Claims, 6 Drawing Sheets

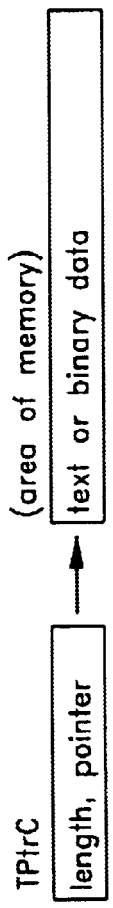
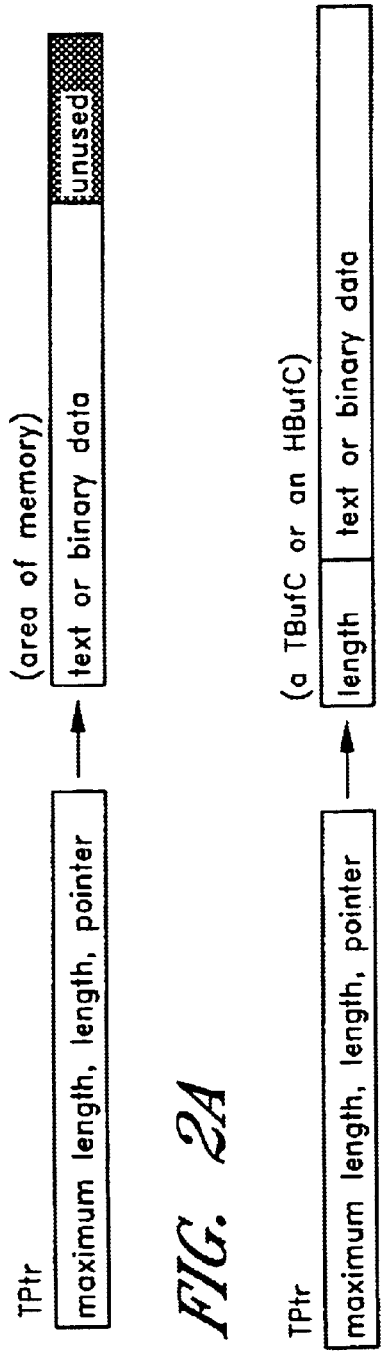
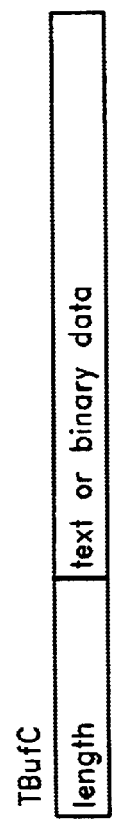
FIG. 1
FIG. 2A
FIG. 2B
FIG. 3

HBufC descriptor created on the heap.

OBJECT ORIENTED OPERATING SYSTEM

BACKGROUND

1. Field of the Invention

This invention relates to an improved object oriented operating system for a computer. In particular, it relates to an operating system which is based on C++ programming techniques. The commercially available embodiment of this operating system is the EPOC32 operating system produced by Psion Software Plc of England. EPOC32 is a preferred operating system in the mobile computing environment.

2. Description of the Related Art

The C++ programming language is widely used for writing application programs for computers, such as Personal Computers, although it has only rarely been widely adopted for writing operating systems. When writing for Personal Computers, there is generally no overriding requirement to either minimise the size of the executable code or to minimise the number of cycles required for executing steps within the program. Typically, performance and ease of authorship are the more significant requirements.

But there are other contexts in which the executable code must occupy the minimum amount of space (e.g. to minimise the amount of ROM and/or RAM required to store it), and to execute in the minimum number of cycles (e.g. to minimise power consumption).

The mobile computing (e.g. personal digital assistants), smart phone (e.g. GSM cellular telephones with in-built word processing, facsimile send/receive and Internet browsing capabilities) and network computer ("NC") environments exemplify contexts in which there are advantages to minimising the code size of the operating system: namely, the hardware costs (particularly ROM and/or RAM) can then be reduced. That is particularly significant in the above contexts since widespread consumer adoption is generally dependent on relatively low hardware pricing. Similarly, minimising processor execution cycles of the operating system is very important in the mobile computing and smart phone contexts, since doing so minimises power consumption and minimising power consumption is critical to long battery life. A fully architected operating system written in C++ would generally be substantial in size and be power hungry. Hence, it would it be unsuitable for the mobile computing, smart phone and NC environments.

Further, it is generally regarded as difficult to design a fully functional operating system in C++ that meets stringent requirements for code size and cycle overhead, particularly the stringent requirements associated with the mobile, smart phone and NC computing environments.

Some Terminology

"Objects of the String Class"

In C++, text (e.g. strings of letters that will actually appear on a computer screen) is represented as an "Object". The implementer skilled in C++ or other object oriented languages will be familiar with this categorisation. Such text related Objects are of a particular type, which we shall call "Objects of the String Class": The kind of Class that an Object belongs to (e.g. in the case of text, the String Class) defines the allowable manipulations that can be performed on that Object. Only certain manipulations can be performed on Objects of the String Class (e.g. concatenating 2 text strings together). A particular Object of the String Class therefore represents a particular text string. It can only be manipulated in certain, well defined ways.

The following steps are performed in conventional C++ programming in order to create an Object of the String Class from an item of text, where the text resides in a file in the filing system:

set aside a buffer location in memory
read the text into the buffer using a file reading service
use a string creation service to turn the buffered data into an Object of the String Class
discard the buffer contents The actual storage location of the text string is difficult to identify in C++, but one does not need to know its location since it is the Object of the String Class that one manipulates directly: that in turn causes the actual text string to be manipulated. Hence the Object of the String Class in effect knows the memory location of the text string and can handle all the necessary memory management tasks associated with text manipulation.

Multiple Classes of Objects of the String Class

In the version of C++ known as the draft ANSL/ISO C++ Standard, all Objects of the String Class (as exemplified by the string class in that part of the draft C++ Standard Library of the above Standard referred to as <string>) are handled in a manner that enables sophisticated memory management tasks to be accomplished (e.g. re-allocating buffer space for text that can grow or shrink or be spliced—fully dynamic text). But this level of memory management uses a great deal of code and may require considerable heap space.

Two examples of conventional C++ memory management illustrate this:

Example 1: C++ Handling of Literal Text

In C++, there are many instances in which source code contains text strings. These strings are known as 'Literal Text' and are permanently stored in buffer memory on compilation of the source code into executable object code. When Literal Text is to be manipulated, then an Object of the String Class must be created from it. However, creation of that Object of the String Class itself leads to the creation in memory of the text string which the newly created Object of the String Class in fact manipulates. Hence, the text string is duplicated in memory: once in the original buffer that arises on compilation of the source code and again in the memory location associated with the Object of the String Class that enables the text to be manipulated.

As noted above, in some computing environments, code space and power consumption are at a premium. However, in conventional C++ (i.e. as implemented in the draft ANSI/ISO C++ Standard), there is no mechanism to overcome the inherent duplication in memory of Literal Text. That is problematic, especially for an operating system since, in an operating system, there are many occasions in which Literal Text must be handled.

Example 2: C++ Handling of Length Limited Text

In C++, a programmer handles text using heap memory. Text whose length is limited does not in fact require the fully flexible approach that is needed to handle text whose length is not limited. However, in conventional C++, there is no mechanism for using anything other than fully flexible, fully featured Objects of the String Class, irrespective of the length of text. That leads to a high overhead in memory management code since handling heap memory is code and cycle intensive.

Overall, text memory management in C++ is code and cycle intensive. Since code space and power consumption are at a premium in mobile environments, the conventional C++approach would lead to an operating system that is unacceptably large in terms of code size and is also too power hungry.

SUMMARY

The operating system of the present invention re-defines Objects of the String Class (i.e. as defined in the draft ANSI/ISO C++ Standard), by substituting them with a three fold structure of Objects of the String Class, namely three new Classes of Objects. The conventional, fully featured memory management functionality associated with <string> from the draft ANSI/ISO C++ Standard is not applied to all three of the new classes. Whilst that full functionality is useful in many environments, it is problematic in (inter alia) mobile computing environments in which code space and power consumption are at a premium.

Hence, the generalisation of the inventive concept of the present invention is to minimise code size and cycle overhead by providing, in a computer operating system, a family of three different Classes for handling text strings: each different class is appropriate for a different circumstance. This allows flexibility: for example, the fully featured memory management functionality can now be applied solely to those text strings that actually require it.

We shall refer to this new family of String Class Objects as "Descriptors". In a preferred embodiment, we call the members of this family "Pointer Descriptors", "Buffer Descriptors" and "Heap Descriptors". Care should be taken to note that these concepts are different (although related to) the established concepts of "pointers", "buffers" and "heaps", with which the skilled implementer will be familiar. Care should also be taken to note that the Descriptors envisaged in this specification have no relationship to the VMS facility of the same name, nor the UNIX term for small integer numbers used to identify active operating system files. The skilled implementer may appreciate that it is possible to design an operating system in which the number of Classes for handling text strings exceeds three: such variants are within the scope of the present invention. The three fold structure is the minimum (and in almost all cases, the most effective) proliferation of Classes.

Further, Descriptors are preferably polymorphic: hence, a single service can operate on all Descriptors. That leads to significant savings in code and, to a lesser extent, cycle overhead, since otherwise modified services would be needed for each of different Descriptors.

Hence, in accordance with a first aspect of the present invention, there is provided a computer programmed with an object oriented operating system, in which the operating system is adapted to handle objects related to text strings;

characterised in that the operating system handles all such objects as belonging to one of three classes (namely the Pointer Descriptor Class, the Buffer Descriptor Class and the Heap Descriptor Class), in which each class performs a different function and at least one such class is modified to do so in a way that reduces code and cycle overhead.

The invention is founded upon the insight that in order to deliver significant reductions in code and cycle overhead, one has to redesign the operating system by substituting the conventional, single form of Object of the String Class (for example) with three different forms of that Object: each form is optimised for different circumstances.

In a preferred form of the invention, conventional, memory intensive text handling techniques are applied only to Objects which fall within the new Descriptor Class which defines Objects requiring such techniques (i.e. Heap Descriptors). The Pointer and Buffer Descriptor Classes are however designed in a manner that reduces code and processor cycles compared to conventional String Classes.

Using the two examples mentioned in the Description of the Prior Art above (i.e. Example 1: C++ Handling of literal text and Example 2: C++ Handling of length limited text), the operating system of the present invention (i) handles Literal Text in a manner that eliminates the need for a duplicate copy of Literal Text and (ii) handles text which is determined dynamically at run time in a manner that only requires code intensive utilisation of heap memory in those limited circumstances in which it is actually necessary to do so: in other circumstances (for example, where the programmer knows in advance the maximum length of the text), then static memory is used instead. Fuller details of the specific handling is given below (see section titled Detailed Description).

Preferably, the operating system is adapted to handle not only text but also raw data using the same three fold structure.

In addition to the combined computer/operating system as defined above, one can identify further inventive aspects. For example, any device that has to interface with such an operating system must also use the same three-fold structure for Objects of the String Class. For example, driver software for peripherals such as solid state memory devices will have to use this three fold-structure. Likewise, control panel software for peripherals will also have to.

Hence, in a second aspect of the present invention, there is provided a peripheral device for a computer programmed with an object oriented operating system, in which the operating system is adapted to handle objects related to text strings;

characterised in that the operating system handles all such objects as belonging to one of three classes (namely the Pointer Descriptor Class, the Buffer Descriptor Class and the Heap Descriptor Class), in which each class performs a different function and at least one such class is modified to do so in a way that reduces code and cycle overhead and is further characterised in that the peripheral device is programmed to handle objects which also fall into the above three classes.

In a third aspect of the present invention, there is provided an operating system encoded on computer readable media, in which the operating system handles objects related to text strings;

characterised in that the operating system is adapted to handle all such objects as belonging to one of three classes (namely the Pointer Descriptor Class, the Buffer Descriptor Class and the Heap Descriptor Class), in which each class performs a different function and at least one such class is modified to do so in a way that reduces code and cycle overhead.

In a fourth aspect of the invention, there is provided a method of operating a micro-processor using an operating system, in which the operating system is adapted to handle objects related to text strings;

characterised in that the operating system handles all such objects as belonging to one of three classes (namely the Pointer Descriptor Class, the Buffer Descriptor Class and the Heap Descriptor Class), in which each class performs a different function and at least one such class is modified to do so in a way that reduces code and cycle overhead.

In a fifth aspect, there is provided computer readable media encoded with an operating system adapted to handle objects related to text strings;

characterised in that the operating system handles all such objects as belonging to one of three classes, in which each class performs a different function and at least one such class is modified to do so in a way that reduces code and cycle overhead. Typically, the computer readable media will be a masked ROM. For distribution purposes, the media may also be a conventional CD-ROM or floppy disc.

BRIEF DESCRIPTION OF THE DRAWINGS

FIG. 1 is an illustration of a constant pointer descriptor;

FIG. 2A is an illustration of a modifiable pointer descriptor pointing to an area in at memory;

FIG. 2B is an illustration of a modifiable pointer descriptor pointing to another descriptor;

FIG. 3 is an illustration of a constant buffer descriptor;

DETAILED DESCRIPTION

Figure 4:
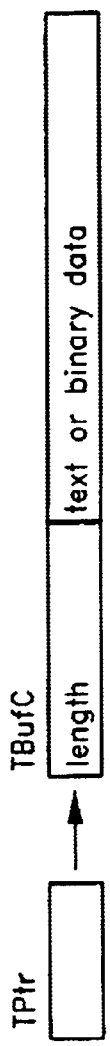
FIG. 4 is an illustration of a modifiable pointer descriptor pointing to a constant buffer descriptor.

The present invention will be described in relation to an embodiment known as EPOC32. EPOC32 is a 32 bit operating system developed by Psion Software plc of England for use in (inter alia) mobile and smart phone environments. Further details of the EPOC32 embodiment are disclosed in the SDK on EPOC32 published by Psion Software Plc, England, to the extent possible without limiting in any way the rights of the inventors and assignees of this invention, the full SDK is incorporated by reference into this specification.

EPOC32 has been ported to run on a number of different micro-processor architectures. The details of porting an operating system per se are beyond the scope of this specification, but will be understood by those skilled in the arts. In particular, EPOC32 has been ported to run on ARM RISC-based micro-processors from Advanced RISC Machines of England. Various models of ARM microprocessors are widely used in digital cellular telephones and will be familiar to those skilled in the art. However, the invention can be realised on many different microprocessors. Hence, the claims of this specification should be read to cover any and every hardware and software implementation in which the operating system performs the functions as limited in the claims.

Returning to the examples of Literal Text and Length Limited Text given in the Prior Art discussion above, EPOC32 applies the above three-fold structure for Objects of the String Class as follows:

Example 1: Literal Text in EPOC32

As explained above, in conventional C++, a text string relating to Literal Text is duplicated in memory: once in the original buffer that arises on compilation of the source code and again in the memory location associated with the Object of the String Class that enables the text to be manipulated. That duplication is wasteful.

EPOC32 however uses a Pointer Descriptor which points to the original memory location of the Literal Text (i.e. as laid down by the compiler). This Pointer Descriptor (called the TPtrC Pointer Descriptor in EPOC32) is the Object of the String Class for Literal Text. (In C++, pointers are not usually regarded as Objects per se). Hence, the hybrid pointer/object in EPOC32 leads to the complete elimination of the need for an additional copy of Literal Text.

Example 2: Length Limited Text in EPOC32

As noted above, in conventional C++, there is no mechanism for using anything other than fully flexible, fully featured Objects of the String Class, irrespective of the length of text. That leads to a high overhead in memory management code since handling heap memory is code and cycle intensive.

In EPOC32, there is a particular class of String Objects, known as Buffer Descriptors, which are size limited. Because they are size limited, complex memory allocation code is not required to manipulate them. Further, Buffer Descriptors can use Static Memory (rather than heap memory). Static memory cannot be re-allocated in the code intensive fashion that heap memory can be, but is more efficient to use in that fewer code cycles are required to achieve the necessary manipulations (hence leading to power saving). Only in the truly dynamic case does EPOC32 require use of the heap memory with its attendant high cycle overhead: Then, the Heap Descriptor Class is used.

EPOC32 lays down the parameters of length limited String Classes using a template class, the 'TBuf' class. (Class templates define the properties of numerous Objects of the String Class; e.g. TBuf is the template for all Buffer Descriptors—i.e. all Objects of the String Class of the Buffer variant. TBuf defines certain common properties for all such Objects of the String Class.)

EPOC32 exhibits several other significant features which lead to minimising code size and cycle overhead, namely that:

String and Raw Data Buffer Class Objects act as 'flat' structures

Descriptors give polymorphic characteristics

Descriptors allow for UNICODE and ASCII invariant coding

String and Raw Data Buffer Class Objects as Flat Structures

All Descriptors are 'flat' structures (i.e. if a Descriptor has to be copied, then only the Descriptor itself is copied. In conventional C++, copying an Object requires copying not only of the Object itself, but also all related pointers and the data pointed to—i.e. the complex, related structure that gives an Object meaning.) In EPOC32, copying a Descriptor is therefore far more economic in memory overhead and cycles than copying an equivalent Object in ordinary C++.

This is achieved in EPOC32 as follows, for Buffers and Pointers:

Buffer Descriptors (TBuf) contain the actual text referenced by the Buffer: hence, copying the Buffer inherently copies the related text. There is no need to copy a pointer and related data as there would be in C++.

Pointer Descriptors (TPtr) contain a C++ type pointer within them, so that copying TPtr alone is all that is required when duplicating: in conventional C++, one would have had to copy not just one entity, but also related and separate pointers and text.

Descriptors as Polymorphic Objects

A group of Objects are said to exhibit polymorphism if all the Objects in the Group behave like a single Object, yet achieve common behaviour through different mechanisms. Polymorphism is provided for in conventional C++ through Virtual Functions: all Objects which are polymorphic to one another include, at a common location, a pointer to a Virtual Function Table (a pointer is therefore required in each Object). This Table identifies the actual code for each polymorphic function. A separate Table is needed for each class that shares polymorphism. But this approach uses a considerable amount of space, since each pointer is 32 bits (i.e. 4 characters) and each Object needs a pointer to a Virtual Function Table. In addition, a 32 bit length field is also used in each Object.

In (inter alia) mobile operating system environments, this overhead is problematic. EPOC32 addresses this as follows for Objects of the String Class: a 32 bit length field is sub-divided so that the first 4 bits code for the type of Descriptor. A function then looks at the 4 bits and points to the correct text location (e.g. within the Descriptor itself if the Descriptor is a Buffer etc.) Hence, polymorphism is provided for in that each of the three different classes of Descriptors for Objects of the String Class (i.e. Pointer Descriptors, Buffer Descriptors and Heap Descriptors) can be coded for using merely the first 4 bits of a single 32 bit field. Hence, considerable memory savings can be achieved. In more general terms, the field shares a machine word with another data item.

UNICODE and ASCII Invariant Code

In C++, coding for 16 bit Unicode leads to doubling in size of all text data that would otherwise be in 8 bit code. Also, conventionally, a programmer has to decide when writing source code whether to code for text using ASCII or Unicode.

In EPOC32, the same source code is used irrespective of the ultimate choice of ASCII or Unicode. This is achieved by building the system using aliases for Class Names, which are ASCII and Unicode invariant, rather than Classes per se (e.g. Pointer Descriptors, Buffer Descriptors and Heap Descriptors). Hence, instead of building using the Pointer TPtr16 to code for Unicode or TPtr8 to code for ASCII, one instead builds using the TPtr Class Name. At build time, the Class Names can be compiled as either 16 bit Unicode or 8 bit ASCII. This approach can be used to encompass all character sets which can be encoded in different bit lengths.

Additional Advantages of EPOC32

In C++. text strings are conventionally terminated with a '0' so that the system can readily know where a text string ends. In EPOC32, that is no longer necessary; Descriptors include a statement defining the length of the data referenced. Hence, there is a yet further saving in code since it no longer needs to use '0' terminators to flag the end of each and every text item.

Summary of Descriptors Features

Descriptors come 3 classes: Pointer Descriptors, Buffer Descriptors and Heap Descriptors Pointer Descriptors come in two forms: constant Pointer Descriptors: TPtrC and modifiable Pointer Descriptors: TPtr constant Pointer Descriptors: TPtrC.
Data cannot be modified through this.
All member functions are constant.
Is used to reference constant strings or data (e.g. data that must not be altered).
Is derived from TDesC and hence has a large number of member functions.

modifiable Pointer Descriptors: TPtr.
Data can be modified though this Descriptor, so long as the data does not extend beyond the maximum length set by the constructor.
Points directly to a memory area containing the area to be modified.
Pointer length determines number of data items that are contained.
Inherits all the TDesC member functions, plus TDes member functions for manipulating and changing data.

Pointer Descriptors are separate from the data represented; but are constructed from a pre-existing area in memory.

Buffer Descriptors come in two forms
constant Buffer Descriptor, TBufC<TInt S>
data can be set into the Descriptor at construction time or by the assignment operator (operator=) later on.
length is defined by an integer template: TBufC<40> contains 40 data items.
Inherits all the TDesC member functions
a modifiable Buffer Descriptor:, TBuf<TInt S>
contains data that can be modified, so long as the data is not modified to extend beyond the maximum length.
maximum length defines the max. number of data items
actual length defines actual number of data items
length is defined by an integer template: TBuf<40> contains 40 data items and no more.
the data area is part of the Descriptor object
useful for containing data which needs to be manipulated and changed, but whose length will not exceed a known maximum (e.g. WP text).
Inherits all the TDesC member functions, plus TDes member functions for manipulating and changing data.

Heap Descriptors come in one form only
constant Heap Descriptor HBufC
contains a length followed by data
the data area is part of the Descriptor object; the whole object occupies a cell allocated from the heap.
Data can be set into the Descriptor at construction time or by the assignment operator (operator=) later on.
Inherits all the TDesC member functions
can be re-allocated: data area can expand or contract TPtrC is a constant Descriptor through which no data can be modified. All of its member functions (except the constructors) are constant. TPtrC is shown schematically at FIG. 1. TPtrC is useful for referencing constant strings or data; for example, accessing text built into ROM resident code, or passing a reference to data in RAM which must not be modified through that reference. TPtrC is derived from TDesC, which provides a large number of member functions for operating on its content; for example, locating characters within text or extracting portions of data.

TPtr is a modifiable pointer Descriptor through which data can be modified, provided that the data is not extended beyond the maximum length. The maximum length is set by the constructor. TPtr points directly to an area in memory containing the data to be modified. TPtr is shown schematically in FIGS. 2A and 2B.

TBufC is a buffer Descriptor containing a length followed by the data area. Data can be set into the Descriptor at construction time or by the assignment operator (operator=) at any other time. Data already held by the Descriptor is constant. TBufC is shown schematically at FIG. 3. The length of a TBufC is defined by an integer template; for example, TBufC<40> defines a TBufC which can contain up to 40 data items.

TBufC is derived from TDesC, which provides a large number of member functions for operating on its content; for example, locating characters- within text or extracting portions of data. TBufC provides the member function, Des( ), which creates a modifiable pointer Descriptor (a TPtr) to reference the TBufC. This allows the TBufC data to be changed through the TPtr, as indicated schematically at FIG. 4. The maximum length of the TPtr is the value of the integer template parameter.

Figure 5:
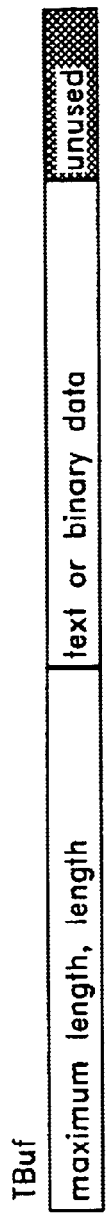
FIG. 5 is an illustration of a modifiable buffer descriptor.

TBuf is a modifiable buffer Descriptor containing data which can be modified, provided that the data is not extended beyond its maximum length. TBuf is shown schematically at FIG. 5. The maximum number of data items that the data area within TBuf can contain, is defined by the maximum length. The length of the Descriptor indicates how many data items are currently contained within the data area. When this value is less than the maximum, a portion of the data area is unused. The maximum length of a TBuf is defined by an integer template; for example, TBuf<40> defines a TBuf which can contain up to data items (and no more!). A TBuf is useful for containing data which needs to be manipulated and changed but whose length will not exceed a known maximum; for example, word processor text. TBuf is derived from TDes which, in turn, is derived from TDesC. Therefore, it inherits all the const member functions defined in TDesC plus the member functions from TDes which can manipulate and change the data; for example, appending a character to the end of existing text.

Figure 6:
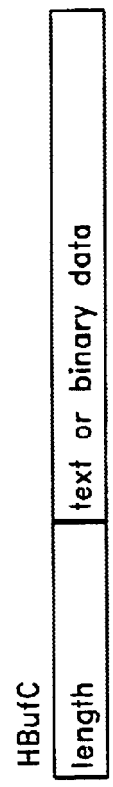
FIG. 6 is an illustration of a constant heap descriptor.

HBufC is a Descriptor containing a length followed by data. It is allocated on the heap using the New( ), NewL( ) or NewLC( ) static member functions. The length of the Descriptor is passed as a parameter to these static functions. HBufC is shown schematically at FIG. 6. Data can be set into the Descriptor at construction time or by the assignment operator (operator=) at any other time. Data already contained by the Descriptor is constant. HBufC is derived from TDesC, which provides a large number of member functions for operating on its content; for example, locating characters within text or extracting portions of data.

Figure 7:
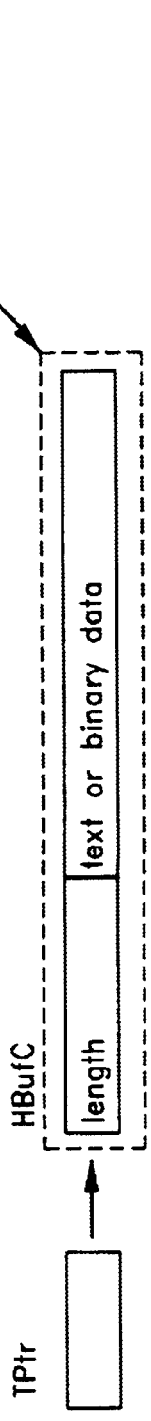
FIG. 7 is an illustration of a modifiable pointer descriptor pointing to an allocated constant heap descriptor.

HBufC provides the member function, Des( ), which creates a modifiable pointer Descriptor (a TPtr) to reference the HBufC. This allows the HBufCC data to be changed through the TPtr. The maximum length of the TPtr its the length of the HBufC data area. FIG. 7 illustrates this schematically.

Figure 8:
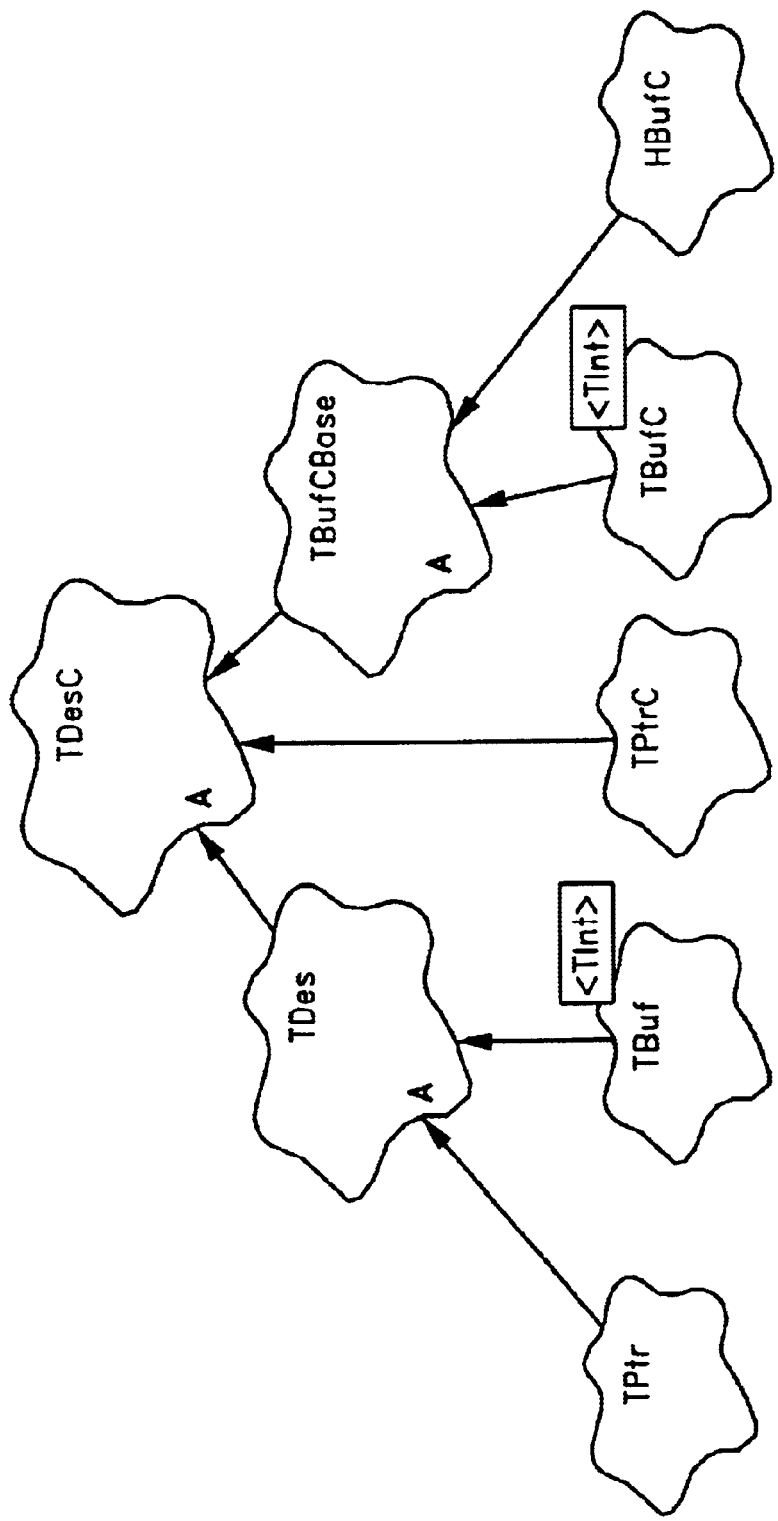
FIG. 8 is an illustration of the member functions available to members of the various descriptor classes.

All of the Descriptor classes TPtrC, TPtr., TBufC, TBuf and HBufC are derived from the abstract base classes TDesC and TDes. The class TBufCBase, although marked as an abstract class, is merely an implementation convenience. FIG. 8 schematically illustrates the relationship between the classes.

EXAMPLE FUNCTIONS (See Appendix 1 for details and additional functions)

```
The code fragments illustrate the use of Left( ).
...
TBufC<8>str(_L("abcdefg"));
...                    // returns a TPtrC descriptor
str.Left(4);           / representing the sting
...//                  "abcd"
```

Figure 9:
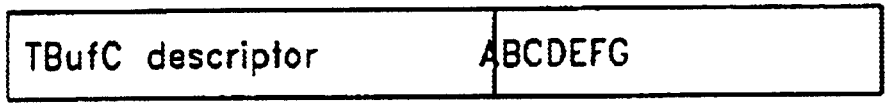
FIGS. 9, 10 illustrate an example to construct a pointer descriptor for leftmost part of data.
Figure 10:
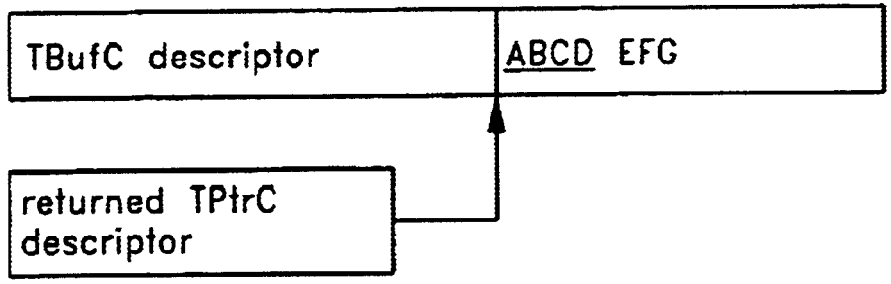

The result of this specific example can be visualized in a before (shown in FIG. 9) and after (shown in FIG. 10) fashion. The underlined text in the "after" diagram (FIG. 10) indicates the data represented by the returned descriptor.

```
The code fragments illustrate the use of Right( ).
...
TBufC<8>str(_L("abcdefg"));
...                    // returns a TPtrC descriptor
str.Right(4);          // representing the string
...                    // "defg"
```

Figure 11:
FIGS. 11, 12 illustrate an example to construct a pointer descriptor for rightmost part of data.
Figure 12:
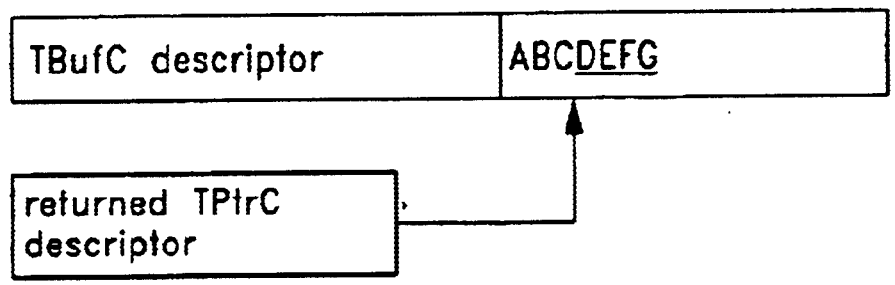

The result of this specific example can be visualized in a before (FIG. 11) and after (FIG. 12) fashion. The underlined text in the "after" diagram (FIG. 12) indicates the data represented by the returned descriptor.

The code fragments illustrate the use of AllocL( ).

```
...
TBufC<16>str(_L("abcdefg"));
HBufC*  ptr;
...
ptr = str.AllocL( );   // Returns address of new HBufC descriptor
...                    // holding the string "abcdefg".
ptr.Length( );         // Returns the length 7
...
```

Figure 13:
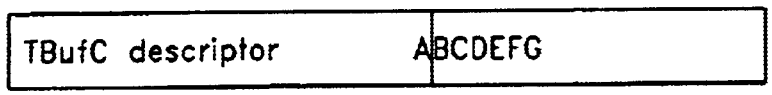
FIGS. 13, 14 illustrate an example to create a new heap descriptor.
Figure 14:
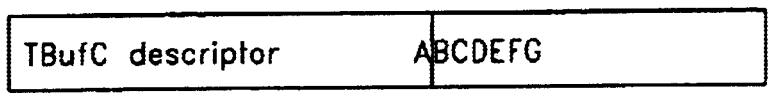
Figure 14:
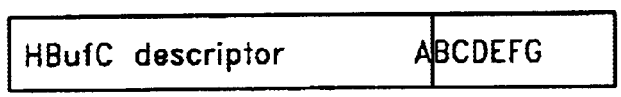

The result of this specific example can be visualised in a before (FIG. 13) and after (FIG. 14) fashion.

The following code fragments illustrate the use of Justify( ).

...

Figure 15:
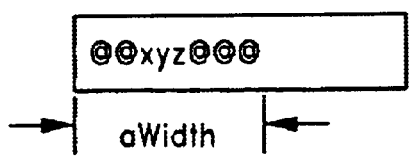
FIGS. 15, 16 illustrate an example to copy from a descriptor and justify.

TBuf<16> tgt(_L("abc"));

...

tgt.JustifyLL("xyz"),8,ECenter,'@');

The descriptor tgt has a maximum length of 16 and initially holds the string "abc". After the call to Justify( ), the content of tgt changes to "@@xyz@@@" as illustrated at FIG. 15.

In this example, the content of the source descriptor is taken to form an 8 character field which replaces the original content of the descriptor tgt. The characters "xyz" are centred within the new field and padded on both sides with the fill character '@'. Setting the alignment to ELeft would change the content of tgt to "xyz@@@@@" while setting the alignment to ERight would change the content of tgt to "@@@@@xyz" In all three cases, the length of the descriptor tgt changes from 3 to 8.

...

TBuf<8> tgtLL("abc")); . . .

...

tgt.JustifyLL("xyz"),9,ECenter,'@');

This call to Justify( ) will panic because the resulting length of data in tgt would exceed the maximum length of tgt.

...

Figure 16:
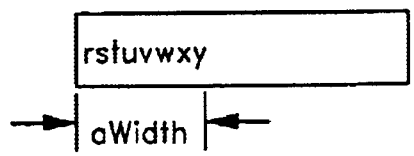

TBuf<16> tgt(_L("abc"));

...

tgt.Justify(_L("rstuvwxyz"),8,ECenter,'@');

In this call to Justify( ), the content of tgt changes to "rstuvwxy" as illustrated at FIG. 16. Only eight of the nine characters in the source descriptor's data area are copied.

The following code fragments illustrate the use of AppendJustify( ).

...

Figure 17:
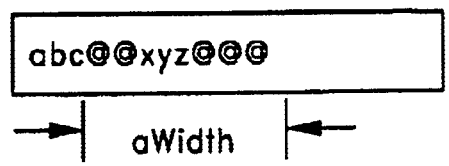
FIG. 17 illustrates an example to append a descriptor and justify.

TBuf<16> tgt(_L("abc"));

tgt.AppendJustify(_L("xyz"),8,ECenter,'@');

The descriptor tgt has a maximum length of 16 and initially holds the string "abc". After the call to AppendJustify( ), the content of tgt changes to "abc@@xyz@@@" as illustrated at FIG. 17.

The following code fragments illustrate the use of AppendJustify( ).

...

Figure 18:
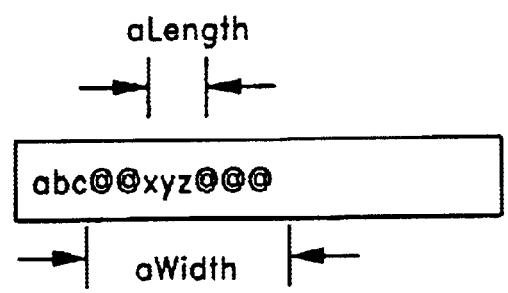
FIG. 18 illustrates an example to append part of a descriptor and justify.

TBuf<16> tgt(_L("abc"));

tgt.AppendJustify(_L("xyz01234456',789"),3,8, ECenter,'@');

The descriptor tgt has a maximum length of 16 and initially holds the string "abc". After the call to AppendJustify( ), the content of tgt changes to "abc@@xyz@@@" as illustrated at FIG. 18.

Figure 19:
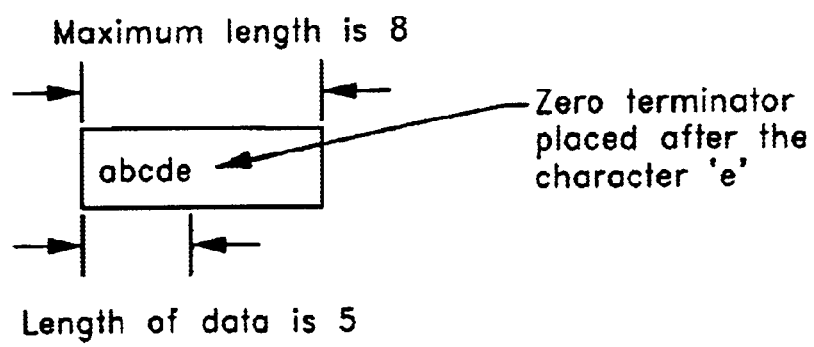
FIG. 19 illustrates an example to append a zero terminator.

The following code fragment depited in FIG. 19 illustrates the use of ZeroTerminate( ).

...

TBuf<8> tgt(_L("abcde"));

...

tgt.ZeroTerminate( )

...

The length of the descriptor tgt is 5 both before and after the call to ZeroTerminate( ).

The following code fragments extracted from the E3232def.h header file (see Appendix 1 for the SDK) show how this is implemented by defining the variant independent class names as appropriate.

if defined(_UNICODE)

...

typedef TPtr16 TPtr;

else

...

typedef Ttr8 TPtr;

...

endif

Application code should avoid using 'C' style string literals directly. Instead, one should use the _S macro to create a 'C' style string of the appropriate width, returning a pointer of the appropriate type. Also, one should use the _L macro (_L for "literal") to create a Descriptor of the appropriate type. See e32.macro._S and e32.macro._L for the definitions of these macros.

For example, const TText* str=_S("Hello");

generates a string of single byte characters in an ASCII build but a string of double-byte characters in a UNICODE build.

_L("Hello");

generates an 8 bit Descriptor in an ASCII build and a 16 bit Descriptor in a UNICODE build. Always use _L("abcdef"), for example, rather than plain "abcdef" as it will always construct a Descriptor of the correct variant.

Note that an 8 bit 'C' style string and an 8 bit pointer Descriptor can be explicitly constructed, independently of the build variant, by using the _S8 and _L8 macros respectively. The corresponding 16 bit versions, _S16 and _L16 are also available. See e32.macro._S8, e32.macro._L8, e32.macro._S16 and e32.macro._L16 for their definitions.

Length and Size
    E3232.descriptors.length-and-size
    A Descriptor characterizes the data it represents by the length of that data. The length of a Descriptor is the number of data items. For the 8 bit variants, the length of the Descriptor is the number of single-bytes of data it represents; for the 16 bit variants, the length of the Descriptor is the number of double-bytes of data it represents.

The size of a Descriptor is the number of bytes occupied by the Descriptor's data; this is not necessarily the same as the Descriptor's length. For the 8 bit variants, the size is the same as the length but for the 16 bit variants, the size is twice the length. Those Descriptors which allow their data to be modified are also characterized by their maximum length. For these Descriptors, the length of data represented can vary from zero up to and including this maximum value. The maximum length for any Descriptor is $2^{28}$.

Text and Binary Data
    E3232.descriptors.text-and-binary
    In 'C', strings are characterized by the need for a zero terminator to flag the end of the string. They suffer from a number of problems. In particular, they cannot include binary data within them (in case that data includes binary zeroes) and operations on them are, in general, inefficient. 'C' strings need to be handled in a different way to binary data, as reflected in the memxxx( ) and strxxx( ) function groups in the ANSI 'C' library. Descriptors allow strings and binary data to be represented in the same way; this allows the same functions to be used in both cases. For binary data, the 8 bit Descriptors should be used explicitly. The distinction between UNICODE and ASCH has no meaning for binary data. Note that there is no practical use for explicit 16 bit binary data.

Memory Allocation
    E3232.descriptors.alloc
    The Descriptor classes (except HBufC) behave as built-in types. They allocate no memory and have no destructors. This means that they can be orphaned on the stack in the same way as a built-in type. This is particularly important in situations where code can leave. (See E3232.exception.trap.cleanup.requirements for the implications of orphaning). An HBufC Descriptor object is allocated on the heap and cannot be created on the stack.

Exceptions
    E3232.descriptors.exceptions
    All parameters to Descriptor member functions are checked to ensure that the operations are correctly specified and that no data is written outside the Descriptor's data area. A particular consequence is that no member function can extend a modifiable Descriptor beyond its maximum allocated length. It is the programmer's responsibility to ensure that all Descriptors are sufficiently large to contain their data, either by making the original allocation large enough or by anticipating the need for a larger Descriptor and dynamically allocating one at run-time. The static approach is simpler to implement but if this were to prove wasteful in a specific case, then the dynamic approach could be more worthwhile. In the event of an exception, it can be safely assumed that no illegal access of memory has taken place and that no data has been moved or damaged.

The Descriptor Types
    E3232.descriptors.types
    There are three kinds of Descriptor object:
    pointer Descriptors.
        The Descriptor object is separate from the data it represents but is constructed for a pre-existing area in memory. They come in two forms:

a constant pointer Descriptor, TPtrC
a modifiable pointer Descriptor, TPtr
buffer Descriptors.
   The data area is part of the Descriptor object. They come in two forms:
      a constant buffer Descriptor, TBufC<TInt S>
      a modifiable buffer Descriptor, TBuf<TInt S>
heap Descriptor.
   The data area is part of the Descriptor object and the whole object occupies a cell allocated from the heap. This comes in only one form:
      a constant heap Descriptor, HBufC Pointer Descriptor—TPtrC
   E3232.descriptors.buffer-descriptor.TPtrC
   TPtrC is a constant Descriptor through which no data can be modified. All of its member functions (except the constructors) are constant. TPtrC is shown schematically at FIG. 1. TPtrC is useful for referencing constant strings or data; for example, accessing text built into ROM resident code, or passing a reference to data in RAM which must not be modified through that reference. TPtr is derived from TDesC, which provides a large number of member functions for operating on its content; for example, locating characters within text or extracting portions of data.

Pointer Descriptor—TPtr
   E3232.descriptors.buffer-descriptor.TPtr
   TPtr is a modifiable pointer Descriptor through which data can be modified, provided that the data is not extended beyond the maximum length. The maximum length is set by the constructor. TPtr points directly to an area in memory containing the data to be modified. TPtr is shown schematically in FIGS. 2A and 2B.
   The maximum number of data items that the area can contain is defined by the maximum length. The length of the TPtr indicates how many data items are currently contained within the data. When this value is less than the maximum, a portion of the data area is unused. TPtr is useful for constructing a reference to an area of RAM which contains data intended to be modified through that reference, or even to an area of RAM which contains no data yet but in which data will be constructed using the Descriptor reference and member functions.
   TPtr is also useful for constructing a reference to a TBufC or an HBufC Descriptor which contain the data to be modified. A TPtr used in this way points to a TBufC or an HBufC Descriptor. The data contained by the TBufC or HBufC Descriptors can be modified through the TPtr. TPtr is derived from TDes which, in turn, is derived from TDesC. Therefore, it inherits all the const member functions defined in TDesC plus the member functions from TDes which can manipulate and change the data; for example, appending a character to the end of existing text.

Buffer Descriptor—TBufC<TInt S>
   E3232.descriptors.buffer-descriptor.TBufC
   TBufC is a buffer Descriptor containing a length followed by the data area. Data can be set into the Descriptor at construction time or by the assignment operator (operator=) at any other time. Data already held by the Descriptor is constant. TBufC is shown schematically at FIG. 3. The length of a TBufC is defined by an integer template; for example, TBufC<40> defines a TBufC which can contain up to 40 data items.
   TBufC is derived from TDesC, which provides a large number of member functions for operating on its content; for example, locating characters within text or extracting portions of data. TBufC provides the member function, Des( ), which creates a modifiable pointer Descriptor (a TPtr) to reference the TBufC. This allows the TBufC data to be changed through the TPtr, as indicated schematically at FIG. 4. The maximum length of the TPtr is the value of the integer template parameter.

Buffer Descriptor—TBuf<TInt S>
   E3232.descriptors.buffer-descriptor.TBuf
   TBuf is a modifiable buffer Descriptor containing data which can be modified, provided that the data is not extended beyond its maximum length. TBuf is shown schematically at FIG. 5. The maximum number of data items that the data area within TBuf can contain, is defined by the maximum length. The length of the Descriptor indicates how many data items are currently contained within the data area. When this value is less than the maximum, a portion of the data area is unused. The maximum length of a TBuf is defined by an integer template; for example, TBuf<40> defines a TBuf which can contain up to 40 data items (and no more!). A TBuf is useful for containing data which needs to be manipulated and changed but whose length will not exceed a known maximum; for example, word processor text. TBuf is derived from TDes which, in turn, is derived from TDesC. Therefore, it inherits all the const member functions defined in TDesC plus the member functions from TDes which can manipulate and change the data; for example, appending a character to the end of existing text.

Heap Descriptor—HBufC
   E3232.descriptors.buffer-descriptor.HBufC
   HBufC is a Descriptor containing a length followed by data It is allocated on the heap using the New( ), NewL( ) or NewLC( ) static member functions. The length of the Descriptor is passed as a parameter to these static functions. HBufC is shown schematically at FIG. 6. Data can be set into the Descriptor at construction time or by the assignment operator (operator=) at any other time. Data already contained by the Descriptor is constant. HBufC is derived from TDesC, which provides a large number of member functions for operating on its content; for example, locating characters within text or extracting portions of data.
   HBufC provides the member function, Des( ), which creates a modifiable pointer Descriptor (a TPtr) to reference the HBufC. This allows the HBufC data to be changed through the TPtr. The maximum length of the TPtr is the length of the HBufC data area. FIG. 7 illustrates this schematically. Heap Descriptors can be re-allocated. The ReAlloc( ) or ReAllocL( ) functions allow the heap Descriptor's data area to expand or contract. The length of the data area, however, cannot be made smaller than the length of data currently held. Before contracting the data area, the length of the data held by the Descriptor must be reduced. The length of data which the assignment operator can set into the heap Descriptor is limited by the space allocated to the Descriptor's data area The memory occupied by heap Descriptors must be explicitly freed either by calling User::Free( ) or by using the delete keyword.

The Descriptor Classes' Relationships
   E32.descriptors.classes
   All of the Descriptor classes TPtrC, TPtr, TBufC, TBuf and HBufC are derived from the abstract base classes TDesC and TDes. The class TBufCBase, although marked as an abstract class, is merely an implementation convenience. FIG. 8 schematically illustrates the relationship between the classes.
   The behaviour of the concrete Descriptor classes is very similar, and therefore, most of the functionality of Descriptors is provided by the abstract base classes. Because Descriptors are widely used (especially on the stack), the size of Descriptor objects must be kept to a minimum. To help with this, no virtual functions are defined in order to avoid the overhead of a virtual function table pointer in each Descriptor object. As a consequence, the base classes have implicit knowledge of the classes derived from them. E32 supplies two variants of the Descriptor classes, one for handling 8 bit (ASCII) text and binary data and the other for handling 16 bit (UNICODE) text. The 8 bit variants of the concrete classes are: TPtrC8, TPtr8, TBufC8<TInt S>, TBuf8<TInt S> and HBufC8 while the 8 bit variants of the abstract classes are: TDesC8, TDes8. Similarly, the 16 bit variants are named: TPtrC, TPtr16, TBufC16<TInt S>, TBuf16<TInt S>, HBufC16, TDesC16 and TDes16 respectively. This distinction is transparent for Descriptors intended to represent text. By writing programs which construct and use TPtrC, TPtr, TBufC<TInt S>, TBuf<TInt S> and HBufC classes, compatibility is maintained between both UNICODE and ASCII. The appropriate variant is selected at build time depending on whether the _UNICODE macro has been defined or not. If the _UNICODE macro is defined, the 16 bit variant is used, otherwise the 8 bit variant is used as explained in e32descriptors.char-set Descriptors for binary data must explicitly use the 8 bit variants; in other words, code must explicitly construct TPtrC8, TPtr8, TBufC8<TInt S>, TBuf8<TInt S> and HBufC8 classes. Explicit use of the 16 bit variants for binary data is possible but not recommended. In general, 8 bit and 16 bit variants are identical in structure and implementation; the description of the classes themselves uses the build independent names throughout.

N.B. Many member functions take arguments which are either of type TUint8* or type TUint16* depending on whether the Descriptor is the 8 bit or 16 bit variant. To simplify explanation, these arguments are written in function prototypes as TUint??*.

Using Descriptors for Function Interfaces
e32.descriptors.using-function-interfaces Many interfaces which use or manipulate text strings or general binary data use descriptors to specify the interface. In conventional 'C' programming, interfaces would be specified using a combination of char*, void* and length values. In E32 descriptors are always used.

There are four main cases:
Passing a constant string
In 'C': StringRead(const char* aString);
The length of the string is implied by the zero terminator; therefore, the function does not require the length to be explicitly specified.
In E32: StringRead(const TDesC& aString);
The descriptor contains both the string and its length.
Passing a string which can be changed.
In 'C': StringWrite(char* aString, int aMaxLength);
The length of the passed string is implied by the zero terminator. aMaxLength indicates the maximum length to which the string may be extended.
In E32: StringWrite(TDes& aString);
The descriptor contains the string, its length and the maximum length to which the string may be extended.
Passing a buffer containing general binary data
In 'C': BufferRead(const void* aBuffer, int aLength);
Both the address and length of the buffer must be specified.
In E32: BufferRead(const TDes8& aBuffer);
The descriptor contains both the address and the length of the data. The 8 bit variant is explicitly specified; the buffer is treated as byte data, regardless of the build variant.

Passing a buffer containing general binary data which can be changed.
In 'C':
BufferWrite(void* aBuffer, int& aLength, int aMaxLength);
The address of the buffer, the current length of the data and the maximum length of the buffer are specified. The aLength parameter is specified as a reference to allow the function to indicate the length of the data on return.
In E32: BufferRead(TDes8& aBuffer);
The descriptor contains the address, the length of the data and the maximum length. The 8 bit variant is explicitly specified; the buffer is treated as byte data, regardless of the build variant.

Folding and Collating
e32.descriptors.folding-collating

There are two techniques that may be used to modify the characters in a descriptor prior to performing some operations on text:
folding
collating
Variants of member functions that fold or collate are provided where appropriate.

Folding
e32.descriptors.folding

Folding means the removal of differences between characters that are deemed unimportant for the purposes of inexact or case-insensitive matching. As well as ignoring differences of case, folding ignores any accent on a character. By convention, folding converts lower case characters into upper case and removes any accent.

Collating
e32.descriptors.collating

Collating means the removal of differences between characters that are deemed unimportant for the purposes of ordering characters into their collating sequence. For example, collate two strings if they are to be arranged in properly sorted order, this may be different from a strict alphabetic order.

Using Descriptors
e32.descriptors.using

The following series of examples show how descriptors can be used. Specifically, the examples illustrate:
the basic concepts of the pointer descriptors, TPtrC and TPtr. See e32.descriptors.using.pointer-descriptors.
the basic concepts of the buffer descriptors, TBufC and TBuf. See e32.descriptors.using.buffer-descriptors.
how descriptors can represent general binary data. See e32.descriptors.using.general-binary-data.
some of the member functions which do not modify the content of a descriptor. See e32.descriptors.using.non-modifying-functions.
some of the member functions which modify the content of a descriptor. See e32.descriptors.using.modifying-functions.
how descriptors can be used in interfaces. See e32.descritpors.using.interface-specifiers.
the basic concepts of the heap descriptor, HBufC. See e32.descritpors.using.heap-descriptors.

Pointer Descriptors
e32.descriptors.using.pointer-descriptors

The code fragments shown here to illustrate the use of pointer descriptors are extracted from the sample source code in the eudesptr project. Run the code in this project to see pointer descriptors in action.

TPtrC
  The 8 bit variant
  A TPtrC is useful for referencing constant strings or data; for example, accessing text built into ROM resident code, or passing a reference to data in RAM which must not be modified through that reference.
  For example, define a constant 'C' style ASCII string:
    const TText8* cstr8=(TText8*)"Hello World!";
  A TPtrC8 descriptor can be constructed to represent this pre-defined area containing the string "Hello World!":
    TPtrC8 ptrC8(cstr8);
  The descriptor is separate from the data it represents.
  While the length of the 'C' string is 12, its size is 13 to allow for the zero terminator. From the descriptor's viewpoint, both the length and the size of the data is 12. The descriptor uses the length to determine the amount of data represented. The address of the descriptor's data area, as returned by:
    ptrC8.Ptr( );
  is the same as same as the address of the original 'C' string, cstr8.
    The 16 bit variant (UNICODE)
    Similarly, define a constant 'C' style string of wide (or UNICODE) characters:
    const TText16 cstr16=(TText16*)L"Hello World!";
  A TPtrC descriptor can be constructed to represent this area containing the string of double-byte characters "Hello World!":
    TPtrC ptrC(cstr16);
  Again, the descriptor is separate from the data it represents. The length of the descriptor, as returned by a call to ptrc16.Length( ), is 12 as it represents 12 text characters but the size, as returned by a call to ptrc16.Size( ), is now 24 as each character occupies 2 bytes. Again, the address of the descriptor's data area, as returned by:
    ptrc16.Ptr( );
  is the same as the address of the original 'C' string, cstr16.
    The _S macro and build independent names
    Use the _S macro to define a constant 'C' style string of the appropriate width. The TText variant is defined at build time (as either TText8 or TText16) depending on whether the _UNICODE macro has been defined. For example:
    const TText* cstr=_S("Hello World!");
  The TPtrC descriptor:
    TPtrC ptrc(cstr);
  represents the area containing the text "Hello World!"; the TPtrC variant is defined at build time (as either TPtrC8 or TPtr16) depending on whether the _UNICODE macro has been defined.
    The length of the descriptor, as returned by ptrc.Length( ), is 12 for all build variants but the size of the descriptor, as returned by ptrc.Size( ) is 12 for an ASCII build and 24 for a UNICODE build.
  See e32.macro._S.
    The _L macro
    The _L macro constructs a TPtrC of the correct variant and is frequently used as a source descriptor when constructing a buffer descriptor or a heap descriptor.
    The macro is also useful for constructing a TPtrC to be passed as a parameter to a function. For example, the Printf( ) member function of the RTest class used in these examples requires a descriptor as its first parameter. Here, the _L macro constructs a TPtrC representing the constant static area generated by the compiler containing the text "\nThe _L macro constructs a TPtrC".
    testConsole.Printf(_L("\n The _L macro constructs a TPtrC"));
  See e32.macro._L.
TPtr
  A TPtr is a modifiable pointer descriptor through which data can be modified, provided that the data is not extended beyond the maximum length. The maximum length is set by the constructor.
  For example, define a TText area initialised to contain the string "Have a nice day":

TText str[16] =
    {'H','a','v','e',' ','a',' ','n','i','c','e',' ','d','a','y','\0'};

A TPtr descriptor can be constructed to represent the data in this area; further, this data can be changed, contracted and expanded provided that the length of the data does not exceed the maximum.
    TPtr ptr(&str[0],15,16);
  The descriptor ptr represents the data in str and is constructed to have a current length of 15 (the length of the text, excluding the zero terminator) and a maximum length of 16 (the actual length of str). Once the descriptor has been constructed, it has no farther use for the zero terminator.
  The data can be completely replaced using the assignment operator:
    ptr=_L("Hi there");
  Note the use of the _L macro to construct a TPtrC of the correct build variant as the source of the assignment.
  The length of ptr is now 8 but the maximum length remains 16. The size depends on the build variant. In an ASCII build, this is 8 but in a UNICODE build, this becomes 16 (two bytes for every character).
  The length of the data represented can be changed. For example, after ptr.SetLength(2), the descriptor represents the text "Hi". The length can even be set to zero so that after ptr.Zero( ), the descriptor represents no data. Nevertheless, the maximum length remains at 16 so that:
    ptr=_L("Have a nice day!"); puts the 16 characters "Have a nice day" into the descriptor's data area.
  See also e32.macro._L.
Buffer Descriptors
  e32.descriptors.using.buffer-descriptors
  The code fragments shown here to illustrate the use of buffer descriptors are extracted from the sample source code in the eudesbuf project. Run the code in this project to see buffer descriptors in action.
TBufC
  A TBufC is a buffer descriptor where the data area is part of the descriptor itself.
  Data can be set into the descriptor at construction time or by the assignment operator at any other time. Data already held by the descriptor cannot be modified but it can be completely replaced (again, using the assignment operator).
  For example:
    TBufC<16> bufc2(_L("Hello World!"));
  constructs a TBufC which can contain up to 16 data items. During construction, the descriptor's data area is set to contain the text "Hello World!" and the length of the descriptor is set to 12.
  The data within bufc2 cannot be modified but it can be replaced using the assignment operator:
    bufc2=_L("Replacement text");
  To prevent any possibility of replacing the data, declare bufc2 as const.
  The data within a TBufC can be changed by constructing a TPtr from the TBufC using the Des( ) member function;

the data can then be changed through the TPtr. The maximum length of the TPtr is the value of the TBufC template parameter. For example:

bufc2=_L("Hello World!");
   TPtr ptr=bufc2.Des( );
   ptr.Delete((ptr.Length( )-1),1);
   ptr.Append(_L("& Hi"));

This deletes the last character in the TBufC and adds the characters "& Hi" so that the TBufC now contains the text "Hello World & Hi" and its length is 16. Note that the length of both the TBufC and the TPtr reflect the changed data.

TBuf

A TBuf is a modifiable buffer descriptor where the data area is part of the descriptor itself. The data can be modified provided that the data is not extended beyond the maximum length. The maximum length is set by the constructor.
For example:

TBuf<16> buf(_L("Hello World!"));

constructs a TBuf which can contain up to 16 data items. During construction, the descriptor's data area is set to contain the text "Hello World!", the length of the descriptor is set to 12 and its maximum length is set to 16.

The data can be modified directly:

buf.Append('@');

changes buf's data to "Hello World!@" and its length to 13 while:

buf.SetLength(3);

changes it length to 3 and its data to "Hel".

The maximum length of the descriptor always remains at 16.

Like a TBufC descriptor, the data contained within a TBuf can be replaced entirely using the assignment operator:

buf=_L("Replacement text");

replaces "Hello World" with "Replacement text" and changes the length of the descriptor to 16.

An attempt to increase the length of the data beyond the maximum generates an exception (a panic). For example:

buf=_L("Text replacement causes panic!");

generates a panic at run time because the length of the replacement text (30) is greater than the maximum (16).

General Binary Data e32.descriptors.using.general-binary-data

The code fragments shown here, illustrating how descriptors can handle, general binary data, are extracted from the sample source code in the eudesbin project. Run the code in this project to see the sample in action.

The kind of data represented or contained by descriptors is not restricted to text. Descriptors can also handle general binary data.

To deal with general binary data, always explicitly construct an 8 bit variant descriptor. Binary data should always be treated as 8 bit data regardless of the build.

For example set up an area in memory initialised with binary data:

TUint8 data[6]={0x00,0x01,0x02,0xAD,0xAE,0xAF};

Construct a modifiable buffer descriptor using the default constructor:

TBuf8<32> buffer;

The following code extracted from the eudesbin project puts the binary data into the descriptor, appends a number of single byte values and then displays the data at the test console. The length of the buffer is 9, the maximum length is 32 and the size is 9 regardless of the build.

TInt index;
   TInt counter;
   buffer.Append(&data[0],sizeof(data));
   buffer.Append(0xFD);
   buffer.Append(0xFE);
   buffer.Append(0xFF);
   counter = buffer.Length( );
   for (index = 0; index < counter; index++)
       testConsole.Printf(_L("0x%02x"),buffer[index]);
   testConsole.Printf(_L("; Length( )=%d;\n"),
                            buffer.Length( )
                            );
   testConsole.Printf(_L("Size( )=%d; MaxLength( )=%d\n"),
                            buffer.Size( ),
                            buffer.MaxLength( )
                            );

Text and general binary data can be freely mixed; so that:

buffer.Append('A');
   buffer.Append('B');
   buffer.Append(0x11);

is acceptable.

Non-modifying Functions e32.descriptors.using.non-modifying-functions

The code fragments shown here, illustrating some of the non-modifying descriptor member functions, are extracted from the sample source code in the eudesc project. Look at the code in this project to see the full set of examples These examples all use a TBufC descriptor constructed to contain the text "Hello World!". Note also that the descriptor is declared const so that its data cannot be replaced using the assignment operator:

const TBufC<16> bufc(_L("Hello World!"));

Right( ) & Mid( )

These functions construct a TPtrc to represent a portion of bufc's data

TPtrC ptrc1=bufc.Right(5); ptrc1 represents the right hand 5 data items in bufc. ptrc1's data is "orld!", its length is 5 and the address of its data area is the address of bufc's data area plus 7.

The Left( ) member function works in a similar way.

TPtrC ptrc2=bufc.Mid(3,6);

ptrc2 represents the 6 data items offset 3 from the start of bufc's data area ptrc2's data is "lo Wor", its length is 6 and the address of its data area is the address of bufc's data area plus 3.

In practice, it may not be necessary to assign the returned TPtrC to another TPtrC. For example, the following code puts a value of 3 in pos; this is the offset of char 'W' within the chars "lo Wor" (see later for an explicit example of Locate( ))

TInt pos;
   . . .
   pos=(bufc.Mid(3,6)).Locate('W');

These functions can panic. For example, requesting the 13 right hand data items in bufc will cause an exception (there are only 12):

TPtrC ptrc3=bufc.Right(13);

Compare( ) & CompareF( )

The compare functions can be used to compare the content of two descriptors. Any kind of data can be compared. For binary data, use Compare( ). For text use Compare( ), CompareF( ) or CompareC( ).

The following example compares the content of bufc with the content of a number of descriptors and displays the results at the test console:

```
...
TInt index;
...
TPtrC      genptr;
const TBufC<19>lessthan(_L(" is less than    "));
const TBufC<19>greaterthan(_L(" is greater than "));
const TBufC<19>equalto(_L(" is equal to     "));
...
const TBufC<16>compstr[7] =   {_L("Hello World!@@"),
                               _L("Hello"),
                               _L("Hello Worl"),
                               _L("Hello World!"),
                               _L("hello world!"),
                               _L("Hello World"),
                               _L("Hello World@"),
                              };
for (index = 0; index < 7; index++)
    {
    if( (bufc.Compare(compstr[index])) < 0)
        genptr.Set(lessthan);
    else if( (bufc.Compare(compstr[index])) > 0)
        genptr.Set(greaterthan);
      else genptr.Set(equalto);
    testConsole.Printf(_L("\"%S\"%S\"%S\"\n"),
                       &bufc,
                       &genptr,
                       &compstr[index]
                       );
    }
```

The case of text is important using Compare( ); the fourth comparison is equal but the fifth comparison is not (the 'w' characters are a different case).

Using CompareF( ), the case is not important; both the fourth and fifth comparisons return an equal result.

Locate( ), LocateF( ) & LocateReverse( )

The locate functions can be used to find the position (offset) of a character within text or a specific value within general binary data.

The following example attempts to find the positions (i.e. the offsets) of the characters 'H', '!', 'o' and 'w' within the text "Hello World!" and displays the result at the test console:

```
...
TInt index;
TInt pos;
TPtrC genptr;
const TBufC<9> notfound(_L("NOT FOUND")),
const TBufC<5> found(_L("found"));
...
TChar ch[4] = {'H', '!', 'o', 'w'};
...
testConsole.Printf(_L("using Locate( )\n"));
for (index = 0 ; index < 4; index++)
    {
    pos = bufc.Locate(ch[index]);
    if (pos < 0)
        genptr.Set(notfound);
    else
        genptr.Set(found);
    testConsole.Printf(_L("\"%S\" Char %c is at pos %d (%S)\n"),
                       &bufc,
                       ch[index],
                       pos,
                       &genptr
                       );
    }
```

The character 'w' is not found using Locate( ) but is found using LocateF( ). This is because Locate( ) is case sensitive while LocateF( ).

This example uses LocateReverse( ) which is used to find the position of a character starting from the end of the descriptor's data area

```
...
testConsole.Printf(_L("using LocateReverse( )\n"));
for (index = 0 ; index < 4; index++)
    {
    pos = bufc.LocateReverse(ch[index]);
    if(pos < 0)
        genptr.Set(notfound);
    else
        genptr.Set(found);
    testConsole.Printf(_L("\"%S\" Char %c is at pos %d (%S)\n"),
                       &bufc,
                       ch[index],
                       pos,
                       &genptr
                       );
    }
```

Note that the 2nd char 'o' in the string "Hello World!" is found this time.

Match( ) & MatchF( )

The following example shows the use of the Match( ) and MatchF( ) member functions. The result of a matches between the content of buf and a series of descriptors with varying combinations of match strings is displayed at the test console.

```
...
TInt index;
TInt pos;
TPtrC genptr;
const TBufC<9> notfound(_L("NOT FOUND"));
const TBufC<5> found(_L("found"));
...
TBufC<8>matchstr[7] =   {_L("*World*"),
                         _L("*W?rld*"),
                         _L("*Wor*"),
                         _L("Hello"),
                         _L("*W*"),
                         _L("hello"),
                         _L("*"),
                        };
for (index = 0 ; index < 7; index++)
    {
    pos = bufc.Match(matchstr[index]);
    if(pos < 0)
        genptr.Set(notfound);
    else
        genptr.Set(found);
    testConsole.Printf(_L("%- 8S pos %2d (%S)\n"),
                       &matchstr[index],
                       pos,
                       &genptr
                       );
    }
```

Note that when using MatchF( ), the result is different when matching the 6th string where the case is ignored.

Modifying Functions e32.descriptors.using.modifying-functions

The code fragments shown here, illustrating some of the modifying descriptor member functions, are extracted from the sample source code in the eudes project. Look at the code in this project to see the full set of examples.

These examples all use a TBuf descriptor constructed to contain the text "Hello World!".

TBuf<32> buf(_L("Hello World!"));

Swap( )

The contents, length and size of altbuf1 and buf are swapped; the maximum lengths of the descriptors do NOT change.

TBuf<16> altbuf1(_L("What a nice day"));
...
buf.Swap(altbuf1);
Repeat( )

The current length of buf is set to 16. Repeat copying the characters "Hello" generates the text sequence "HelloHelloHelloH" in buf.

buf.SetLength(16);
buf.Repeat(_L("Hello"));

Setting the length of buf to and re-doing the repeat generates the text sequence "HelloHel".

Justify( )

The example uses src as the source descriptor.
TBufVC<40> src(_"Hello World!"));
...
buf.Justify(src,16,ELeft,'@');
The descriptor src has length 12.

The target field in buf has width 16 (this is greater than the length of the descriptor src). src is copied into the target field, aligned left and padded with '@' characters. The length of buf becomes the same as the specified width, i.e 16.

buf.Justify(src,16,ECenter,'@');

The target field in buf has width 16 (this is greater than the length of the descriptor src). src is copied into target field, aligned centrally and padded with '@' characters. The length of buf becomes the same as the specified width, i.e 16 buf.Justify(src,10,ECenter,'@');

The target field in buf has width 10 (this is smaller than the length of the descriptor src). src is copied into the target field but truncated to 10 characters and, therefore, alignment and padding information is not used. The length of buf becomes the same as the width, i.e. 10 buf.Justify(src,KDefaultJustifyWidth,ECenter,'@');

The target field in buf is set to the length of the descriptor src (whatever it currently is). src is copied into the target field. No padding and no truncation is needed and so the alignment and padding information is not used. The length of buf becomes the same as the length of src, i.e. 12.

Descriptors as Interface Specifiers e32.descriptors.using.interface-specifiers

See the eudesint project for examples illustrating the use of descriptors in function interfaces.

Heap Descriptors e32.descriptors.using.heap-descriptors

The code fragments shown here, illustrating the use of heap descriptors, are extracted from the sample source code in the eudeshbc project. Look at the code in this project to see the the sample in action.

An HBufC is always constructed on the heap using the static member functions New( ), NewL( ) or NewLC( ). For example:

HBufC* buf;
...
buf=HBufC::NewL(15);

This constructs an HBufC which can hold up to 15 data items. The current length is zero. Although existing data within an HBufC cannot be modified, the assignment operator can be used to replace that data For example:

*buf=_L("Hello World!");

To allow more than 15 characters or data items to be assigned into the HBufC, it must be reallocated first. For example:

buf=buf-> ReAllocL(20);

This permits the following assignment to be done without causing a panic:

*buf=_L("Hello World! Morning");

buf may or may not point to a different location in the heap after relocation. The location of the reallocated descriptor depends on the heap fragmentation and the size of the new cell.

The Des( ) function returns a TPtr to the HBufC. The data in the HBufC can be modified through the TPtr. The maximum length of the TPtr is determined from the size of the cell allocated to the data area of the HBufC. For example:

TPtr ptr=buf-> Des( );
...
ptr.Delete((ptr.Length( )-9),9);
ptr.Append(_L("& Hi"));

This changes the data in the HBufC and the length of the HBufC.

TPtrC Class Constant Pointer Descriptor

Overview

Derivation

TDesC Abstract: implements descriptor behaviour which does not modify data.

TPtrC A constant pointer descriptor.

Defined in e32des8.h for the 8 bit variant (TPtr8).
e32des16.h for the 16bit variant (TPtr16).

Description

Create a TPtrC descriptor to access a pre-existing location in either ROM or RAM where the data at that location is to be accessed but not changed (or where the data cannot be changed).

A common use for a TPtrC is to access a string of text in a code segment. This will normally be constructed using the _L macro which constructs a TPtrC descriptor for either an ASCII or UNICODE build.

Often, a TPtrC will appear as the right hand side of an expression or as an initialisation value for another descriptor, for example:

TBuf<16> str(_L"abcdefghijklmnop"));
...
str.Find(_L"abc");
str.Find(_L"bcde");

The _L macro expands to a TPtrC which is defined as either a TPtr8 or TPtrC16 depending on the build variant (TBuf is also defined in a similar way).

The 8 bit variant, TPtrC8 can be constructed to access binary data The 8 bit variant is always explicitly used for binary data.

Five constructors are available to build a TPtr and include a default constructor. A TPtrC can be (re-)initialised after construction by using the set( ) functions.

All the member functions described under the TDesC class are available for use by a TPtrc descriptor. In summary these are:

| | |
|---|---|
| Length( ) | Fetch length of descriptor data. |
| Size( ) | Fetch the number of bytes occupied by descriptor data. |
| Ptr( ) | Return a pointer to the descriptor data. |
| Compare( ), CompareF( ), CompareC( ) | Compare data (normally), (folded), (collated). |
| Match( ), MatchF( ), MatchC( ) | Pattern match data (normally), (folded), (collated). |

-continued

| | |
|---|---|
| Locate( ), LocateF( ) | Locate a character in forwards direction (normally), (folded). |
| LocateReverse( ), LocateReverseF( ) | Locate a character in reverse direction (normally), (folded). |
| Find( ), FindF( ), FindC | Find data (normally), (folded), (collated). |
| Left( ) | Construct TPtrC for leftmost part of data. |
| Right( ) | Construct TPtrC for rightmost part of data. |
| Mid( ) | Construct TPtrC for portion of data. |
| Alloc( ), AllocL( ), AllocLC( ) | Construct an HBufC for this descriptor. |
| HufEncode( ) | Huffman encode |
| HufDecode( ) | Huffman decode |
| operators < <= > >= == | Comparison operators |
| operator [ ] | Indexing operator |

Construction
  e32.descriptors.TPtrC.construction
  TPtrC( ) Default C++ constructor
  Description
    The default C++ constructor is used to construct a constant pointer descriptor.
    The length of the constructed descriptor is set to zero and its pointer is set to NULL.
  Notes
    Use the Set( ) member function to initialise the pointer descriptor.
  TPtrC( ) Copy constructor
  TPtrC(const TPtrC& aDes);
  Description
    The C++ copy constructor constructs a new TPtrC object from the existing one.
    The length of the constructed descriptor is set to the length of aDes and is set to point to aDes's. data.
  TPtrC( ) C++ constructor [with any descriptor]
  TPtrC(const TDesC& aDes);
  Description
    The C++ constructor is used to construct the TPtrC with any kind of descriptor.
    The length of the constructed descriptor is set to the length of aDes, and it is set to point to aDes's data.
  Arguments
  const TDesC& aDes A reference to any type of descriptor used to construct the TPtrC.
  Notes
    If aDes is a reference to a heap descriptor (HBufC), then the data also resides on the heap.
  TPtrC( ) C++ constructor [with zero terminated string]
  TPtrC(const TText* aString);
  Description
    The C++ constructor is used to construct the TPtrC object with a zero terminated string.
    The length of the descriptor is set to the length of the zero terminated string, excluding the zero terminator.
    The constructed descriptor is set to point to the location of the string, whether in RAM or ROM.
  Arguments
  const TText* aString A pointer to the zero terminated used to construct the TPtrC.
  TPtrC( )C++ constructor [with address and length]
  TPtrC(const TUint??* aBuf,TInt aLength);
  Description
    The C++ constructor is used to construct the TPtrC with the memory address and length.
    The length of the constructed descriptor is set to the value of aLength.
    The constructed descriptor is set to point to the memory address supplied in aBuf; the address can refer to RAM or ROM.
  Arguments
  const TUint??* aBuf The address which is to be the data area of the constant pointer descriptor.
    For the 8 bit variant, this is type TUint8*; for the 16 bit variant, this is type TUint16*.
  TInt aLength The length of the constructed constant pointer descriptor.
    This value must be non-negative otherwise the constructor will panic with ETDes8LengthNegative for the 8 bit variant or ETDes16LengthNegative for the 16 bit variant.
Late Initialisation
  e32.descriptors.TPtrC.late-initialisation
  Set( ) Initialisation taking any descriptor
  void Set(const TDesC& aDes);
  Description
    Use this function to initialise (or re-initialise) a constant pointer descriptor using the content of any kind of descriptor.
    The length of this constant pointer descriptor is set to the length of aDes.
    This descriptor is set (or re-set) to point to aDes's data
  Arguments
  const TDesC& aDes A reference to any descriptor whose content is to be used to initialise this constant pointer descriptor.
  Notes
    The Set( ) function can be used to initialise a constant pointer descriptor constructed using the default constructor.
    If aDes is a reference to a heap descriptor (HBufC), then the data also resides on the heap.
  Set( ) Initialisation taking address and length
  void Set(const TUint??* aBuf,TInt aLength);
    Use this function to initialise (or re-initialise) a constant pointer descriptor using the supplied memory address and length.
    The length of this constant pointer descriptor is set to the value of aLength.
    The descriptor is set to point to the memory address supplied in aBuf; the address can refer to RAM or ROM.
  Arguments
  const TUint??* aBuf The address which is to be the data area of the constant pointer descriptor.
    For the 8 bit variant, this is type TUint8*; for the 16 bit variant, this is type TUint16*.
  TInt aLength The length of the constant pointer descriptor.
    This value must be non-negative otherwise the constructor will panic with ETDes8LengthNegative for the 8 bit variant or ETDes16LengthNegative for the 16 bit variant.
  Notes
    The Set( ) function can be used to initialise a constant pointer descriptor constructed using the default constructor.

TPtr Class Modifiable Pointer Descriptor
Overview
  Derivation
  TDesC Abstract: implements descriptor behaviour which does not modify data.
  TDes Abstract: implements descriptor behaviour which can change data.
  TPtr A modifiable pointer descriptor.
    Defined in
    e32des8.h for the 8 bit variant (TPtr8).
    e32des16.h for the 16 bit variant (TPtr16).
  Description
    Create a TPtr descriptor to access a pre-existing area or buffer in RAM where the contents of that buffer are to be accessed and manipulated.
    A common use for a TPtr is to access the buffer of an existing TBufC or an HBufC descriptor using the Des( ) member functions (of TBufC and HBufC). For example:

TBufC<8> str(_L("abc"));

str.Des( ).Append('x');

TPtr is defined as either a TPtr8 or TPtr16 depending on the build variant and can be used to access text.

The 8 bit variant, TPtr8 can be constructed to access binary data. The 8 bit variant is always explicitly used for binary data Two constructors are available to build a TPtr and include a default constructor. A TPtr can be (re-)initialised after construction by using the set( ) functions.

All the member functions described under the TDesC and TDes classes are available for use by a TPtr descriptor. In summary these are:

| | |
|---|---|
| Length( ) | Fetch length of descriptor data. |
| Size( ) | Fetch the number of bytes occupied by descriptor data. |
| Ptr( ) | Fetch address of descriptor data. |
| Compare( ), CompareF( ), CompareC( ) | Compare data (normally), (folded), (collated). |
| Match( ), MatchF( ), MatchC( ) | Pattern match data (normally), (folded), (collated). |
| Locate( ), LocateF( ) | Locate a character in forwards direction (normally), (folded). |
| LocateReverse( ), LocateReverseF( ) | Locate a character in reverse direction (normally), (folded). |
| Find( ), FindF( ), FindC | Find data (normally), (folded), (collated). |
| Left( ) | Construct TPtrC for leftmost part of data. |
| Right( ) | Construct TPtrC for rightmost part of data. |
| Mid( ) | Construct TPtrC for portion of data. |
| Alloc( ), AllocL( ), AllocLC( ) | Construct an HBufC for this descriptor. |
| HufEncode( ) | Huffman encode |
| HufDecode( ) | Huffman decode |
| MaxLength( ) | Fetch maximum length of descriptor. |
| MaxSize( ) | Fetch maximum size of descriptor |
| SetLength( ) | Set length of descriptor data |
| Zero( ) | Set length of descriptor data to zero |
| SetMax( ) | Set length of descriptor data to the maximum value. |
| Swap( ) | Swap data between two descriptors. |
| Copy( ), CopyF( ), CopyC( ) | Copy data (normally), (and fold), (and collate). |
| CopyLC( ) | Copy data and convert to lower case. |
| CopyUC( ) | Copy data and convert to upper case |
| CopyCP( ) | Copy data and capitalise |
| Repeat( ) | Copy and repeat. |
| Justify( ) | Copy and justify. |
| Insert( ) | Insert data. |
| Delete( ) | Delete data. |
| Replace( ) | Replace data. |
| TrimLeft( ) | Delete spaces from left side of data area. |
| TrimRight( ) | Delete spaces from right side of data area. |
| Trim( ) | Delete spaces from both left and right side of data area. |
| Fold( ) | Fold characters. |
| Collate( ) | Collate characters. |
| LowerCase( ) | Convert to lower case. |
| UpperCase( ) | Convert to upper case. |
| Capitalise( ) | Capitalise. |
| Fill( ) | Fill with specified character. |
| FillZ( ) | Fill with 0x00. |
| Num( ) | Convert numerics to character (hex.digits to lower case). |
| NumUC( ) | Convert numerics to (upper case) character. |
| Format( ), FormatList( ) | Convert multiple arguments to character according to format specification. |
| Append( ) | Append data. |
| AppendFill( ) | Append with fill characters. |
| AppendJustify( ) | Append data and justify |
| AppendNum( ) | Append from converted numerics. |
| AppendNumUC( ) | Append from converted numerics; convert to upper case. |
| AppendFormat( ), AppendFormatList( ) | Append from converted multiple arguments. |
| ZeroTerminate( ) | Append zero terminator. |
| PtrZ( ) | Append zero terminator and return a pointer. |
| operators < <= > >= == | Comparison operators. |
| operator += | Appending operator. |
| operator [ ] | Indexing operator. |

Construction e32.descriptors.TPtr.construction

TPtr( ) C++ constructor [with address and maximum length]

TPtr(TUint??* aBuf,TInt aMaxLength);

Description

The C++ constructor is used to construct the TPtr with the address and maximum length.

The length of the constructed descriptor is set to zero and its maximum length is set to aMaxLength.

The constructed descriptor is set to point to the memory address supplied in aBuf which can refer either to RAM or ROM.

Arguments

TUint??* aBuf The address which is to be the data area of the modifiable pointer descriptor.

For the 8 bit variant, this is type TUint8*; for the 16 bit variant, this is type TUint16*.

TInt aMaxLength The maximum length of the new modifiable pointer descriptor.

This value must be non-negative otherwise the constructor will panic with ETDes8MaxLengthNegative for the 8 bit variant or ETDes16MaxLengthNegative for the 16 bit variant.

TPtr( ) C++ constructor [with address, length and maximum length]

TPtr(TUint??* aBuf,TInt aLength,TInt aMaxLength);

Description

The C++ constructor is used to construct the TPtr with the address, length and maximum length.

Use this to construct a modifiable pointer descriptor using the supplied memory address, length and maximum length to initialise it.

The length of the constructed descriptor is set to aLength and its maximum length is set to aMaxLength.

The constructed descriptor is set to point to the memory address supplied in aBuf which can refer either to RAM or ROM.

Arguments

TUint??* aBuf The address which is to be the data area of the modifiable pointer descriptor.

For the 8 bit variant, this is type TUint8*; for the 16 bit variant, this is type TUint16*.

TInt aLength The length of the new modifiable pointer descriptor.

This value must be non-negative and not greater than the value of aMaxLength otherwise the constructor will panic with ETDes8LengthOutOfRange for the 8 bit variant or ETDes8LengthOutOfRange for 16 bit variant.

TInt aMaxLength The maximum length of the new modifiable pointer descriptor.

This value must be non-negative otherwise the constructor will panic with ETDes8MaxLengthNegative for the 8 bit variant or ETDes16MaxLengthNegative for 16 bit variant.

Late Initialisation e32.descriptors.TPtr.late-initialisation

Set( ) Initialisation by copying a TPtr void Set(TPtr& apt);

Use this function to initialise (or re-initialise) a modifiable pointer descriptor using the content of another modifiable pointer descriptor. The function behaves as a copy constructor.

The length of the descriptor is set to the length of aPtr and its maximum length is set to the maximum length of aPtr.

The descriptor is set (or re-set) to point to aPtr's data.

Arguments

TPtr& aPtr A reference to a modifiable pointer descriptor whose content is to be used to initialise this modifiable pointer descriptor.

Set( ) Initialisation taking address, length and maximum length void Set(TUint??* aBuf,TInt aLength,TInt aMaxLength);

Use this function to initialise (or re-initialise) a modifiable pointer descriptor using the supplied memory address, length and maximum length.

The length of the resulting descriptor is set to the value of aLength and its maximum length is set to the value of aMaxLength.

The descriptor is set (or re-set) to point to the memory address supplied in aBuf; the address can refer to RAM or ROM.

Arguments

TUint??* aBuf The address which is to be the data area of the modifiable pointer descriptor.

For the 8 bit variant, this is type TUint8*; for the 16 bit variant, this is type TUint16*.

TInt aLength The length of the modifiable pointer descriptor. This value must be non-negative and not greater than the value of aMaxLength otherwise the constructor will panic with ETDes8LengthOutOfRange for the 8 bit variant or ETDes16LengthOutOfRange for the 16 bit variant TInt aMaxLength The maximum length of the modifiable pointer descriptor. This value must be non-negative otherwise the constructor will panic with ETDes8MaxLengthNegative for the 8 bit variant or ETDes16MaxLengthNegative for the 16 bit variant Assignment Operators e32.descriptors.TPtr.assignment-operators See also e32.descriptors.TDes.assignment-operators.

operator= Operator=taking a TPtr

TPtr& operator=(const TPtr& aDes);

Description

This assignment operator copies a modifiable pointer descriptor to this modifiable pointer descriptor.

aDes's data is copied into this descriptor's data area, replacing the existing content. The length of this descriptor is set to the length of aDes.

Arguments const TPtr& aDes A reference to the modifiable pointer descriptor whose data is to be copied.

Return value

TPtr& A reference to this descriptor.

Notes

The length of aDes must not be greater than the maximum length of this descriptor otherwise the operation will panic with ETDes8Overflow for the 8 bit variant or ETDes16Overflow for the 16 bit variant operator= Operator=taking any descriptor TPtr& operator=(const TDesC& aDes);

Description

This assignment operator copies the content of any type of descriptor, aDes, to this modifiable pointer descriptor.

aDes's data is copied into this descriptor's data area, replacing the existing content. The length of this descriptor is set to the length of aDes.

Arguments const TDesC& aDes A reference to any type of descriptor whose data is to be copied.

Return value

TPtr& A reference to this descriptor.

Notes

The length of aDes must not be greater than the maximum length of this descriptor otherwise the operation will panic with ETDes8Overflow for the 8 bit variant or ETDes16Overflow for the 16 bit variant operator= Operator=taking a zero terminated string TPtr& operator=(const TText aString);

Description

This assignment operator copies a zero terminated string, excluding the zero terminator, into this modifiable pointer descriptor.

The copied string replaces the existing content of this descriptor.

The length of this descriptor is set to the length of the string (excluding the zero terminator).

Arguments const TText* aString The address of the zero terminated string to be copied.

Return value

TPtr& A reference to this descriptor.

Notes

The length of the string, excluding the zero terminator, must not be greater than the maximum length of this descriptor otherwise the operation will panic with ETDes8Overflow for the 8 bit variant or ETDes16Overflow for the 16 bit variant.

TBufC<TInt S> Class Constant Buffer Descriptor

Overview

Derivation

TDesC Abstract: implements descriptor behaviour which does not modify data.

TBufCBase Abstract: implementation convenience.

TBufC<TInt S> A constant buffer descriptor.

Defined in e32des8.h for the 8 bit variant (TBufC8<TInt S>).

e32des16.h for the 16 bit variant (TBufC16<TInt S>)

Description

Create a TBufC descriptor to provide a buffer of fixed length for containing and accessing constant data.

The data held in a TBufC descriptor cannot be modified, although it can be replaced.

Four constructors are available to build a TBufC descriptor and include a default constructor. The content of TBufC descriptor can be replaced after construction using the assignment operators.

For example, to create a buffer of length 16 set to contain the characters "ABC"

TBufC<16> str(_L("ABC"));

The content cannot be modified but may be replaced, for example:

str=_L("xyz"),

To create a buffer which is intended to contain general binary data, explicitly construct the 8 bit variant of TBufC; for example, to create a 256 byte buffer:

TBufC8<256> buf;

. . .

buf= . . . ;

All the member functions described under the TDesC class are available for use by a TBufC descriptor. In summary these are:

| | |
|---|---|
| Length( ) | Fetch length of descriptor data. |
| Size( ) | Fetch the number of bytes occupied by descriptor data. |
| Ptr( ) | Fetch address of descriptor data. |
| Compare( ), CompareF( ), CompareC( ) | Compare data (normally), (folded), (collated). |
| Match( ), MatchF( ), MatchC( ) | Pattern match data (normally), (folded), (collated). |
| Locate( ), LocateF( ) | Locate a character in forwards direction (normally), (folded). |
| LocateReverse( ), LocateReverseF( ) | Locate a character in reverse direction (normally), (folded). |
| Find( ), FindF( ), FindC | Find data (normally), (folded), (collated). |
| Left( ) | Construct TPtrC for leftmost part of data. |
| Right( ) | Construct TPtrC for rightmost part of data. |
| Mid( ) | Construct TPtrC for portion of data. |
| Alloc( ), AllocL( ), AllocLC( ) | Construct an HBufC for this descriptor. |
| HufEncode( ) | Huffman encode |
| HufDecode( ) | Huffman decode |
| operators < <= > >= == | Comparison operators |
| operator [ ] | Indexing operator |

Construction
  e32.descriptors.TBufC.construction
  TBufC( ) Default C++ constructor
  TfBufC( );
  Description
  The default C++ constructor is used construct a non-modifiable buffer descriptor.
  The integer template parameter<TInt S> is used, by the compiler, to calculate the size of the data area to be created as part of the descriptor object.
  The length of the constructed descriptor is set to zero.
  Notes
  Use the assignment operators to initialise the non-modifiable buffer descriptor.
  TBufC( ) Copy constructor
  TBuf(const TBufC<S>& aLcb);
  Description
  The C++ copy constructor constructs a new TBufC<S> object from the existing one.
  The integer template parameter <TInt S> is used, by the compiler, to calculate the size of the data area to be created as part of the constructed descriptor.
  aLcb's data is copied into the constructed descriptor's data area.
  The length of the constructed descriptor is set to the length of aLcb.
  TBufC( ) C++ constructor [with any descriptor]
  TBufC(const TDesC& aDes);
  Description
  The C++ constructor is used to construct the TBufC<S> with any kind of descriptor.
  The integer template parameter <TInt S> is used, by the compiler, to calculate the size of the data area to be created as part of the constructed descriptor.
  aDes's data is copied into the constructed descriptor's data area.
  The length of the constructed descriptor is set to the length of aDes.
  Arguments
const TDesC& aDes A reference to any type of descriptor used to construct the TBufC<S>.
  Notes
  The length of aDes must not be greater than the value of the integer template parameter <TInt S> otherwise the constructor will panic with ETDes8LengthOutOfRange for the 8 bit variant or ETDes16LengthOutOfRange for the 16 bit variant.
  TBufC( ) C++ constructor[with zero terminated string]
  TBufC(const TText* aString);
  Description
  The C++ constructor is used to construct the TBufC<S> with a zero terminated string.
  The integer template parameter <TInt S> is used, by the compiler, to calculate the size of the data area to be created as part of the constructed descriptor object.
  The string, excluding the zero terminator, is copied into the constructed descriptor's data area.
  The length of the constructed descriptor is set to the length of the string, excluding the zero terminator.
  Arguments
const TText* aString The address of the zero terminated string used to construct the TBufC<S>.
  Notes
  The length of the string, excluding the zero terminator, must not be greater than the value of the integer template parameter <TInt S> otherwise the constructor will panic with ETDes8LengthOutOfRange for the 8 bit variant or ETDes16LengthOutOfRange for the 16 bit variant.
  Create a Modifiable Pointer Descriptor
  e32.descriptors.TBufC.create-TPtr
  Des( ) Create & return a TPtr
  TPtr Des( );
  Description
  Use this function to construct and return a modifiable pointer descriptor to represent this descriptor.
  The content of a non-modifiable buffer descriptor cannot be altered but creating a modifiable pointer descriptor provides a mechanism for modifying that data.
  The length of the new TPtr is set to the length of this descriptor.
  The maximum length of the new TPtr is set to the value of the integer template parameter <TInt S>.
  The new TPtr is set to point to this descriptor. This descriptor's data is neither copied nor moved.
  This descriptor's data can be modified through the newly constructed TPtr. If there is any change to the length of the data, then the length of both this descriptor and the TPtr is modified to reflect that change.
  Return value
TPtr A modifiable pointer descriptor representing this non-modifiable buffer descriptor.
Assignment Operators
  e32.descriptors.TBufC.assignment-operators
  See also e32.descriptors.TDes.assignment-operators.
  operator= Operator=taking a TBufC<S>
  TBufC<S>& operator=(const TBufC<S>& aLcb);
  Description
  This assignment operator copies the content of the non-modifiable buffer descriptor aLcb into this non-modifiable buffer descriptor.
  aLcb's data is copied into this descriptor's data area, replacing the existing content. The length of this descriptor is set to the length of aLcb.
  Arguments
const TBufC<S>& aLcb A reference to a non-modifiable buffer descriptor whose content is to be copied.
  Return value
TBufC<S>& A reference to this descriptor.
  operator= Operator=taking any descriptor
  TBufC<S>& operator=(const TDesC& aDes);

Description

This assignment operator copies the content of any type of descriptor aDes into this non-modifiable buffer descriptor. aDes's data is copied into this descriptor's data area, replacing the existing content. The length of this descriptor is set to the length of aDes.

Arguments const TDesc& aDes A reference to any type of descriptor whose data is to be copied.

Return value

TBufC<S>& A reference to this descriptor.

Notes

The length of aDes must not be greater than the value of the integer template parameter <TInt S> otherwise the operation will panic with ETDes8Overflow for the 8 bit variant or ETDes16Overflow for the 16 bit variant operator=Operator=taking zero terminated string TBufC<S>& operator=(const TText* aString);

Description

This assignment operator copies a zero terminated string, excluding the zero terminator, into this non-modifiable buffer descriptor.

The copied string replaces the existing content of this descriptor. The length of this descriptor is set to the length of the string, excluding the zero terminator.

Arguments const TText* aString The address of the zero terminated string to be copied.

Return value

TBufC<S>& A reference to this descriptor.

Notes

The length of the string, excluding the zero terminator, must not be greater than the value of the template parameter <TInt S> otherwise the operation will panic with ETDes8Overflow for the 8 bit variant or ETDes16Overflow for the 16 bit variant TBuf<TInt S> Class Modifiable Buffer Descriptor Overview Derivation TDesC Abstract: implements descriptor behaviour which does not modify data.

TDes Abstract: implements descriptor behaviour which can change data.

A modifiable buffer descriptor.

TBuf<TInt S>

Defined In e32des8.h for the 8 bit variant (TBuf<TInt S>).

e32des16.h for the 16 bit variant (TBuf<TInt S>).

Description

Create a TBuf descriptor to provide a buffer of fixed length for containing, accessing and manipulating data.

Five constructors are available to build a TBuf descriptor and include a default constructor.

The content of a TBuf descriptor can be replaced after construction using the assignment operators.

For example, to create a buffer of length 8 initially set to contain the characters "ABC"

TBuf<8> str(_L("ABC"));

The content of the buffer descriptor can be replaced provided the length of the new data does not exceed the value of the integer template parameter, for example:

str=_L("xyz"); //OK str=_L("rstuvwxyz"); //causes an exception

To create a buffer which is intended to contain general binary data, explicitly construct the 8 bit variant TBuf8, for example, to create a 256 byte buffer:

TBuf8<256> buf;

...

buf= . . . ;

All the member functions described under the TDesC and TDes classes are available for use by a TBuf descriptor. In summary these are:

| | |
|---|---|
| Length( ) | Fetch length of descriptor data. |
| Size( ) | Fetch the number of bytes occupied by descriptor data. |
| Ptr( ) | Fetch address of descriptor data. |
| Compare( ), CompareF( ), CompareC( ) | Compare data (normally), (folded), (collated). |
| Match( ), MatchF( ), MatchC( ) | Pattern match data (normally), (folded), (collated). |
| Locate( ), LocateF( ) | Locate a character in forwards direction (normally), (folded). |
| LocateReverse( ), LocateReverseF( ) | Locate a character in reverse direction (normally), (folded). |
| Find( ), FindF( ), FindC | Find data (normally), (folded), (collated). |
| Left( ) | Construct TPtrC for leftmost part of data. |
| Right( ) | Construct TPtrC for rightmost part of data. |
| Mid( ) | Construct TPtrC for portion of data. |
| Alloc( ), AllocL( ), AllocLC( ) | Construct an HBufC for this descriptor. |
| HufEncode( ) | Huffman encode |
| HufDecode( ) | Huffman decode |
| MaxLength( ) | Fetch maximum length of descriptor. |
| MaxSize( ) | Fetch maximum size of descriptor |
| SetLength( ) | Set length of descriptor data |
| Zero( ) | Set length of descriptor data to zero |
| SetMax( ) | Set length of descriptor data to the maximum value. |
| Swap( ) | Swap data between two descriptors. |
| Copy( ), CopyF( ), CopyC( ) | Copy data (normally), (and fold), (and collate). |
| CopyLC( ) | Copy data and convert to lower case. |
| CopyUC( ) | Copy data and convert to upper case |
| CopyCP( ) | Copy data and capitalise |
| Repeat( ) | Copy and repeat. |
| Justify( ) | Copy and justify. |
| Insert( ) | Insert data. |
| Delete( ) | Delete data. |
| Replace( ) | Replace data. |
| TrimLeft( ) | Delete spaces from left side of data area. |
| TrimRight( ) | Delete spaces from right side of data area. |
| Trim( ) | Delete spaces from both left and right side of data area. |
| Fold( ) | Fold characters. |
| Collate( ) | Collate characters. |
| LowerCase( ) | Convert to lower case. |
| UpperCase( ) | Convert to upper case. |
| Capitalise( ) | Capitalise. |
| Fill( ) | Fill with specified character. |
| FillZ( ) | Fill with 0x00. |
| Num( ) | Convert numerics to character (hex digits to lower case). |
| NumUC( ) | Convert numerics to (upper case) character. |
| Format( ), FormatList( ) | Convert multiple arguments to character according to format specification. |
| Append( ) | Append data. |
| AppendFill( ) | Append with fill characters. |
| AppendJustify( ) | Append data and justify |
| AppendNum( ) | Append from converted numerics (hex digits to lower case). |
| AppendNumUC( ) | Append from converted numerics; convert to uppercase. |
| AppendFormat( ), AppendFormatList( ) | Append from converted multiple arguments. |
| ZeroTerminate( ) | Append zero terminator. |
| PtrZ( ) | Append zero terminator and return a pointer. |
| operators < <= > >= == | Comparison operators. |
| operator += | Appending operator. |
| operator [ ] | Indexing operator. |

Construction e32.descriptors.TBuf.construction

TBuf( ) Default C++ constructor

TBuf( );

Description

The default C++ constructor is used to construct a modifiable buffer descriptor.

The integer template parameter <TInt S> is used, by the compiler, to calculate the size of the data area to be created as part of the constructed descriptor.

The length of the constructed descriptor is set to zero and the maximum length is set to the value of the integer template parameter <TInt S>.

TBuf( ) C++ constructor[with length]

TBuf(TInt aLength);

Description

The C++ constructor is used to construct the TBuf<S> with the length.

The integer template parameter <TInt S> is used, by the compiler, to calculate the size of the data area to be created as part of the constructed descriptor.

The length of the constructed descriptor is set to aLength and the maximum length is set to the value of the integer template parameter <TInt S>.

Arguments

TInt aLength The length of the constructed modifiable buffer descriptor.

This value must be non-negative and not greater than the value of the integer template parameter <1Int S> otherwise the constructor will panic with ETDes8LengthOutOfRange for the 8 bit variant or ETDes16LengthOutOfRange for the 16 bit variant TBuf( ) Copy constructor TBuf(const TBuf<S>& aBuf);

Description

The C++ copy constructor constructs a new TBuf<S> object from the existing one.

The integer template parameter <TInt S> is used, by the compiler, to calculate the size of the data area to be created as part of the constructed descriptor object.

aBuf's data is copied into the constructed descriptor's data area.

The length of the constructed descriptor is set to the length of aBuf and the maximum length is set to the value of the integer template parameter <TInt S>.

TBuf( ) C++ constructor [with any descriptor]

TBuf(const TDesC& aDes);

Description

The C++ constructor is used to construct the TBuf<S> with any kind of descriptor.

The integer template parameter <TInt S> is used, by the compiler, to calculate the size of the data area to be created as part of the constructed descriptor.

aDes's data is copied into the constructed descriptor's data area.

The length of the constructed descriptor is set to the length of aDes and the maximum length is set to the value of the integer template parameter <TInt S>.

Arguments const TDesC& aDes A reference to any type of descriptor used to construct the TBuf<S>.

Notes

The length of aDes must not be greater than the value of the integer template parameter <TInt S> otherwise the constructor will panic with ETDes8Overflow for the 8 bit variant or ETDes16Overflow for the 16 bit variant TBuf( ) C++ constructor [with zero terminated string]

TBuf(const TText aString);

Description

The Cup constructor is used to construct the TBuf<S> with a zero terminated string.

The integer template parameter <TInt S> is used, by the compiler, to calculate the size of the data area to be created as part of the constructed descriptor.

The string, excluding the zero terminator, is copied into the constructed descriptor's data area.

The length of the constructed descriptor is set to the length of the string, excluding the zero terminator, and the maximum length is set to the value of the integer template parameter <TInt S>.

Arguments const Text* aString The address of the zero terminated string used to construct the TBuf<S>.

Notes

The length of the string, excluding the zero terminator must not be greater than the value of the integer template parameter <TInt S> otherwise the constructor will panic with ETDes8Overflow for the 8 bit variant or ETDes16Overflow for the 16 bit variant Assignment Operators e32.descriptors.TBuf.assignment-operators See also e32.descriptors.TDes.assignment-operators.

operator= Operator=taking a TBuf<S>

TBuf<S>& operator=(const TBuf<S>& aBuf);

Description

This assignment operator copies the content of the modifiable buffer descriptor aBuf into this modifiable buffer descriptor.

aBuf's data is copied into this descriptor's data area, replacing the existing content. The length of this descriptor is set to the length of aBuf.

Arguments const TBuf<S>& aBuf A reference to the modifiable pointer descriptor whose content is to be copied.

Return value

TBuf<S>& A reference to this descriptor.

Operator= Operator=taking any descriptor

TBuf<S>& operator=(const TDesC& aDes);

Description

This assignment operator copies the content of any type of descriptor aDes into this modifiable buffer descriptor.

aDes's data is copied into this descriptor's data area, replacing the existing content. The length of this descriptor is set to the length of aDes.

Arguments const TDesc& aDes A reference to any type of descriptor whose content is to be copied.

Return value

TBuf<S>& A reference to this descriptor.

Notes

The length of aDes must not be greater than the value of the integer template parameter <TInt S> otherwise the operation will panic with ETDes8Overflow for the 8 bit variant or ETDes16Overflow for the 16 bit variant operator= Operator=taking a zero terminated string TBuf<S>& operator=(const TText* aString);

Description

This assignment operator copies a zero terminated string, excluding the zero terminator, into this modifiable buffer descriptor.

The copied string replaces the existing content of this descriptor.

The length of this descriptor is set to the length of the string, excluding the zero terminator.

Arguments const TText* aString The address of the zero terminated string to be copied.

Return value

TBuf<S>& A reference to this descriptor.

Notes

The length of the string, excluding the zero terminator, must not be greater than the value of the template parameter <TInt S> otherwise the operation will panic with ETDes8Overflow for the 8 bit variant or ETDes16Overflow for the 16 bit variant

HBufC Class Heap Descriptor

Overview

Derivation

TDesC Abstract: implements descriptor behaviour which does not modify data.

TBufCBase Abstract: implementation convenience.

HBufC A heap descriptor.

Defined in e32des8.h for the 8 bit variant (HBufC8).

e32des16.h for the 16 bit variant (HBufC).

Description

Create an HBufC descriptor to provide a buffer of fixed length for containing and accessing data.

The data held in an HBufC descriptor cannot be modified, although it can be replaced using the assignment operators.

The descriptor exists only on the heap but has the important property that it can be resized, i.e. made either larger or smaller, to change the size of its data area. This is achieved by reallocating the descriptor. Unlike the behaviour of dynamic buffers (see e32.dynamic-buffers) reallocation is not done automatically.

An HBufC descriptor is useful in situations where a large fixed length buffer may be required initially but, thereafter, a smaller fixed length buffer is sufficient.

An HBufC descriptor must be constructed using the static member functions New( ), NewL( ) or NewLC( ) and resized using the ReAlloc( ) or ReAllocL( ) member functions. A code fragment illustrates how these might be used:

```
class CAnyClass: CBase
    {
public:
    void AddToBuf(const TDesC& aSrcBuf);
private:
    HBufC* iTgtBuf;
    TInt iAllocLen;
    }
void CAnyClass::AddToBuf(const TDesC& aSrcBuf)
    {
    TInt SrcLen = aSrcBuf.Length( );
    if(iTgtBuf)
        {
        if (SrcLen > iAllocLen)
            {
            iTgtBuf = iTgtBuf->ReAllocL(SrcLen);
            iAllocLen = SrcLen;
            }
        }
    else
        {
        iTgtBuf = HBufC::NewL(SrcLen);
        iAllocLen = SrcLen;
        }
    *iTgtBuf = aSrcBuf;
    }
```

In practice, the use of ReAlloc( ) here is a little inefficient as the data in the HBufC descriptor is saved across the re-allocation but is then discarded when the content of aSrcBuf is assigned to it.

All the member functions described under the TDesC class are available for use by a TBufC descriptor. In summary these are:

| | |
|---|---|
| Length( ) | Fetch length of descriptor data. |
| Size( ) | Fetch the number of bytes occupied by descriptor data. |
| Ptr( ) | Fetch address of descriptor data. |
| Compare( ), CompareF( ), CompareC( ) | Compare data (normally), (folded), (collated). |
| Match( ), MatchF( ), MatchC( ) | Pattern match data (normally), (folded), (collated). |
| Locate( ), LocateF( ) | Locate a character in forwards direction (normally), (folded). |
| LocateReverse( ), LocateReverseF( ) | Locate a character in reverse direction (normally), (folded). |
| Find( ), FindF( ), FindC | Find data (normally), (folded), (collated). |
| Left( ) | Construct TPtrC for leftmost part of data. |
| Right( ) | Construct TPtrC for rightmost part of data. |
| Mid( ) | Construct TPtrC for portion of data. |
| Alloc( ), AllocL( ), AllocLC( ) | Construct an HBufC for this descriptor. |
| HufEncode( ) | Huffman encode |
| HufDecode( ) | Huffman decode |
| operators < <= > >= == | Comparison operators |
| operator [ ] | Indexing operator |

Allocation and Construction e32.descriptors.HBufC.allocation-and-construction

New( ), NewL( ), NewLC( ) Create new HBufC e32.descriptors.new static HBufC* New(TInt aMaxLength);

static HBufC* NewL(TInt aMaxLength);

static HBufC* NewLC(TInt aMaxLength);

Description

Use these functions to construct a new HBufC descriptor on the heap.

The functions attempt to acquire a single cell large enough to hold an HBufC object containing a data area with a length which is at least aMaxLength. The resulting length of the data area may be larger than aMaxLength, depending on the way memory allocation is implemented, but is guaranteed to be not less than aMaxLength.

If there is insufficient memory available to create the descriptor, New( ) returns NULL but both NewL( ) and NewLC( ) leave. See e32.exception.intro for more information on leave processing.

If the new descriptor is successfully constructed, NewLC( ) will place the descriptor on the clean-up stack before returning with the address of that descriptor. See e32.exception.transient for more information on the clean-up stack.

The length of the new descriptor is set to zero.

Use operator= to assign data into the descriptor.

See example eudeshbc.

Arguments

TInt aMaxLength The required length of the new descriptor's data area.

This value must be non-negative otherwise the function will panic with ETDes8MaxLengthNegative for the 8 bit variant or ETDes16MaxLengthNegative for the 16 bit variant.

Return value

HBufC* The address of the newly created HBufC descriptor.

New( ) returns NULL, if there is insufficient memory.

NewL( ) and NewLC( ) leave, if there is insufficient memory.

Example

These code fragments illustrate how an HBufC descriptor can be constructed.

```
Use of New( );
    HBufC* ptr;
    ...
    ptr = HBufC::New(64);//buffer length is 64
    if (!ptr)
        {
        ...   // could not create the descriptor
        }
Use of NewL( ):
    ptr = HBufC::NewL(64);
    ...      // if control returns, allocation is OK
    ...      // and ptr has sensible value
```

NewL( ), NewLC( ) Create new HBufC from a stream
e32.descriptors.newfromstream
  static HBufC* NewL(RReadStream& aStream,TInt aMaxLength);
  static HBuf* NewLC(RReadStream& aStream,TInt aMaxLength);
  Description
  Use these functions to construct a new HBufC descriptor on the heap and to assign to this new descriptor, data held in the stream aStream.
  The functions attempt to acquire a single cell large enough to hold an HBufC object containing a data area whose length is sufficient to contain the data held in the stream. The stream contains both the length of the data and the data itself.
  If there is insufficient memory available to create the descriptor or the length value held in the stream is greater then aMaxLength, both NewL( ) and NewLC( ) leave. See e32.exception.intro for more information on leave processing.
  If the new descriptor is successfully constructed, NewLC( ) places the descriptor on the clean-up stack before returning with the address of that descriptor. See e32 exception.transient for more information on the clean-up stack.
  These functions assume that the stream is currently positioned at an appropriate place, i.e. a point where a descriptor has previously been streamed out (using the operator <<).
  See externalizing store.streams.externalizing.descriptors and internalizing store.stream.internalizinig.descriptors.
  For general information on streams see store.streams-basic and store.streams.
  For general information on stores, see store.stores.
  Arguments
RReadStream& aStream The stream from which the length of the new descriptor and the data to be assigned to the new descriptor, are to be taken.
TInt aMaxLength The maximum permitted length of the new descriptor.
  The resulting length of the new descriptor must not exceed this value, otherwise the functions leave with a KErrOverflow.
  Return value
HBufC* The address of the newly created HBufC descriptor.
  Both NewL( ) and NewLC( ) leave, if there is insufficient memory or the resulting length exceeds the value of aMaxLength.
NewMax( ), NewMaxL( ), NewMaxLC( ) Create new HBufC and set length
  static HBuf* NewMax(TInt aMaxLength);
  static HBufC* NewMaxL(TInt aMaxLength);
  static HBufC* NewMaxLC(TInt aMaxLength);
  Description
  Use these functions to construct a new HBufC descriptor on the heap.
  The functions attempt to acquire a single cell large enough to hold an HBufC object containing a data area with a length which is at least aMaxLength. The resulting length of the data area may be larger than aMaxLength, depending on the way memory allocation is implemented, but is guaranteed to be not less than aMaxLength.
  If there is insufficient memory available to create the descriptor, NewMax( ) returns NULL but both NewMaxL( ) and NewMaxLC( ) leave. See e32 exception.intro for more information on leave processing.
  If the new descriptor is successfully constructed, NewMaxLC( ) will place the descriptor on the clean-up stack before returning with the address of that descriptor. See e32.exception.transient for more information on the clean-up stack.
  The length of the new descriptor is set to the value of aMaxLength.
  Use operator=to assign data into the descriptor.
  Arguments
TInt aMaxLength The required length of the new descriptor's data area and the length given to the descriptor.
  This value must be non-negative otherwise the function will panic with ETDes8MaxLengthNegative for the 8 bit variant or ETDes16MaxLengthNegative for the 16 bit variant.
  Return value
HBufC* The address of the newly created HBufC descriptor.
  NewMax( ) returns NULL, if there is insufficient memory.
  NewMaxL( ) and NewMaxLC( ) leave, if there is insufficient memory.
  Example
  See e32.descriptors.new for an example
Reallocation
e32.descriptors.HBufC.reallocation
  ReAlloc( ), ReAllocL( ) Expand/contract the HBufC buffer
  HBufC* ReAlloc(TInt aMaxLength);
  HBufC* ReAllocL(TInt aMaxLength);
  Description
  Use this function to expand or contract the data area of an existing HBufC descriptor. This is done by:
    constructing a new HBufC descriptor on the heap containing a data area of length aMaxLength
    copying the contents of the original descriptor into the new descriptor
    deleting the original descriptor
  The functions attempt to acquire a single cell large enough to hold an HBufC object containing a data area of length aMaxLength.
  If there is insufficient memory available to construct the new descriptor, ReAlloc( ) returns NULL but ReAllocL( ) leaves. In either case the original descriptor remains unchanged; see e32.exception.intro for more information on leave processing.
  If the new descriptor is successfully constructed, then the content of the original descriptor is copied into the new descriptor, the original descriptor is deleted and the address of the new descriptor is returned to the caller. The length of the re-allocated descriptor remains unchanged.
  Arguments
TInt aMaxLength The new length of the descriptor's data area.
  This value must be non-negative otherwise the function will panic with ETDes8MaxLengthNegative for the 8 bit variant or ETDes16MaxLengthNegative for the 16 bit variant
  This value must not be less than the length of the data in the original descriptor otherwise the function will panic with ETDes8ReAllocTooSmall for the 8 bit variant or ETDes16ReAllocTooSmall for the 8 bit variant Return value HBufC* The address of the expanded or contracted HBufC descriptor.

ReAlloc( ) returns NULL, if there is insufficient memory.

ReAllocL( ) leaves, if there is insufficient memory.

Notes

If re-allocation is successful, be aware that any pointers containing the address of the original HBufC descriptor are no longer valid. This also applies to the cleanup stack; care must be taken in the design and implementation of code when a pointer to an HBufC descriptor is placed on the cleanup stack and the descriptor is subsequently re-allocated.

Take particular care if using the Des( ) member function to create a TPtr descriptor. A TPtr descriptor created before re-allocating the HBufC descriptor, is not guaranteed to have a valid pointer after re-allocation. Any attempt to modify data using the TPtr after re-allocation may have undefined consequences.

Example

These code fragments illustrate how ReAlloc( ) can work.

HBufC* old;

HBufC* newgood;

HBufC* newbad;

. . .

old=HBufC::NewL(16); //buffer length is 16

*old=_L("abcdefghijkl"); //descriptor length is 12

. . .

newgood=old->ReAllocL(24); //first reallocation OK newbad=newgood->ReAllocL(8); //second reallocation panics After the first reallocation, newgood points to the re-allocated descriptor, old contains an invalid address. The second re-allocation panics because an attempt is being made to contract the data area to a length of 8 which is smaller than the original length of the descriptor.

Create a Modifiable Pointer Descriptor e32.descriptors.HBufC.create-TPtr

Des( ) Create & return a TPtr

TPtr Des( );

Description

Use this function to construct and return a modifiable pointer descriptor to represent this descriptor.

The content of a HBufC descriptor cannot be altered but creating a modifiable pointer descriptor provides a mechanism for modifying that data.

The length of the new TPtr is set to the length of this descriptor.

The maximum length of the new TPtr is set to the length of this descriptor's data area.

The new TPtr is set to point to this descriptor. This descriptor's data is neither copied nor moved.

This descriptor's data can be modified through the newly constructed TPtr. If there is any change to the length of the data, then the length of both this descriptor and the TPtr is modified to reflect that change.

Return value

TPtr A modifiable pointer descriptor representing this HBufC descriptor.

Notes

Take particular care if using ReAlloc( ) or ReallocL( ). A TPtr descriptor created before re-allocating the HBufC descriptor, is not guaranteed to have a valid pointer after re-allocation. Any attempt to modify data using the TPtr after re-allocation may have undefined consequences.

Assignment Operators e32.descriptors.HBufC.assignment-operators

See also e3?.descriptors.TDes.assignment-operators.

operator= Operator=taking HBufC descriptor

HBufC& operator=(const HBufC& aLcb);

Description

This assignment operator copies the content of the heap descriptor aLcb into this heap descriptor.

aLcb's data is copied into this descriptor's data area, replacing the existing content. The length of this descriptor is set to the length of aLcb.

Arguments const HBufC& aLcb A reference to the heap descriptor whose content is to be copied.

Return value

HBufC& A reference to this descriptor.

Notes

The length of the descriptor aLcb must not be greater than the length of this descriptor's data area otherwise the function will panic with ETDes8Overflow for the 8 bit variant or ETDes16Overflow for the 16 bit variant Operator= Operator=taking any descriptor HBufC& operator=(const TDesC& aDes);

Description

This assignment operator copies the content of any type of descriptor aDes into this heap descriptor.

aDes's data is copied into this descriptor's data area, replacing the existing content. The length of this descriptor is set to the length of aDes.

Arguments const TDesC& aDes A reference to any type of descriptor whose content is to be copied.

Return value

HBUfC& A reference to this descriptor.

Notes

The length of the descriptor aDes must not be greater than the length of this descriptor's data area otherwise the function will panic with ETDes8Overflow for the 8 bit variant or ETDes16Overflow for the 16 bit variant operator=Operator=taking zero terminated string HBuf& operator=(const TText* aString);

Description

This assignment operator copies a zero terminated string, excluding the zero terminator, into this heap descriptor.

The string, excluding the zero terminator, is copied into this descriptor's data area, replacing the existing content. The length of this descriptor is set to the length of the string, excluding the zero terminator.

Arguments const TText* aString The address of the zero terminated string to be copied.

Return value

HBufC& A reference to this descriptor.

Notes

The length of the string, excluding the zero terminator, must not be greater than the length of this descriptor's data area otherwise the function will panic with ETDes8Overflow for the 8 bit variant or ETDes16Overflow for the 16 bit variant.

TDesC Class

Overview

Derivation

TDesC Abstract: implements descriptor behaviour which does not modify data

Defined in e32des8.h for the 8 bit variant (TDesC8).

e32des16.h for the 16 bit variant (TDesc16)

Description

The class is abstract and cannot be constructed. It implements that aspect of descriptor behaviour which does not modify the descriptor's data.

All member functions described here are available to all derived descriptor classes.

Basic Information e32.descriptors.TDesC.basic-functions

Length( ) Fetch descriptor length

TInt Length( ) const;

Description

Use this member function to return the number of data items in the descriptor's data area.

For 8 bit descriptors, data is single-byte valued and the length has the same value as the number of bytes occupied by that data. For 16 bit descriptors, data is double-byte valued and the length value is half the number of bytes occupied by that data, For example, if a descriptor data area contains one ASCII text character, the returned length is one and it occupies one byte (and the Size( ) function returns one); if a data area contains one UNICODE text character, the returned length is also one but it occupies two bytes (and the Size( ) function returns two).

Return value

TInt The length of the data within the data area.

Size( ) Fetch the number of bytes occupied by data

TInt Size( ) const;

Use this member function to return the number of bytes occupied by data in the descriptor's data area. For 8 bit descriptors, this value is the same as the length of the data For 16 bit descriptors, this value is twice the length of the data.

Return value

TInt The number of bytes occupied by data within the descriptor's data area.

Ptr( ) Fetch address of descriptor's data area const TUint??* Ptr( ) const;

Description

Use this member function to return the address of the descriptor's data area. The address cannot be used to change the descriptor's data.

Return Value const TUint??* The address of the data area. For the 8 bit variant, this is type TUint8*; for the 16 bit variant, this is type TUint16*.

Notes

If the descriptor is used for strings, then the pointer can be regarded as a TText type and there is no need to distinguish between the 8 bit and 16 bit variants. If the descriptor is used for binary data then the pointer should be regarded as a TUint8 type.

Comparison e32.descriptors.TDesC.comparison

Compare( ), CompareF( ), CompareC( ) Compare data

TInt Compare(const TDesC& aDes) const;

TInt CompareF(const TDesC& aDes) const;

TInt CompareC(const TDesC& aDes) const;

Description

Use these functions to compare the content of this descriptor with the content of the descriptor aDes.

The comparison proceeds on a byte for byte basis in the 8 bit variant and on a double-byte for double-byte basis in the 16 bit variant.

The result of the comparison is based on the difference of the first bytes (or double-bytes) to disagree. Two descriptors are equal if they have the same length and content. Where two descriptors have different lengths and the shorter matches the first part of the longer, the shorter is considered to be less than the longer.

CompareF( ) takes the folded content of both descriptors for comparison while CompareC( ) takes the collated content of both descriptors for comparison. Compare( ) simply takes the content of both descriptors as they stand.

See e32.descriptors.folding for more information on folding and e32.descriptors.collating for more information on collating.

Compare( ) is useful for comparing both text and binary data. CompareF( ) is useful for making case-insensitive text comparisons.

Arguments const TDesC& aDes A reference to any type of descriptor whose content is to be compared with this descriptor's content.

Return value

TInt Positive, if this descriptor is greater than aDes.

Negative, if this descriptor is less than aDes.

Zero, if both descriptors have the same length and the their contents are the same.

Example

This code fragment illustrates the use of Compare( ).

TBufC<8> str(_L("abcd"));

...

str.Compare(_L("abcde")); //returns −ve str.Compare(_L("abc")); //returns +ve str.Compare(_L("abcd")); //returns zero str.Compare(_L("abcx")); //returns −ve Thus:

<"abcd" is less than "abode".

<"abed" is greater than "abc".

<"abed" is equal to "abcd".

<"abcd" is less than "abcx".

Pattern Matching e32.descriptors.TDesC.pattern-matching

Match( ), MatchF( ), MatchC( ) Pattern match data

TInt Match(const TDesC& aDes) const;

TInt MatchF(const TDesC& aDes) const;

TInt MatchC(const TDesC& aDes) const;

Description

Use these functions to compare the match pattern in aDes's data area against the content of this descriptor.

The match pattern can contain the wildcard characters '*' and '?', where '*' matches zero or more consecutive occurrences of any character and '?' matches a single occurrence of any character.

MatchF( ) takes the folded content of both descriptors for matching while MatchC( ) takes the collated content of both descriptors for matching. Match( ) simply takes the content of both descriptors as they stand.

See e32.descriptors.folding for more information on folding and e32.descriptors.collating for more information on collating.

Arguments const TDesC& aDes A reference to any type of descriptor whose data area contains the match pattern.

Return value

TInt If the content of this descriptor matches the pattern supplied in aDes's data area, then this is the length of the most significant portion (i.e. the leftmost part) of this data area an which matches the pattern.

If the content of this descriptor does not match the pattern supplied in aDes, KNotFound is returned.

Notes

To test for the existence of a pattern within a text string, the pattern must start and end with an '*'.

If the pattern terminates with an '*' wildcard character and the supplied string matches the pattern, then the value returned is the length of the string which matches the pattern up to but not including the final asterisk. This is illustrated in the examples below.

Example

This code fragment illustrates the use of Match( )

```
...
TBufC<32>str(_L("abcdefghijklmnopqrstuvwxyz"));
...
str.Match(_L("*ijk*"));      //returns -> 11
str.Match(_L("*i?k*"));      //    -> 11
str.Match(_L("ijk*"));       //    -> KNotFound
str.Match(_L("abcd"));       //    -> KNotFound
str.Match(_L("*i*mn*"));     //    -> 14
str.Match(_L("abcdef*"));    //    -> 6
str.Match(_L("*"));          //    -> 0
```

Locate a Character e32.descriptors.TDesC.locate-character

Locate( ), LocateF( ) Locate a character forwards

TInt Locate(TChar aChar) const;

TInt LocateF(TChar aChar) const;

Description.

Use these functions to find the first occurrence of a character within this descriptor. The search starts at the beginning (i.e. the left side) of the data area.

LocateF( ) takes the folded content of the descriptor and folds the supplied character before searching. This is useful in searching for a character in a case-insensitive manner.

See e32.descriptors.folding for more information on folding.

Arguments

TChar aChar The character to be found.

Return value

TInt If the character is found, this is the offset of its position from the beginning of the data area.

KNotFound is returned if the character is not found.

Example

This code fragment illustrates the use of Locate( ).

```
...
TBufC<8> str(_L("abcd"));
...
str.Locate('d'); //returns 3
str.Locate('a'); //returns 0
str.Locate('b'); // returns 1
str.Locate('x'); //returns KNotFound
```

LocateReverse( ), LocateReverseF( ) Locate a character in reverse

TInt LocateReverse(TChar aChar) coast;

TInt LocateReverseF(TChar aChar) const;

Description

Use these functions to find the first occurrence of a character within this descriptor, searching from the back (i.e. the right side) of the data area.

LocateReverseF( ) takes the folded content of the descriptor and folds the supplied character before searching. This is useful in searching for a character in a case-insensitive manner.

See e32.descriptors.folding for more information on folding.

Arguments

TChar aChar The character to be found.

Return value

TInt If the character is found, this is the offset of its position from beginning of data area.

KNotFound is returned if the character is-not found.

Find Data e32.descriptors.TDesC.find-data

Find( ), FindF( ), FindC( ) Find data (given by descriptor)

TInt Find(const TDesC& aDes) const;

TInt FindF(const TDesC &aDes) const;

TInt FindC(const TDesC &aDes) const;

Description

Use these functions to find the location, within this descriptor, of the data supplied in aDes's. The search starts at the beginning (i.e. the left side) of this descriptor's data area.

FindF( ) folds the content of both descriptors for the purposes of searching while FindC( ) collates the content. See e3?.descriptors.folding for more information on folding and e32.descriptors.collating for more information on collating.

While these functions are most useful in searching for the existence and location of a sub-string within a string, they can, nevertheless, be used on general binary data.

FindF( ) is useful in performing a case-independent search of a string for a sub-string;

FindC( ) is useful in searching a string for a sub-string on the basis of their collating sequence.

Arguments const TDesC& aDes A reference to any type of descriptor which contains the data sequence to be found within this descriptor.

Return value

TInt If the data is found, the offset of the starting position of the data from the beginning of this descriptor's data area.

KNotFound is returned if the data is not found.

Notes

If the descriptor aDes has zero length, then the returned value will be zero.

Example

This code fragment illustrates the use of Find( ).

```
...
TBufC<32>str(_L("abcdefghijklmnopqrstuvwxyz"));
...
str.Find(_L("abc"));         // returns 0
str.Find(_L("bcde"));        // returns 1
str.Find(_L("uvwxyz"));      // returns 20
str.Find(_L("0123"));        // returns KNotFound
str.Find(_L("abcdefghijklmnopqrstuvwxyz01")); // returns KNotFound
str.Find(_L("")) ;           // returns 0
...
```

Find( ), FindF( ), FindC( ) Find data (given by address and length)

TInt Find(const TUint??* aBuf,TInt aLen) const;

TInt FindF(const TUint??* aBuf,TInt aLen) const;

TInt FindC(const TUint??* aBuf,TInt aLen) const;

Description

Use these functions to find the location, within this descriptor, of the data of length aLen at address aBuf. The search starts at the beginning (i.e. the left side) of this descriptor's data area.

FindF( ) folds the content of both this descriptor and the data at aBuf for the purposes of searching, while FindC( )

collates the content. See e32.descriptors.folding for more information on folding and e.32.descriptors.collating for more information on collating.

While these functions are most useful in searching for the existence and location of a sub-string within a string, they can, nevertheless, be used on general binary data.

FindF( ) is useful in performing a case-independent search of a string for a sub-string;

FindC( ) is useful in searching a string for a sub-string on the basis of their collating sequence.

Arguments const TUint??* aBuf The address of the data sequence to be found within this descriptor.

For the 8 bit variant, this is type TUint8*; for the 16 bit variant, this is type TUint16*.

TInt aLen The length of the data sequence.

This value must be non-negative otherwise the function will panic with ETDes8LengthNegative for the 8 bit variant or ETDes16LengthNegative for the 16 bit variant.

Return value

TInt If the data is found, the offset of the starting position of the data from the beginning of this descriptor's data area. KNotFound is returned if the data is not found.

Notes

If aLen is zero, then the returned value will be zero.

Extraction e32.descriptors.TDesC.extraction

Left( ) Construct TPtrC for leftmost part of data

TPtrC Left(TInt aLength) const;

Description

Use this function to construct and return a constant pointer descriptor to represent the leftmost part of this descriptor's data.

Arguments

TInt aLength The length of data within this descriptor which the new descriptor is to represent.

This value must not be negative and must not be greater than the current length of this descriptor otherwise the function will panic with ETDes8PosOutOfRange for the 8 bit variant or ETDes16PosOutOfRange for the 16 bit variant.

Return value

TPtrC The constant pointer descriptor representing the leftmost part of this descriptor's data area.

Notes

No movement or copying of data takes place; the data represented by the returned descriptor occupies the same memory as the original.

Specifying a zero value for aLength will result in a descriptor which represents no data.

Example

The code fragments illustrate the use of Left( ).

```
...
TBufC<8>str(_L("abcdefg"));
...                   // returns a TPtrC descriptor
str.Left(4);          // representing the string
...                   // "abcd"
```

The result of this specific example can be visualised in a before (shown in FIG. 9) and after (shown in FIG. 10) fashion. The underlined text in the "after" diagram (FIG. 10) indicates the data represented by the returned descriptor.

Note that the result of the following calls to Left( ) will result in a panic.

```
...
TBufC<8>str(_L("abcdefg"));
...
str.Left(8);          // panic !!
str.Left(-1);         // panic !!
...
```

Right( ) Construct TPtrC for rightmost part of data

TPtrC Right(TInt aLength) const;

Description

Use this function to create and return a constant pointer descriptor to represent the rightmost part of this descriptor's data.

Arguments

TInt aLength The length of data within this descriptor which the new descriptor is to represent.

This value must not be negative and must not be greater than the current length of this descriptor otherwise the function will panic with ETDes8PosOutOfRange for the 8 bit variant or ETDes16PosOutOfRange for the 16 bit variant.

Return value

TPtrC The constant pointer descriptor representing the rightmost part of this descriptor's data area.

Notes

No movement or copying of data takes place; the data represented by the returned descriptor occupies the same memory as the original.

Specifying a zero value for aLength will result in a descriptor which represents no data.

Example

The code fragments illustrate the use of Right( ).

```
...
TBufC<8>str(_L("abcdefg"));
...                   // returns a TPtrC descriptor
str.Right(4);         // representing the string
...                   // "defg"
```

The result of this specific example can be visualised in a before (FIG. 11) and after (FIG. 12) fashion. The underlined text in the "after" diagram (FIG. 12) indicates the data represented by the returned descriptor.

Note that the result of the following calls to Right( ) will result in a panic.

```
...
TBufC<8>str(_L("abcdefg"));
...
str.Right(8);         // panic !!
str.Right(-1);        // panic !!
...
```

Mid( ) Construct TPtrC for portion of data

TPtrC Mid(TInt aPos) const;

TPtrC Mid(TInt aPos,TInt aLength) const;

Description

Use these functions to create and return a constant pointer descriptor to represent a portion of the data held in this descriptor.

The portion can be identified either by position alone or by position and length. If identified by position alone, the implied length is the length of data from the specified position to the end of the data in this descriptor.

Arguments

TInt aPos The starting position, within this descriptor, of the data to be represented by the new constant descriptor. The position is given relative to zero; i.e. a zero value implies the leftmost data position.

This value is subject to the constraints outlined below.

TInt aLength The length of data which the new descriptor is to represent.

This value is subject to the constraints outlined below.

If aPos alone is specified, then 0<=aPos<=length of this descriptor.

If aPos and aLength are specified, then 0<=(aPos+aLength)<=length of this descriptor.

If these limits are exceeded, then the functions will panic with ETDes8PosOutOfRange for the 8 bit variant or ETDes16PosOutOfRange for the 16 bit variant.

Return value

TPtrC The constant pointer descriptor representing the selected portion of this descriptor's data.

Notes

No movement or copying of data takes place; the data represented by the returned descriptor occupies the same memory as the original.

Specifying a value of aPos which has the same value as the length of the data, will result in a constant pointer descriptor which represents no data.

Example

The code fragments illustrate the use of Mid( ).

```
...
TBufC str(_L("abcdefg"));
...                    // returns TPtrC descriptors
                       // representing the strings . . .
str.Mid(0);            //"abcdefg"
str.Mid(1);            //"bcdefg"
str.Mid(6);            //"g"
str.Mid(3,3);          //"def"
str.Mid((0,7);         //"abcdefg"
...
str.Mid(8);            // Panics !!
str.Mid(3,5);          // Panics !!
...
```

Create a Heap Descriptor (HBufC)

e32.descriptors.TDesC.create-HBufC

Alloc( ), AllocL( ), AllocLC( ) Create new HBufC for this descriptor

HBufC* Alloc( ) const;

HBufC AllocL( ) const;

HBufC* AllocLC( ) const;

Description

Use these functions to allocate and construct a new HBufC descriptor on the heap and initialise it using the content of this descriptor.

The functions attempt to acquire a single cell large enough to hold an HBufC object containing a data area whose length is the same as the current length of this descriptor. The content of this descriptor is copied into the new HBufC descriptor.

If there is insufficient memory available to create the new HBufC descriptor, Alloc( ) returns NULL but both AllocL( ) and AllocLC( ) leave. See e32.exception.intro for more information or, leave processing.

If the new descriptor is successfully created, AllocLC( ) will place the new descriptor on the clean-up stack before returning with the address of that descriptor. See e32.exception.transient for more information on the clean-up stack.

Return value

HBufC* The address of the newly created HBufC descriptor. Alloc( ) returns NULL, if there is insufficient memory. AllocL( ) and AllocLC( ) leave, if there is insufficient memory.

Example

The code fragments illustrate the use of AllocL( ).

```
...
TBufC<16>str(_L("abcdefg"));
HBufC* ptr;
...
ptr = str.AllocL( );   // Returns address of new HBufC descriptor
                       // holding the string "abcdefg".
ptr.Length( );         // Returns the length 7
...
```

The result of this specific example can be visualised in a before (FIG. 13) and after (FIG. 14) fashion.

Huffman Encoding/Decoding e32.descriptors.TDesC.huffman-encoding-decoding

HufEncode( ) Huffman encode

TInt HufEncode(TDes& aDest) const;

TInt HufEncode(TDes& aDest,const TUint8* aHufBits) const;

Description

Use this function to Huffman encode the data in this descriptor and place the result into the descriptor aDest. The target descriptor must be a modifiable type; i.e. either a TPtr or TBuf.

The caller can supply a Huffman tree or use the built-in tree.

Arguments

TDes& aDest A reference to the modifiable descriptor which is to hold the result of encoding the data in this descriptor.

const TUint8* aHufBits If specified, the Huffman tree to be used for encoding.

This is of type TUint8* for both 8 bit and 16 bit descriptors.

If not supplied, the built-in Huffman tree is used.

Return value

TInt The total number of bits occupied by the encoded data.

HufDecode( ) Huffman decode void HufDecode(TDes &aDest) const;

void HufDecode(TDes &aDest,const TUint8 *aHufTree) const;

Description

Use this function to Huffman decode the data in this descriptor and place the result into the descriptor aDest. The target descriptor must be a modifiable type; i.e. either a TPtr or TBuf.

The caller can supply a Huffman tree or use the built-in tree.

Arguments

TDes& aDest A reference to the descriptor which is to hold the result of decoding the data in this descriptor.

const TUint8* aHufBits If specified, the Huffman tree to be used for decoding.

This is of type TUint8* for both 8 bit and 16 bit descriptors.

If not supplied, the built-in Huffman tree is used.

Comparison Operators e32.descriptors.TDesC.comparison-operators operators < <= > >= == != Comparison operators taking any descriptor TInt operator<(const TDesC& aDes) const;

TInt operator<=(const TDesC& aDes) const;

TInt operator>(const TDesC& aDes) const;
TInt operator>=(const TDesC& aDes) const;
TInt operator==(const TDesC& aDes) const;
TInt operator!=(const TDesC& aDes) const;
Description Use these operators to determine whether the content of this descriptor is:

3 less than less than or equal to greater than greater than or equal to equal to not equal to the content of aDes.

The comparison is implemented using the TDesC::Compare( ) member function. See this member function for more detail on the comparison process.

Arguments const TDesC& aDes A reference to the descriptor whose content is to be compared with the content of this descriptor.

Return value

TInt true or false

Example

This code fragment illustrates the use of Compare( ).

```
TBufC<8>str(_L("abcd"));
...
if (str == _L("abcde"))  // returns false
{
...
}
if (str < _L("abcx"))    // returns true
{
...
}
if (str > _L("abc"))     // returns true
{
...
}
```

Indexing Operator e32.descriptors.TDesC.indexing-operator operator [ ] operator [ ]

const TUint??& operator[ ](TInt anIndex) const;

Description

Use this operator to return a reference to a single data item within this descriptor (e.g. a text character). The data can be considered as an array of ASCII or UNICODE characters or as an array of bytes (or double-bytes) of binary data.

This operator allows the individual elements of the array to be accessed but not changed.

Arguments

TInt anIndex The index value indicating the position of the element within the data area. The index is given relative to zero; i.e. zero implies the leftmost data position. This value must be non-negative and less than the current length of the descriptor otherwise the operation will panic with ETDes8IndexOutOfRange for the 8 bit variant or ETDes16IndexOutOfRange for the 16 bit variant Return value const TUint??& A reference to the data at position anIndex. The data is of type TUint8& for 8 bit variants and of type TUint16& for 16 bit variants.

Example

The code fragments illustrates the use of operator[ ].

```
TBufC<8>str(_L("abcdefg"));
...
str[0];             // returns reference to 'a'
str[3];             // returns reference to 'd'
str[7];             // Panics !!
if (str[0] == 'a')  // ... compare returns True
{
...
}
if (str[6] == 'x')  // ... compare returns False
{
...
}
```

TDes Class

Overview

Derivation

TDesC Abstract: implements descriptor behaviour which does not modify data.

TDes Abstract: implements descriptor behaviour which can change data.

Defined in e32des8.h for the 8 bit variant (TDes8).

e32des16.h for the 16 bit variant (TDes16)

Description

The class is abstract and cannot be constructed. It implements that aspect of descriptor behaviour which modifies the descriptor's data.

All member functions described here are available to all derived descriptor classes.

Basic Functions e32.descriptors.TDes.basic-functions

MaxLength( ) Fetch maximum length of descriptor

TInt MaxLength( ) const;

Description

Use this function to return the maximum length of data that the descriptor's data area can hold.

For modifiable descriptors, the amount of data that a descriptor's data area can hold is variable; however, there is an upper limit and this limit is the value returned by the function.

For 8 bit descriptors, data is single-byte valued and the maximum length has the same value as the maximum size. For 16 bit descriptors, data is double-byte valued and the value of the maximum length is half the maximum size.

Return value

TInt The maximum length of data that the descriptor's data area can hold.

MaxSize( ) Fetch maximum size of descriptor

TInt MaxSize( ) const;

Description

Use this function to fetch the maximum size of the descriptor's data area, in bytes.

For 8 bit descriptors, data is single-byte and the maximum size is the same value as the maximum length.

For 16 bit descriptors, data is double-byte and the maximum size is twice the value of the maximum length.

Return value

TInt The maximum size of the descriptor's data area.

Change Length e32.descriptors.TDes.change-length

SetLength( ) Set length of data void SetLength(TInt aLength);

Description

Use this function to set the length of the descriptor to the value of aLength.

Arguments

TInt aLength The new length of the descriptor.

This value must be non-negative and must not be greater than the maximum length otherwise the function will panic with ETDes8Overflow for the 8 bit variant or ETDes16Overflow for the 16 bit variant Zero( ) Set length of data to zero void Zero( );

Description

Use this function to set the length of the descriptor to zero.

SetMax( ) Set length of data to maximum void SetMax( );

Description

Use this function to set the length of the descriptor to its maximum value.

Swap e32.descriptors.TDes.swap

Swap( ) Swap descriptor contents void Swap(TDes& aDes);

Description

Swap the contents of this descriptor with the contents of aDes. The lengths of both descriptors are also swapped to reflect the change of data.

Arguments

TDes& aDes A reference to the descriptor whose contents are to be swapped with the contents of this descriptor. This descriptor must be a modifiable type; i.e. either a TPtr or TBuf.

Notes

Each descriptor must be capable of accommodating the contents of the other descriptor. If the maximum length of a descriptor is smaller than the length of the other descriptor, then the function will panic with ETDes8Overflow for the 8 bit variant or ETDes16Overflow for the 16 bit variant Example The following code fragment illustrates the use of Swap( )

. . .

TBuf<8> buf1(_L("abcde"));

TBuf<8> buf2(_L("xyz"));

TBuf<16> buf3(_L("0123456789"));

. . .

buf1.Swap(buf2); //contents of buf1 and buf2 swapped OK buf1.Swap(buf3); //Panic!!

. . .

Copy e32.descriptors.TDes.copy

Copy( ) Copy (unmodified) from any 8 bit or 16 bit descriptor void Copy(const TDesC&& aDes);
void Copy(const TDesC& aDes);

Description

Use these functions to copy the content of any descriptor aDes into this descriptor. The copied data replaces the existing content of this descriptor.

The length of this descriptor is set to the length of aDes.

If this descriptor is the 8 bit variant, Copy( ) is overloaded so that it can take another 8 bit descriptor or a 16 bit descriptor as source.

If this descriptor is the 16 bit variant, Copy( ) is overloaded so that it can take an 8 bit descriptor or another 16 bit descriptor as source.

Thus:

an 8 bit descriptor can be copied to an 8 bit descriptor an 8 bit descriptor can be copied to a 16 bit descriptor a 16 bit descriptor can be copied to an 8 bit descriptor a 16 bit descriptor can be copied to a 16 bit descriptor In the case where a 16 bit descriptor is copied to an 8 bit descriptor, each double-byte is copied into the corresponding single byte where the value of the double-byte is less than decimal 256. A double-byte value of 256 or greater cannot be copied and the corresponding single byte is set to a value of decimal 1.

In practice, the most common situation is to copy either 8 bit to 8 bit or 16 bit to 16 bit.

Arguments const TDesC8& aDes A reference to any type of descriptor whose content is to be or copied into this descriptor.

const TDesC16& aDes

Notes

The length of the data in aDes cannot be greater than the maximum length of this descriptor otherwise the: function will panic with ETDes8Overflow for the 8 bit variant or ETDes16Overflow for the 16 bit variant.

Example

The code fragment illustrates the use of Copy( ).

```
. . .
TBuf<8>str;
. . .
str.Copy(_L"abcdefg");        // copies "abcdefg" to tmp
str.Length( );                // returns 7
str.MaxLength( );             // returns 8
. . .
str.Copy(_L"abc"),            // copies "abc" to tmp
str.Length( );                // returns 3
str.MaxLength( );             // returns 8
. . .
str.Copy(_L"abcdefghi");      // Panics !!
```

Copy( ) Copy from zero terminated string void Copy(const TText* aString);

Description

Use this function to copy a zero terminated string, excluding the zero terminator, into this descriptor replacing the existing content.

The length of this descriptor is set to the length of the string, excluding the zero terminator.

Arguments const TText* aString The address of the zero terminated string to be copied.

Notes

The length of the string, excluding the zero terminator, must not be greater than the maximum length of this descriptor otherwise the function will panic with ETDes8Overflow for the 8 bit variant or ETDes16Overflow for the 16 bit variant.

Copy( ) Copy from address void Copy(const TUint?? aBuf,TInt aLength);

Description

Use this function to copy data of length aLength from the memory location aBuf.

The length of this descriptor is set to the value of aLength.

Arguments const TUint??* aBuf The address of the data to be copied. For the 8 bit variant, this is type TUint8*; for the 16 bit variant, this is type TUint16*.

TInt aLength The length of the data to be copied.

This value must be non-negative and must not be greater than maximum length of this descriptor otherwise the function will panic with ETDes8Overflow for the 8 bit variant or ETDes16Overflow for the 16 bit variant.

CopyF( ), CopyC( ) Copy (and fold/collate) from any descriptor void CopyF(const TDesC& aDes);
    void CopyC(const TDesC& aDes);
    Description Use these functions to copy the content of aDesC into this descriptor, replacing the existing content.

The length of this descriptor is set to the length of aDes.

CopyF( ) folds the data before insertion into this descriptor and CopyC( ) collates the data before insertion. See e32.descriptors.folding for more information on folding and e32.descriptors.collating for more information on collating.

These functions are only of practical use for text data.
    Arguments const TDesC& aDes A reference to the descriptor whose content is to be copied into this descriptor.

Notes

The length of the data in aDes must not be greater than the maximum length of this descriptor otherwise the function will panic with ETDes8Overflow for the 8 bit variant or ETDes16Overflow for the 16 bit variant CopyLC( ), CopyUC( ), CopyCP( ) Copy (and change case) from any descriptor void CopyLC(const TDesC& aDes);
    void CopyUC(const TDesC& aDes);
    void CopyCP(const TDesC& aDes);
    Description Use these functions to copy the content of aDesC into this descriptor, replacing the existing content.

The length of this descriptor is set to the length of aDes.

Before copying data, CopyLC( ) converts characters to lower case, CopyUC( ) converts characters to upper case and CopyCP( ) capitalises text.

Capitalisation means the conversion of the first character in a string to upper case and converting all remaining characters to lower case.

Accented characters retain their accents.

These functions are only of practical use for string data.
    Arguments const TDesC& aDes A reference to any type of descriptor whose content is to be copied into this descriptor.

Notes

The length of the data in aDes must not be greater than the maximum length of this descriptor otherwise the function will panic with ETDes8Overflow for the 8 bit variant or ETDes16Overflow for the 16 bit variant Copy Repeat e32.descriptors.TDes.copy-repeat
    Repeat( ) Copy from descriptor and repeat
    void Repeat(const TDesC& aDes)
    Description Use this function to copy the content of the descriptor aDes, repeatedly into this descriptor.

The copies are concatenated together within this descriptor and replace any existing data.

Copying proceeds until this descriptor is filled up to its current length. If it cannot contain a whole number of copies of aDes, then the last copy within this descriptor is truncated.

Arguments const TDes& aDes A reference to any type of descriptor whose contents are to be repeatedly copied.

Example

The following code fragment illustrates the use of Repeat( ).

```
...
TBuf<8>tgt(8);            // length of tgt is the same as the
                          // maximum which is 8
...
                          // following strings generated in tgt
tgt.Repeat(_L("ab"));     // "abababab"
tgt.Repeat(_L("abc"));    // "abcabcab"
tgt.Repeat(_L("abcde"));  // "abcdeabc"
...
...                       // changing length to 7 has the
                          // following effect
tgt.SetLength(7);
tgt.Repeat(_L("ab"));     // "abababa"
tgt.Repeat(_L("abc"));    // "abcabca"
tgt.Repeat(_L("abcde"));  // "abcdeab"
```

Repeat( ) Copy from address and repeat void Repeat(const TUint??* aBuf,TInt aLength);
    Description Use this function to copy data of length aLength from the memory location aBuf, repeatedly into this descriptor. The copies are concatenated together within this descriptor and replace any existing data.

Copying proceeds until this descriptor is filled up to its current length. If it cannot contain a whole number of copies, then the last copy within this descriptor is truncated.

Arguments const TUint??* aBuf The address of the data to be repeatedly copied.

For the 8 bit variant, this is type TUint8*; for the 16 bit variant, this is type TUint16*.

TInt aLength The length of the data to be repeatedly copied. This value must be non-negative otherwise the function will panic with ETDes8LengthNegative for the 8 bit variant or ETDes16LengthNegative for the 16 bit variant.

Copy and Justify e32 descriptors.TDes.copy-justify
    Justify( ) Copy from descriptor and justify
    e32.descriptors.TDes.copy-justify.justify
    void Justify(const TDesC& aDes,TInt aWidth,TAlign anAlignment,TChar aFill);
    Description Use this function to copy the content of aDes into this descriptor, replacing the existing content. The target area is considered to be a field of width aWidth positioned at the beginning (i.e. the left hand side) of this descriptor's data area. The content of aDes is copied into the target area and aligned within it as dictated by the value of anAlignment.

If aWidth has the value KDefaultJustifyWidth, then the width of the target area (i.e. the value of aWidth) is re-set to the length of aDes.

If the length of aDes is smaller than the width of the target area, then any spare space within the target area is padded with the fill character aFill.

If the length of aDes is greater than the width of the target area, then the amount of data copied from aDes is limited to the value of aWidth.

Arguments const TDesC& aDes A reference to any type of descriptor whose content is to be copied.

TInt aWidth The width of the target area. This must be one of:

KDefaultJustifyWidth a non-negative value

If it has the value KDefaultjustifyWidth, then it is re-set to the length of aDes.

If the value is less than the length of aDes, then the amount of data copied from aDes into the target area is limited to aWidth.

TAlign anAlignment An enumeration which dictates the alignment of the data within the target area. See e32.enum.TAlign.

TChar aFill The fill character used to pad the target area.

Notes

If the width of the target area is greater than the maximum length of this descriptor, then the function will panic with ETDes8Overflow for the 8 bit variant or ETDes16Overflow for the 16 bit variant.

Do not set aWidth to a negative value (other than KDefaultjustifyWidth) as this may have unpredictable consequences.

Example

The following code fragments illustrate the use of Justify( ).

. . .

TBuf<16> tgt(_L("abc"));

tgt.Justify(_L("xyz"),8,ECenter,'@');

The descriptor tgt has a maximum length of 16 and initially holds the string "abc". After the call to Justify( ), the content of tgt changes to "@@xyz@@@" as illustrated at FIG. 15.

In this example, the content of the source descriptor is taken to form an 8 character field which replaces the original content of the descriptor tgt. The characters "xyz" are centred within the new field and padded on both sides with the fill character'@'.

Setting the alignment to ELeft would change the content of tgt to "xyz@@@@@ " while setting the alignment to ERight would change the content of tgt to "@@@@@xyz"In all three cases, the length of the descriptor tgt changes from 3 to 8.

TBuf<8> tgt(_L("abc"));

. . .

tgt.Justify(_L("xyz"),9,ECenter,'@');

This call to Justify( ) will panic because the resulting length of data in tgt would exceed the maximum length of tgt.

. . .

TBuf<16> tgt(_L("abc"));

. . .

tgt.Justify(_L("rstuvwxyz"),8,ECenter,'@');

In this call to Justify( ), the content of tgt changes to "rstuvwxy" as illustrated at FIG. 16.

Only eight of the nine characters in the source descriptor's data area are copied.

Insertion/Deletion e32.descriptors.TDes.insertion-deletion

Insert( ) Insert from descriptor void Insert(TInt aPos,const TDesC& aDes);

Description

Use this function to insert the content of aDes into this descriptor's data area at the specified position. The existing data at the specified position within this descriptor is moved to the right to make way for the inserted data.

The length of this descriptor is increased to reflect the increase in content.

Arguments

TInt aPos The offset within this descriptor's data area where the content of aDes is to be inserted. This value can range from zero to the length of this descriptor.

A value of zero means insert at the beginning of this descriptor's data area, while a value equal to the length of this descriptor means insert at the end (i.e. append).

aPos must not be negative and must not be greater than the length of this descriptor, otherwise the function will panic with ETDes8PosOutOfRange for the 8 bit variant or ETDes16PosOutOfRange for the 16 bit variant.

const TDesC& aDes A reference to any type of descriptor whose content is to be inserted into this descriptor.

The length of aDes plus the length of this descriptor must not exceed the maximum length of this descriptor otherwise the function will panic with ETDes8Overflow for the 8 bit variant or ETDes16Overflow for the 16 bit variant.

Example

The following code fragment illustrates the use of Insert( ).

```
. . .
TBuf<8>tgt(3);
TPtrC  src(_L("abc"));
. . .                       // generates the strings . . .
tgt = src;
tgt.Insert(0,_L("XYZ"));        // "XYZabc"
. . .
tgt = src;
tgt.Insert(1,_L("XYZ"));        // "aXYZbc"
. . .
tgt = src;
tgt.Insert(tgt.Length( ),_L("XYZ")); // "abcXYZ"
. . .
tgt = src;
tgt.Insert(tgt.Length( )+1,_L("XYZ")),// ----> Panic !!
. . .
tgt = src;
tgt.Insert(1,_L("WXYZ"));       // "aWXYZbc"
. . .
tgt = src;
tgt.Insert(1,_L("VWXYZ"));      // "aVWXYZbc"
. . .
tgt = src;
tgt.Insert(1,_L("UVWXYZ"));      // ----> Panic !!
. . .
```

Delete( ) Delete void Delete(TInt aPos,TInt aLength);

Description

Use this function to delete a portion of data of length aLength from this descriptor's data area, starting at position aPos.

The length of this descriptor is decreased to reflect the reduction in content.

Arguments

TInt aPos The offset within this descriptor's data area where deletion is to start. This value can range from zero to the length of this descriptor.

A value of zero means delete from the beginning of this descriptor's data area, while a value equal to the length of this descriptor means, in effect, that no data will be deleted.

aPos must not be negative and must not be greater than the length of this descriptor, otherwise the function will panic with ETDes8PosOutOfRange for the 8 bit variant or ETDes16PosOutOfRange for the 16 bit variant.

TInt aLength The length of data to be deleted from the descriptor.

If (aLength+aPos) is greater than the length of this descriptor, then the length of data deleted is (this descriptor length—aPos). In effect, the value of aLength is truncated.

Example
The following code fragment illustrates the use of Delete( ).

```
...
TBuf<8>tgt(4);
TBufC<4>src(_L("abcd"));
...                    // generates the strings
tgt = src;
tgt.Delete(0,1);       // "bcd"
...
tgt = src;
tgt.Delete(0,2);       // "cd"
...
tgt = src;
tgt.Delete(0,4);       // ""
...
tgt = src;
tgt.Delete(1,2);       // "ad"
...
tgt = src;
tgt.Delete(2,2);       // "ab"
...
tgt = src;
tgt.Delete(2,3);       // "ab"
...
tgt = src;
tgt.Delete(2,256);     // "ab"
...
tgt = src;
tgt.Delete(5,1);       // ----> Panics !!
...
tgt = src;
tgt.Delete(-1,1);      // ----> Panics !!
...
```

Replace( ) Replace
void Replace(TInt aPos,TInt aLength,const TDesC& aDes);
Description
Use this function to replace a portion of data of length aLength in this descriptor's data area, starting at position aPos, with the content of the descriptor aDes.

The length of aDes may be less than aLength, in which case the resulting length of this descriptor decreases.

The length of aDes may be greater than aLength, in which case the resulting length of this descriptor increases.

The length of this descriptor changes to reflect the changed content.

Arguments

TInt aPos The offset within this descriptor's data area where replacement is to start. This value can range from zero to the length of this descriptor.

A value of zero means replace at the beginning of this descriptor's data area aPos must not be negative and must not be greater than the length of this descriptor, otherwise the function panics with ETDes8PosOutOfRange for the 8 bit variant or ETDes16PosOutOfRange for the 16 bit variant.

TInt aLength The length of data in this descriptor which is to be replaced.

aLength must not be negative and (aLength+aPos) must not be greater than the current length of this descriptor, otherwise the function panics with ETDes8LengthOutOfRange for the 8 bit variant or ETDes16LengthOutOfRange for the 16 bit variant.

const TDesC& aDes A reference to any type of descriptor whose content is to replace the data of length aLength at position aPos in this descriptor.

The length of aDes must not be negative and must not exceed the maximum length of this descriptor otherwise the function panics with ETDes8RemoteLengthOutOfRange for the 8 bit variant or ETDes8RemoteLengthOutOfRange for the 16 bit variant.

The resulting length of this descriptor must not exceed the maximum length of this descriptor, otherwise the function panics with ETDes8Overflow for the 8 bit variant or ETDes16Overflow for the 16 bit variant.

Example
The following code fragment illustrates the use of Replace( ).

```
...
TBuf<8>tgt(4);
TBufC<4>src(_L("abcd"));
...                              // generates the strings
tgt = src;
tgt.Replace(0,1,_L("u"));        // "ubcd"
...
tgt = src;
tgt.Replace(0,1,_L("uv"));       // "uvbcd"
...
tgt = src;
tgt.Replace(0,1,_L("uvw"));      // "uvwbcd"
...
tgt = src;
tgt.Replace(0,1_L("uvwxyz"));//  ----> Panic !!
...
tgt = src;
tgt.Replace(1,2,_L("u"));        // "aud"
...
tgt = src;
tgt.Replace(1,2,_L(""));         // "ad"
...
tgt = src;
tgt.Replace(1,4,_L("uvw"));      // ----> Panics !!
...
tgt = src;
tgt.Replace(3,1,_L("uvw"));      // "abcuvw"
...
tgt = src;
tgt.Replace(4,0,_L("uvw"));      // "abcduvw"
...
```

Delete Leading and Trailing Spaces
e32.descriptors.TDes.delete-spaces
TrimLeft( ) Delete spaces from left side of descriptor
void TrimLeft( );
Description
Use this function to delete space characters from the left hand side of the descriptor's data area. The function deletes every space character, starting at the beginning, until it meets the first non-space character.

The length of the descriptor is reduced to reflect the loss of the space characters.

Example
The following code fragment illustrates the use of TrimLeft( ).

```
...
TBuf<8> str1(_L(" abcd "));    // generates the following strings
TBuf<8> str2(_L("a b "));      // in the descriptors str1 and str2
...
str1.Length( );                // returns 8
str1.TrimLeft( );              // "abcd "
str1.Length( );                // returns 6
...
str2.Length( );                // returns 5
str2.TrimLeft( );              // "ab "
str2.Length( );                // returns 4
...
```

TrimRight( ) Delete spaces from right side of descriptor
void TrimRight( )
Description
Use this function to delete space characters from the right hand side of the descriptor's data area. The function deletes every space character, starting at the end and moving towards the beginning, until it meets the first non-space character.

The length of the descriptor is reduced to reflect the loss of the space characters.

Example

The following code fragment illustrates the use of TrimRight( ).

```
...
TBuf<8> str1(_L(" abcd "));    // generates the following strings
TBuf<8> str2(_L("a b"));       // in the descriptors str1 and str2
...
    str1.Length( );            // returns 8
    str1.TrimRight( );         //" abcd"
    str1.Length( );            // returns 6
...
    str2.Length( );            // returns 5
    str2.TrimRight( );         // "a b"
    str2.Length( );            // returns 4
...
```

Trim( ) Delete spaces from both sides of descriptor void Trim( );

Use this function to delete space characters from both the left and the right hand sides of the descriptor's data area.

The function deletes every space character starting at the beginning until it meets the first non-space character and deletes every space character starting at the end and moving towards the beginning, until it meets the first non-space character.

The length of the descriptor is reduced to reflect the loss of the space characters.

Example

The following code fragment illustrates the use of Trim( ).

```
...
TBuf<8> str1(_L(" abcd "));    // generates the following strings
TBuf<8> str2(_L("a b"));       // in the descriptors str1 and str2
...
    str1.Length( );            // returns 8
    str1.Trim( );              //" abcd"
    str1.Length( );            // returns 4
...
    str2.Length( );            // returns 5
    str2.Trim( );              // "a b"
    str2.Length( );            // returns 3
...
```

Fold/Collate e32.descriptors.TDes.fold-collate

Fold( ). Fold void Fold( );

Description

Use this function to fold the content of this descriptor. See e32descriptors.folding for more information on folding.

Collate( ) Collate void Collate( );

Description

Use this function to collate the content of this descriptor. See e32:descriptors.collating for more information on collating.

Change Case e32.descriptors.TDes.change-case

LowerCase( ) Convert to lower case void LowerCase( );

Description

Use this function to convert the characters in this descriptor to lower case.

UpperCase( ) Convert to upper case void UpperCase( );

Description

Use this function to convert the characters of this descriptor to upper case.

Capitalise( ) Capitalise void Capitalise( );

Description

Use this unction to capitalise the content of this descriptor.

Capitalisation here means the conversion of the first character to upper case and the conversion of all remaining characters to lower case.

Example

The following code fragment illustrates the use of Capitalise( )

```
...
TBuf<24> tgt(_L("tHe CaT sAt On ThE mAt."));
...
tgt.Capitalise( ); // changes string to
// "The cat sat on the mat."
...
```

Filling e32.descriptors.TDes.filling

Fill( ) Fill with character void Fill(TChar aChar);

Description

Use this function to fill the this descriptor's data area with the character aChar, replacing any existing content.

The data area is filled from the beginning up to its current length. It is not filled to its maximum length.

The length of the descriptor remains unchanged.

Arguments

TChar aChar The character used to fill the descriptor's data area.

Fill( ) Fill with character up to specified length void Fill(TChar aChar,TInt aLength);

Description

Use this function to fill this descriptor's data area with aLength characters aChar, replacing any existing content.

The length of the descriptor is set to aLength.

Arguments

TChar aChar The character used to fill this descriptor's data area

TInt aLength The new length of the descriptor. This value must not be negative and must not be greater than the maximum length of this descriptor otherwise the function will panic with ETDes8Overflow for the 8 bit variant or ETDes16Overflow for the 16 bit variant.

FillZ( ) Fill with zeroes void FillZ( );

Description

Use this function to fill the this descriptor's data area with zeroes (i.e. 0x00 or 0x0000), replacing any existing content.

The descriptor's data area is filled from the beginning up to its current length. It is not filled up to its maximum length.

The length of the descriptor remains unchanged.

FillZ( ) Fill with zeroes up to specified length void FillZ(TInt aLength);

Description

Use this function to fill the this descriptor's data area with aLength zeroes (i.e. 0x00 or 0x0000), replacing any existing content.

The length of the descriptor is set to aLength.

Arguments

TInt aLength The new length of the descriptor. This value must not be negative and must not be greater than the maximum length of this descriptor otherwise the function will panic with ETDes8Overflow for the 8 bit variant or ETDes16Overflow for the 16 bit variant.

Integer Conversion e32.descriptors.TDes.integer-conversion

Num( ) Convert signed integer void Num(TInt aVal);

Description

Use this function to convert the signed integer aVal into a decimal character representation and place the resulting characters into this descriptor's data area, replacing any existing content. If the integer is negative, the character representation is prefixed by a minus sign.

Arguments

TInt aVal The value to be converted to decimal characters.

Example

The following code fragment illustrates the use of Num( ).

```
...
TBuf<16> tgt;              // generates the following strings
TInt numpos(176);          // in the descriptor tgt . . .
TInt numneg(-176);
...
tgt.Num(numpos);           // "176"
tgt.Num(numneg);           // "-176"
...
```

Num( ), NumUC( ) Convert unsigned integer e32.descriptors.TDes.integer-conversion.Numusi void Num(TUint aVal,TRadix aRadix=EDecimal);

void NumUC(TUint aVal,TRadix aRadix=EDecimal);

Description

Use these functions to convert the unsigned integer aVal into its corresponding character representation and place the resulting characters into this descriptor's data area, replacing any existing content.

Num( ) converts the hexadecimal characters 'a', 'b', 'c', 'd', 'e' and 'f' to lower case, while NumUC( ) converts them to upper case.

The choice of function is dependent on the needs of applications.

Arguments

TUint aVal The value to be converted to characters.

TRadix aRadix The number system representation for the unsigned integer. This is an enumeration; see e32.descriptors.TRadix.

If no value is supplied, then EDecimal is taken by default.

Example

The following code fragment illustrates the use of Num( ) and NumUC( ).

```
...
TBuf<16>tgt;                    // generates the following strings
TUint number(176);              // in the descriptor tgt . . .
...
tgt.Num(number,EBinary);        // "10101010"
tgt.Num(number,EOctol);         // "252"
tgt.Num(number,EDecimal);       // "176"
tgt.Num(number,EHex);           // "aa" <-NB hex value in lower case
tgt.NumUC(number,EHex);         // "AA" <-NB hex value in UPPER case
tgt.Num(number);                // "176" <-EDecimal taken as default
```

Real Number Conversion e32.descriptors.TDes.real-number-conversion

Num( ) Convert floating point number e32.descriptors.num-float

TInt Num(TReal aVal,const TRealFormat& aFormat);

Description

Use this function to convert the floating point number aVal into a character representation and place the resulting characters into this descriptor's data area, replacing any existing content.

The format of the character representation is dictated by aFormat, an object of type TRealFormat. See e32.class.TRealFormat for more information on the TRealFormat class.

Arguments

TReal aVal The floating point number to be converted. The value must be such that 1.0E-99<=|aVal|<=1.0E99.

Any value smaller than 1.0E-99 is assumed to be zero.

TRealFormat& aFormat A reference to a TRealFormat object which dictates the format of the conversion.

Return value

TInt If the conversion is successful, the length of the converted string.

If the conversion fails, a negative value indicating the cause of failure. The possible values and their meaning are as follows:

KErrArgument The length of the converted number is greater than the maximum length of this descriptor. In other words, there is insufficient space in this descriptor to hold the character representation.

KErrOverflow The number is too large to represent

KErrUnderflow The number is too small to represent

KErrGeneral The conversion cannot be completed; e.g. the value of the iWidth member of TRealFormat is too small.

Formatting e32.descriptors.TDes.formatting

Format( ) Convert multiple arguments e32.descriptors.format void Format(TRefByValue<const TDesC> aFmt, . . . );

Description

Use this function to insert formatted text into this descriptor, as controlled by the format string supplied in the descriptor aFmt and the argument list which follows it. Any existing content in this descriptor is discarded.

The format string contained in aFmt contains literal text, embedded with commands for converting the trailing list of arguments into text.

The embedded commands are character sequences prefixed with the '%' character. The literal text is simply copied into this descriptor unaltered while the '%' commands are used to convert successive arguments (which follow aFmt in the argument list).

The resulting stream of literal text and converted arguments is inserted into this descriptor. The syntax of the embedded commands follows one of the four general patterns shown below. Each bracketed item indicates a character or sequence of characters having a specific meaning.

A bracketed item within square brackets is optional.

%<type> where <type> is a character code which indicates how data is to be converted. The data is converted without padding and only occupies the space required.

%<width>[<prec>]<type> where <type> is a character code indicating how data is to be converted and <width> contains either numeric characters which directly define the size of the field to be occupied by the converted data or an '*' character.

An '*' indicates that the size of the field is taken from the next TUint value in the argument list. <prec> is optional and is only relevant when a real number is to be converted. If specified, <prec> must be a '.' character followed by an integer representing the precision of the real number, (i.e. the number of decimal places). If <prec> is omitted, the precision for the conversion of a real number defaults to KDefaultPrecision.

The converted data is right-aligned within the field; if it occupies fewer character positions than specified in <width>, it is padded to the left with blank characters.

If more than <width> characters are generated by the conversion, then the outcome depends on the value of <type>.

If type> is either e, E, f, or F, (the source data is a real number), the value of <width> is ignored and all the generated characters are accepted; however, the maximum number of characters generated can never exceed KMaxRealWidth.

If <type> is either g, or G, (the source data is a real number), the value of <Width> is ignored and all the generated characters are accepted; however, the maximum number of characters generated can never exceed KDefaultRealWidth.

If the source data is any other type, the converted data is truncated so that only <width> characters are taken.

%0<width> [<prec> ]<type> where <type> is a character code indicating how data is to be converted and <width> contains numeric characters which directly define the size of the field to be occupied by the converted data.

The converted data is right-aligned within this field; if it occupies fewer character positions than specified in <width>, it is padded to the left with '0' characters.

If more than <width> characters are generated by the conversion, then the outcome depends on the value of <type>.

If type> is either e, E, f, or F, (the source data is a real number), the value of <width> is ignored and all the generated characters are accepted; however, the maximum number of characters generated can never exceed KMaxRealWidth.

If <type> is either g, or G, (the source data is a real number), the value of <width> is ignored and all the generated characters are accepted; however, the maximum number of characters generated can never exceed KDefaultRealWidth.

If the source data is any other type, the converted data is truncated so that only <width> characters are taken.

<prec> is optional and is only relevant when a real number is to be converted.

If specified, <prec> must be a'.' character followed by an integer representing the precision of the real number, (i.e. the number of decimal places). If <prec> is omitted, the precision for the conversion of a real number defaults to KDefaultPrecision.

(Note: in this specific case, <width> cannot be a single '*' character. If it is necessary to take the width value from the argument list, use the more general pattern %<a><p> <width><type>).

%<a><p><width>[<prec>]<type> where <type> is a character code indicating how data is to be converted and <width> contains either numeric characters which directly define the size of the field to be occupied by the converted data or an '*' character. An '*' indicates that the size of the field is taken from the next TUint value in the argument list.

<prec> is optional and is only relevant when a real number is to be converted.

If specified, <prec> must be a '.' character followed by an integer representing the precision of the real number, (i.e. the number of decimal places). If <prec> is omitted, the precision for the conversion of a real number defaults to KDefaultPrecision.

The converted data is aligned within this field as defined by the value of <a> as follows:

+ right aligned
− left aligned
= centre aligned

If the converted data occupies fewer character positions than specified in <width>, it is padded with the pad character defined by <p>.

Note that a pad character of '*' is a special case. It indicates that the code value of the pad character is taken from the next TUint value in the argument list. The data for conversion is taken from the following argument.

Thus, to pad with asterisks, the code value of the asterisk character must be supplied through the argument list.

If more than <width> characters are generated by the conversion, then the outcome depends on the value of <type>.

If <type> is either e, E, f, or F, (the source data is a real number), the value of <width> is ignored and all the generated characters are accepted; however, the maximum number of characters generated can never exceed KMaxRealWidth.

If <type> is either g, or G, (the source data is a real number), the value of <Width> is ignored and all the generated characters are accepted; however, the maximum number of characters generated can never exceed KDefaultRealWidth.

If the source data is any other type, the converted data is truncated so that only <widths characters are taken.

The conversion of argument data is dictated by the value of <type> which consists of a single character. Note the case of the character as this is significant.

The possible values for <type> are as follows:

b Interpret the argument as a TUint and convert it to its binary character representation. This can be either upper or lower case.

o Interpret the argument as a TUint and convert it to its octal character representation. This can be either upper or lower case.

d Interpret the argument as a TInt and convert it to its signed decimal representation. This can be either upper or lower case.

If the value is negative, the representation will be prefixed by a minus sign.

e Interpret the argument as a TReal and convert it to exponent format representation (See e32.class.TRealFormat and e32.enum.TRealFormatType.)

(Note the lower case)

E Interpret the argument as a TReal96 and convert it to exponent format representation (See e32.class.TRealFormat and e32.enum.TRealFormatType).

(Note the upper case)

f Interpret the argument as a TReal and convert it to fixed format representation (See e32.class.TReal Format and e32.enum.TRealFormatType).

(Note the lower case)

F Interpret the argument as a TReal96 and convert it to fixed format representation (See e32.class.TRealFormat and e32.enum.TRealFormatType).

(Note the upper case)

g Interpret the argument as a TReal and convert it to either fixed or exponent format representation, whichever format can present the greater number of significant digits (See e32.class.TRealFormat and e32.enum.TRealFormatType).

(Note the lower case)

G Interpret the argument as a TReal96 and convert it to either fixed or exponent format representation, whichever format can present the greater number of significant digits (See e32.class.TRealFormat and e32.enum.TRealFormatType).

(Note the upper case)

u Interpret the argument as a TUint and convert it to its unsigned decimal representation. This can be either upper or lower case.

x Interpret the argument as a TUint and convert it to its hexadecimal representation. This can be either upper or lower case.

p Generate the required number of pad characters. No arguments are accessed.

This can be either upper or lower case.

c Interpret the argument as a TUint value and convert it to a single ASCH character value. This can be either upper or lower case.

s Interpret the argument as a zero terminated string. Copy the characters from the string but exclude the zero terminator.

(Note the lower case).

S Interpret the argument as the address of a descriptor and copy the characters from it.

(Note the upper case).

w Interpret the argument as a TUint and convert the value to a two byte binary numeric representation with the least significant byte first. The generated output is two bytes whether this descriptor is an 8 bit or a 16 bit variant.

(Note the lower case).

W Interpret the argument as a TUint and convert the value to a four byte binary numeric representation with the least significant byte first. The generated output is four bytes whether this descriptor is an 8 bit or a 16 bit variant.

(Note the upper case).

m Interpret the argument as a TUint and convert the value to a two byte binary numeric representation with the most significant byte first. The generated output is two bytes whether this descriptor is an 8 bit or a 16 bit variant.

(Note the lower case).

M Interpret the argument as a TUint and convert the value to a four byte binary numeric representation with the most significant byte first. The generated output is four bytes whether this descriptor is an 8 bit or a 16 bit variant.

(Note the upper case).

Arguments

TRefByValue<const TDesC> aFmt Any type of descriptor containing the format string. The TRefByValue is constructed from the aFmt.

... A variable number of arguments to be converted to text as dictated by the format string in aFmt.

Notes

Two successive '%' characters are interpreted as literal text and causes one '%' character to be generated.

Blank characters are interpreted as literal text.

Specifying a pad character of '*' is a special case. It indicates that the code value of the pad character is taken as the next TUint value from the argument list. Any data needed for conversion is taken from the following argument.

Thus, to use asterisks as a pad character, the code value of the asterisk character must be supplied in the argument list.

Using an '*' character for both <width> and <p> means that the width value and the pad character will be taken from the argument list. Note that the first '*' character will be interpreted as representing the width only if it is preceded by one of the alignment characters '+' '−' or '=' (i.e., if the command follows the fourth general pattern outlined above).

Specifying the command %p results in no characters being generated. To be useful, a width needs to specified; for example '%1p' or '%6p'.

If <prec> is specified when the data to be converted is not a real number, then it is ignored.

If any command has incorrect syntax, then the function will panic with ETDes8BadFormatDescriptor for the 8 bit variant or ETDes16BadFormatDescriptor for the 16 bit variant If the resulting length of text in this descriptor exceeds its maximum length, then the function will panic with ETDes8Overflow for the 8 bit variant or ETDes16Overflow for the 16 bit variant.

Example

The following code fragments illustrate the various possibilities of Format( ).

```
. . .
TBuf<256>tgt;
. . .
tgt.Format(_L("[%b %c %d %o %u %x]"),65,65,65,65,65,65);
. . .                //generates:
                    //[1000001 A 65 101 65 41].
tgt.Format(_L("[%04x]"),65;
. . .                //generates:
                    //[0041]
tgt.Format(_L("[%4x]"),65;
. . .                //generates:
                    //[   41]
                    //  note the use of blanks as
                    //  default fill characters
tgt.Format(_L("[%*x]"),4,65;
. . .                //generates:
                    //[  41]
                    //  width taken from the
                    //  argument list
tgt.Format(_L("[%+$4d.00 %S]"),65,&(_L("over")));
. . .                //generates:
                    //[$$65.00 over]
                    //  note that %ls can be
                    //  replaced by %S
```

-continued

```
tgt.Format(_L("[%+0*S]"),10,&(_L("fred")));
    ...            //generates:
                   //[000000fred]
tgt.Format(_L("[%=*6x]"),'*',65);
    ...            //generates:
                   //[41]
tgt.Format(_L("[%+**d]"),'.',10,(-65));
    ...            //generates:
                   //[ . . . -65]
tgt.Format(_L("[%-A4p]"),65);
    ...            //generates:
                   //[AAAA]
                   //    and makes no use of the
                   //    argument list
tgt.Format(_L("[%m]"),4660);
    ...            //generates:
                   //the character '['
                   //followed by a byte holding 0x12
                   //followed by a byte holding 0x34
                   //followed by the character ']'
tgt.Format(_L("[%M]"),4660);
    ...            //generates:
                   //the character '['
                   //followed by a byte holding 0x00
                   //followed by a byte holding 0x00
                   //followed by a byte holding 0x12
                   //followed by a byte holding 0x34
                   //followed by the character ']'
tgt.Format(_L("[%w]"),4660);
    ...            //generates:
                   //the character '['
                   //followed by a byte holding 0x34
                   //followed by a byte holding 0x12
                   //followed by the character ']'
tgt.Format(_L("[%W]"),4660);
    ...            //generates:
                   //the character '['
                   //followed by a byte holding 0x34
                   //followed by a byte holding 0x12
                   //followed by a byte holding 0x00
                   //followed by a byte holding 0x00
                   //followed by the character ']'
tgt.Format(_L("[%6.2e]"),3.4555);
    ...            //generates:
                   //[3.46E+00]
tgt.Format(_L("[%6.2f]"),3.4555);
    ...            //generates:
                   //[ 3.46]
tgt.Format(_L("[%6.2g]"),3.4555);
    ...            //generates:
                   //[3.4555]
```

FormatList( ) Convert multiple arguments
void FormatList(const TDesC& aFmt,VA_LIST aList);
Description
This function is equivalent to Format( ).
Arguments
const TDesC& aFmt A reference to any type of descriptor containing the format string.
VA_LIST aList A pointer to a variable number of arguments to be converted to text as dictated by the format string in aFmt.

Appending e32.descriptors.TDes.appending
Append( ) Append a character
void Append(TChar aChar);
Description
Use this function to add a character onto the end of the content of this descriptor.
The length of this descriptor is incremented by one.
Arguments
TChar aChar The character to be appended.
Notes
The length of this descriptor must be less than its maximum length. If the descriptor is already at its maximum length, any attempt to append another character will cause the function to panic with ETDes8Overflow for the 8 bit variant or ETDes16Overflow for the 16 bit variant.

Append( ) Append any descriptor
void Append(const TDesC& aDes);
Description
Use this function to append the content of aDes onto the end of the content of this descriptor.
The length of this descriptor is incremented by the length of aDes.
There is an extra overloaded variation of Append( ) so that, if this descriptor is the 8 bit variant, Append( ) can take the 16 bit variant of aDes as well as the expected 8 bit variant.
Thus:
an 8 bit descriptor can be appended onto an 8 bit descriptor
a 16 bit descriptor can be appended onto a 16 bit descriptor
a 16 bit descriptor can be appended onto an 8 bit descriptor.
In the case where a 16 bit descriptor is appended to an 8 bit descriptor, each double-byte is appended as a single byte where the value of the double-byte is less than decimal 256. A double-byte value of decimal 256 or greater cannot be appended as a single byte value and, in this case, the single byte is set to a value of decimal 1.
Arguments
const TDesC& aDes A reference to any type of descriptor whose content is to be appended.
Notes
The resulting length of this descriptor must not be greater than its maximum length otherwise the function will panic with ETDes8Overflow for the 8 bit variant or ETDes16Overflow for the 16 bit variant Append( ) Append from address
void Append(const TUint??* aBuf,TInt aLength);
Description
Use this function to append data of length aLength at address aBuf onto the end of the content of this descriptor.
The length of this descriptor is incremented by the value of aLength.
Arguments
const TUint??* aBuf The address of the data to be appended. For the 8 bit variant, this is type TUint8*; for the 16 bit variant, this is type TUint16*.
TInt aLength The length of the data to be appended.
Notes
The resulting length of this descriptor must not be greater than its maximum length otherwise the function will panic with ETDes8Overflow for the 8 bit variant or ETDes16Overflow for the 16 bit variant.
The value of aLength must be non-negative otherwise the results may be unpredictable.

AppendFill( ) Append with fill characters
void AppendFill(TChar aChar, TInt aLength);
Description
Use this function to add aLength characters aChar onto the end of any existing data in this descriptor.
Arguments
TChar aChar The fill character.
TInt aLength The number of fill characters to be appended.
Notes
The resulting length of this descriptor must not be greater than its maximum length otherwise the function will panic with ETDes8Overflow for the 8 bit variant or ETDes16Overflow for the 16 bit variant AppendJustify( ) Append any descriptor and justify
e32.descriptors.TDes.appending.appendjustify-anydesc
void AppendJustify(const TDesC& aDes,TInt aWidth,
TAlign anAlignment,TChar aFill);
Description Use this function to copy the content of aDes onto the end of the content of this descriptor.

The target area within this descriptor is considered to be an area of width aWidth, immediately following the existing data. The source data is copied into this target area and aligned within it as dictated by the value of anAlignment.

If aWidth has the value KDefaultJustifyWidth, then the width of the target area (i.e. the value of aWidth) is re-set to the value of aLength.

If aLength is smaller than the width of the target area, then any spare space within the target area is padded with the fill character aFill.

If aLength is greater than the width of the target area, then the amount of data copied from the location aString is limited to the value of aWidth.

Arguments const TDesC& aDes A reference to any type of descriptor whose content is to be copied.

TInt aWidth The width of the target area. This must be one of:

KDefaultJustifyWidth a non-negative value

If it has the value KDefaultJustifyWidth, then it is re-set to the length of aDes.

If the value is less than the length of aDes, then the amount of data copied from aDes into the target area is limited to this value.

TAlign anAlignment An enumeration which dictates the alignment of the data within the target area. See e32.enum.TAlign.

TChar aFill The fill character used to pad the target area.

Notes

If the width of the target area is greater than the maximum length of this descriptor, then the function will panic with ETDes8Overflow for the 8 bit variant or ETDes16Overflow for the 16 bit variant.

Do not set aWidth to a negative value (other than KDefaultJustifyWidth) as this may have unpredictable consequences.

Example

The following code fragments illustrate the use of AppendJustify( ).

. . .

TBuf<16> tgt(\_L("abc"));

tgt.AppendJustify(\_L("xyz"),8,ECenter,'@');

The descriptor tgt has a maximum length of 16 and initially holds the string "abc". After the call to AppendJustify( ), the content of tgt changes to "abc@@xyz@@@" as illustrated at FIG. 17.

In this example, the content of the source descriptor is taken to form an 8 character field which is appended to the content of the descriptor tgt. The characters "xyz" are centred within the new field and padded on both sides with the fill character '@'.

Setting the alignment to ELeft would change the content of tmp to "abcxyz@@@@@" while setting the alignment to ERight would change the content of tmp to "abc@@@@@xyz"

In all three cases, the length of the descriptor tgt changes from 3 to 11.

. . .

TBuf<16> tgt(\_L("abcdefghik"));

tgt.AppendJustify(\_L("0123456"),7,ECenter,'@');

This call to AppendJustify( ) will panic because the resulting length of tgt would exceed its maximum length.

AppendJustify( ) Append part of any descriptor and justify
e32.descriptors.TDes.appending.appendjustify-partdesc
void AppendJustify(const TDesC &Des,TInt aLength,
TInt aWidth,
TAlign anAlignment,TChar aFill);
Description Use this function to append data of length aLength from the descriptor aDes onto the end of the content of this descriptor.

The target area within this descriptor's data area is considered to be an area of width aWidth, immediately following the existing data. The source data is copied into this target area and aligned within it as dictated by the value of anAlignment.

If aWidth has the value KDefaultJustifyWidth, then the width of the target area (i.e. the value of aWidth) is re-set to the value of aLength.

If aLength is smaller than the width of the target area, then any spare space within the target area is padded with the fill character aFill.

If aLength is greater than the width of the target area, then the amount of data copied from aDes is limited to the value of aWidth.

Arguments coast TDesC& aDes A reference to any type of descriptor whose content is to be copied.

TInt aLength The length of data to be copied from the source descriptor aDes.

If this value is greater then the value of aWidth, then it is truncated to the value of aWidth.

TInt aWidth The width of the target area. This must be one of:

<KDefaultJustifyWidth

<a non-negative value

If it has the value KDefaultJustifyWidth, then it is re-set to the value of aLength.

If this value is less than aLength, then the amount of data copied from aDes is limited to aWidth.

TAlign anAlignment An enumeration which dictates the alignment of the data within the target area. See e32.enum.TAlign.

TChar aFill The fill character used to pad the target area.

Notes

If the width of the target area is greater than the maximum length of this descriptor, then the function will panic with ETDes8Overflow for the 8 bit variant or ETDes16Overflow for the 16 bit variant.

Do not set aWidth to a negative value (other than KDefaultJustifyWidth) as this may have unpredictable consequences.

Do not set aLength to a negative value as this may have unpredictable consequences.

Make sure that the value of aLength is not greater than the length of aDes otherwise unexpected data may be copied.

Example

The following code fragments illustrate the use of AppendJustify( ).

...

TBuf<16> tgt(_L("abc"));

tgt.AppendJustify(_L("xyz01234456789"),3,8,ECenter, '@');

The descriptor tgt has a maximum length of 16 and initially holds the string "abc". After the call AppendJustify( ), the content of tgt changes to "abc@@xyz@@@" as illustrated in FIG. 18.

In this example, the first three characters of _L"xyz0123456789" are taken to form an 8 character field which is appended to the existing content of the descriptor tgt. The characters "xyz" are centred within the new field and padded on both sides with the fill character '@'.

Setting the alignment to ELeft would change the content of tgt to "abcxyz@@@@@" while setting the alignment to ERight would change the content of tgt to "abc@@@@@xyz"

In all three cases, the length of the descriptor tgt changes from 3 to 11.

...

TBuf<16> tgt(_L("abc"));

tgt.AppendJustify(_L"0123456789",9,8,ECenter,'@');

In this example, the call to AppendJustify( ) changes the content of tgt to "abc01234567".

As the specified length is greater than the specified width, the length is truncated so that only eight characters are copied from the source descriptor.

...

TBuf<16> tgt(_L("abcdefghik"));

tgt.AppendJustify(_L"0123456789",3,7,ECenter,'@');

This call to AppendJustify( ) panics because the resulting length of tgt would exceed its maximum length.

AppendJustify( ) Append from address and justify
e32.descriptors.TDes.appending.appendjustify-fromadr
void AppendJustify(const TUint??* aString,TInt aLength, TInt aWidth,
  TAlign anAlignment,TChar aFill);
Description Use this function to append data of length aLength from the address aString onto the end of the content of this descriptor.

The target area within this descriptor's data area is considered to be an area of width aWidth, immediately following the existing data. The source data is copied into this target area and aligned within it as dictated by the value of anAlignment.

If aWidth has the value KDefaultJustifyWidth, then the width of the target area (i.e. the value of aWidth) is re-set to the value of aLength.

If aLength is smaller than the width of the target area, then any spare space within the target area is padded with the fill character aFill.

If aLength is greater than the width of the target area, then the amount of data copied from the location aString is limited to the value of aWidth.

Arguments
const TUint??* aBuf The address of the data to be copied and appended.
  For the 8 bit variant, this is type TUint8*; for the 16 bit variant, this is type TUint16*.
TInt aLength The length of data to be copied from the location aString.
  If this value is greater then the value of aWidth, then it is truncated to the value of aWidth.
TInt aWidth The width of the target area This must be one of:
  KDefaultJustifyWidth
  a non-negative value
  If it has the value KDefaultJustifyWidth, then it is re-set to the value of aLength.
  If this value is less than aLength, then the amount of data copied from the location aString is limited to aWidth.
TAlign anAlignment An enumeration which dictates the alignment of the data within the target area See e32.enum.TAlign.
TChar aFill The fill character used to pad the target area.
Notes If the width of the target area is greater than the maximum length of this descriptor, then the function will panic with ETDes8Overflow for the 8 bit variant or ETDes16Overflow for the 16 bit variant.

Do not set aWidth to a negative value (other than KDefaultJustifyWidth) as this may have unpredictable consequences.

Do not set aLength to a negative value as this may have unpredictable consequences.

AppendJustify( ) Append zero terminated string and justify
e32.descriptors.TDes.appending.appendjustify-zeroterm
void AppendJustify(const TText* aString,TInt aWidth,
  TAlign anAlignment,TChar aFill);
Description Use this function to append the zero terminated string, located at aString, onto the end of the content of this descriptor. The zero terminator is not copied.

The target area within this descriptor's data area is considered to be an area of width aWidth, immediately following the existing data. The zero terminated string is copied into this target area and aligned within it as dictated by the value of anAlignment.

If aWidth has the value KDefaultJustifyWidth, then the width of the target area (i.e. the value of aWidth) is re-set to the length of the zero terminated string, excluding the zero terminator.

If the length of the zero terminated string (excluding the zero terminator) is smaller than the width of the target area, then any spare space within the target area is padded with the fill character aFill.

If the length of the zero terminated string (excluding the zero terminator) is greater than the width of the target area, then the number of characters copied from aString is limited to the value of aWidth.

Arguments
const TText* aBuf The address of the zero terminated string to be copied and appended.
TInt aWidth The width of the target area. This must be one of:
  <KDefaultJustifyWidth
  <a non-negative value
  If it has the value KDefaultJustifyWidth, then it is re-set to the length of the zero terminated string (excluding the zero terminator).
  If this value is less than the length of the zero terminated string (excluding the zero terminator), then the number of characters copied from aString is limited to aWidth.
TAlign anAlignment An enumeration which dictates the alignment of the data within the target area. See e32.enum.TAlign.

TChar aFill The fill character used to pad the target area.

Notes

If the width of the target area is greater than the maximum length of this descriptor, then the function will panic with ETDes8Overflow for the 8 bit variant or ETDes16Overflow for the 16 bit variant.

Do not set aWidth to a negative value (other than KDefaultJustifyWidth) as this may have unpredictable consequences.

AppendNum( ) Append converted signed integer
void AppendNum(TInt aVal);

Arguments

TUint aVal The value to be converted to characters.

TRadix aRadix The number system representation for the unsigned integer. This is an enumeration; see e32.descriptors.TRadix.

If no value is supplied, then EDecimal is taken by default.

Example

The following code fragment illustrates the use of AppendNum( ) and AppendNumUC( ).

```
...
TBuf<16>tgt(_L("abc"));    // generates the following strings
TUint num(176);            // in the descriptor tgt . . .
...
tgt.AppendNum(num,EBinary);    // "abc 10101010"
tgt.AppendNum(nwn.EOctol);     // "abc252"
tgt.AppendNum(num,EDecimal);   // "abc176"
tgt.AppendNum(num,EHex);       // "abcaa" <-NB hex value in lower case
tgt.AppendNumUC(num,EHex);     // "abcAA" <-NB hex value in UPPER case
                               //   and current descriptor
                               //   content converted to
                               //   upper case.
tgt.AppendNum(num);            // "abc176"<-EDecimal taken as default
```

Description

Use this function to convert the signed integer aVal into a decimal character representation and append the resulting characters onto the end of the content of this descriptor. If the integer is negative, the character representation is prefixed by a minus sign.

Arguments

TUint aVal The value to be converted to decimal characters.

Example

The following code fragment illustrates the use of AppendNum( ).

```
...
TBuf<16>tgt(_L("abc"));    // generates the following strings
TInt numpos(176);          // in the descriptor tgt . . .
TInt numneg(-176);
...
tgt.AppendNum(numpos);     // "abc176"
tgt.AppendNum(numneg);     // "abc-176"
```

AppendNum( ), AppendNumUC( ) Append converted unsigned integer e32.descriptors.TDes.appending.Appendnumusi void AppeadNum(TUint aVal,TRadix aRadix=EDecimal);

void AppendNunUC(TUint aVal,TRadix aRadix=EDecimal);

Description

Use these functions to convert the unsigned integer aVal into its corresponding character representation and append the resulting characters onto the end of content of this descriptor.

AppendNum( ) converts the hexadecimal characters 'a', 'b', 'c', 'd', 'e' and 'f' to lower case.

AppendNumUC( ) converts the hexadecimal characters 'A', 'B', 'C', 'D', 'E' and 'F' to upper case.

AppendFormat( ) Append converted multiple arguments
e32.descriptors.TDes.appending.AppendFormat
void AppendFormat(TRefByValue<const TDesC> aFmt, . . . );
void AppendFormat(TRefByValue<const TDesC> aFmt, TDes??Overflow* aOverflowHandler,
. . . );

Description

Use this function to append formatted text into this descriptor, as controlled by the format string supplied in the descriptor aFmt and the argument list which follows it. The generated text is appended to any existing data within this descriptor.

The format string contained in aFmt contains literal text, embedded with commands for converting the trailing list of arguments into text.

See the e32.descriptors.format member function for the syntax of the embedded commands.

The resulting length of this descriptor must not exceed its maximum length. Once the descriptor reaches its maximum length, any attempt to append more text will result in one of the following:

if aOverflowHandler is not supplied, the function panics with ETDes8Overflow for the 8 bit variant or ETDes16Overflow for the 16 bit variant.

if aOverflowHandler is supplied, the Overflow( ) member function of either TDes8Overflow for the 8 bit variant or TDes16Overflow for the 16 bit variant, is called to handle the condition; On return from Overflow( ), AppendFormat( ) completes without panic.

Arguments

TRefByValue<const TDesC> aFmt Any type of descriptor containing the format string. The TRefByValue is constructed from the aFmt.

TDes??Overflow* aOverflowHandler If supplied, a pointer to either a TDes8Overflow object (for the 8 bit variant) or a TDes16Overflow object (for the 16 bit variant). aOverflowHandler->Overflow( ) is called if an attempt is made to exceed the maximum length of this descriptor.

A variable number of arguments to be converted to text as dictated by the format string in aFmt.

AppendFormatList( ) Append converted multiple arguments e32.descriptors.TDes.appending.AppendFormatList void AppendFormatList(const TDesC& aFmt, VA_LIST aList, TDes??Overflow* aOverflowHandler=NULL);

Description

This function is equivalent to AppendFormat( ).

Arguments const TDesC& aFmt A reference to any type of descriptor containing the format string.

VA_LIST aList A pointer to a variable number of arguments to be converted to text as dictated by the format string in aFmt.

TDes??Overflow* aOverflowHandler If supplied, a pointer to either a TDes8Overflow object (for the 8 bit variant) or a TDes16Overflow object (for the 16 bit variant). aOverflowHandler->Overflow( ) is called if an attempt is made to exceed the maximum length of this descriptor.

AppendNum( ) Append converted floating point number e32.descriptors.appendnum-float TInt AppendNum(TReal aVal,const TRealFormat& aFormat);

Description

Use this function to convert the floating point number aVal into a character representation and append the resulting characters onto the end of the content of this descriptor.

The format of the character representation is dictated by aFormat, an object of type TRealFormat. See e32.class.TRealFormat for more information on the TRealFormat class.

Arguments

TReal aVal The floating point number to be converted. The value must be such that $1.0E-99<=|aVal|<=1.0E99$.

Any value smaller than 1.0E-99 is assumed to be zero.

TRealFormat& aFormat A reference to a TRealFormat object which dictates the format of the conversion.

Return value

TInt If the conversion is successful, the length of the converted string.

If the conversion fails, a negative value indicating the cause of failure. The possible values and their meaning are as follows:

KErrArgument The length of the converted number is greater than the maximum length of this descriptor. In other words, there is insufficient space in this descriptor to bold the character representation.

KErrOverflow The number is too large to represent

KErrUnderflow The number is too small to represent

KErrGeneral The conversion cannot be completed; e.g. the value of the iWidth member of TRealFormat is too small.

Add Zero Terminator e32.descriptors.TDes.zero-terminator

ZeroTerminate( ) Append zero terminator void ZeroTerminate( );

Description

Use this function to append a zero terminator (i.e. a NULL) onto the end of the content of this descriptor.

The length of the descriptor is not changed.

Notes

The length of the descriptor must be strictly less than its maximum length otherwise the function will panic with ETDes8Overflow for the 8 bit variant or ETDes16Overflow for the 16 bit variant. This condition guarantees that there is sufficient space in the descriptor's data area for the zero terminator.

Example

The following code fragment depited in FIG. 19 illustrates the use of ZeroTerminate( ).

. . .

TBufC<8> str(_L("abcd"));

. . .

tgt.ZeroTerminate( )

. . .

The length of the descriptor tgt is 5 both before and after the call to ZeroTerminate( )

PtrZ( ) Append zero terminator and return a pointer const TText PtrZ( );

Description

Use this function to append a zero terminator (i.e. a NULL) onto the end of the content of this descriptor and return a pointer to the descriptor's data area The length of the descriptor is not changed.

If the data area only contains text characters, then adding a zero terminator creates a 'C' style zero terminated string.

Return value const TText* A pointer to the zero terminated string

Notes

The length of the descriptor must be strictly less than its maximum length otherwise the function will panic with ETDes8Overflow for the 8 bit variant or ETDes16Overflow for the 16 bit variant. This condition guarantees that there is sufficient space in the descriptor's data area for the zero terminator.

The zero terminated string can be accessed through the returned pointer but cannot be changed.

Indexing Operators e32.descriptors.TDes.indexing-operators operator[ ] Operator[ ]

const TUint??& operator[ ](TInt anIndex) const;

TUint??& operator[ ](TInt anIndex);

Description

Use these operators to return a reference to a single data item within this descriptor (e.g. a text character). The data can be considered as an array of ASCII or UNICODE characters or as an array of bytes (or double-bytes, but not recommended) of binary data.

These operators allow the individual elements of the array to be accessed and changed.

Two variants of the operator are supplied so that it can return a lvalue when applied to a non-const argument or an rvalue when applied to a const argument. The decision as to which variant to use, is made by the compiler.

Arguments

TInt anIndex The index value indicating the position of the element within the data area. The index is given relative to zero; i.e. a zero value implies the leftmost data position. This value must be non-negative and less than the current length of the descriptor otherwise the operation will panic with ETDes8IndexOutOfRange for the 8 bit variant or ETDes16IndexOutOfRange for the 16 bit variant Return value TUint??& A non-const reference to the data at position anIndex. The data is of type TUint8& for 8 bit variants and of type TUint16& for 16 bit variants.

This is returned when the operator is used to return a lvalue.

const TUint??& A const reference to the data at position anIndex. The data is of type TUint8& for 8 bit variants and of type TUint16& for 16 bit variants.

This is returned when the operator is used to return an rvalue.

Example

The code fragments illustrates the use of operator[ ].

```
...
TBuf<8> str(_L("abcdefg"));
TChar ch;
...
str.Length( );        // returns 7
ch = str[0];          // ch contains the character 'a'
ch = str[3];          // ch contains the character 'd'
...
str[0] = 'z';         // changes str to "zbcdefg"
str[3] = 'z';         // changes str to "abczefg"
...
ch = str[7];          // Panic !!
str[7] = 'z';         // Panic !!
```

Appending Operators e32.descriptors.TDes.appending-operators operator+= Operator+=

TDes& operator+=(const TDesC& aDes);

Description

Use this operator to append the content of aDes onto the end of the content of this descriptor.

The length of this descriptor is incremented by the length of aDes.

Arguments const TDesC& aDes A reference to any type of descriptor whose content is to be appended.
Return value
TDes& A reference to this descriptor.
Notes The operator can only be used by classes derived from TDes, specifically TPtr and TBuf.

The resulting length of this descriptor must not be greater than its maximum length otherwise the operation will panic with ETDes8Overflow for the 8 bit variant or ETDes16Overflow for the 16 bit variant Example The following code fragment illustrates the use of this operator.

```
...
TBuf<16>tgt(_L("abc"));
...
tgt+=(_L("0123456789"));          // generates "abc0123456789"
tgt+=(_L("0123456789qwerty"));    // Panics !!
```

Non-class Specific Assignment Operators e32.descriptors.TDes.assignment-operators The behaviour of these operators is exactly the same as the class specific operators. However, unlike the class specific operators, these non-class specific operators are not inline.

The compiler invokes these non-class specific assignment operators whenever the left hand variable of an assignment operation is not of a concrete type i.e. one of TPtr, TBufC<class S>, TBuf<class S> or HBufC.

For example,

```
class TMyClass
  {
public:
  void MyCopy(TDes& aTarget, TDesC& aSource);
  }
  void TMyClass::MyCopy(TDes& aTarget, TDesC& aSource)
    {
    aTarget = aSource; // Non-class specific operator used.
    }
  {
  TBuf<16>target;
  TBuf<16>source(_L("ABCDEF"));
  TMyClass mine;
  mine.MyCopy(target,source);
```

If the member function MyCopy is changed so that it is prototyped as:

void MyCopy(TBuf<16>& aTarget, TDesC& aSource);

or even void MyCopy(TBuf<16>& aTarget, TBufC<16>& aSource);

then the TBuf<class S> class assignment operator would be used by the compiler.

However, such a change could compromise the design of the class TMyclass.

operator= Operator=taking any descriptor

TDes& operator=(const TDesC& aDes);

Description

This assignment operator copies the content of any type of descriptor aDes into this descriptor.

The content of aDes is copied into this descriptor, replacing the existing content. The length of this descriptor is set to the length of aDes.

Arguments const TDesC& aDes A reference to any type of descriptor whose content is to be copied.
Return value
TDes& A reference to this descriptor.
Notes This assignment operator returns a reference to type TDes, i.e. the base abstract class for modifiable descriptors.

The length of aDes must not be greater than the maximum length of this descriptor otherwise the operation will panic with ETDes8Overflow for the 8 bit variant or ETDes16Overflow for the 16 bit variant.

operator= Operator=taking a modifiable descriptor

TDes& operator=(const TDesC& aDes);

Description

This assignment operator copies the content of a modifiable descriptor aDes into this descriptor.

The content of aDes is copied into this descriptor, replacing the existing content. The length of this descriptor is set to the length of aDes.

Arguments const TDes& aDes A reference to a modifiable type descriptor whose content is to be copied.
Return value
TDes& A reference to this descriptor.
Notes This assignment operator returns a reference to type TDes, i.e. the base abstract class for modifiable descriptors.

The length of aDes must not be greater than the maximum length of this descriptor otherwise the operation will panic with ETDes8Overflow for the 8 bit variant or ETDes16Overflow for the 16 bit variant.

operator= Operator=taking zero terminated string
TDes& operator=(const TText* aString);
Description This assignment operator copies a zero terminated string, excluding the zero terminator, into this descriptor.

The copied string replaces the existing content of this descriptor.

The length of this descriptor is set to the length of the string (excluding the zero terminator).

Arguments const TText* aString The address of the zero terminated string to be copied.

Return value

TDes& A reference to this descriptor.

Notes

This assignment operator returns a reference to type TDes, i.e. the base abstract class for modifiable descriptors.

The length of aDes must not be greater than the maximum length of this descriptor otherwise the: operation will panic with ETDes8Overflow for the 8 bit variant or ETDes16Overflow for the 16 bit variant.

TDes8Overflow Class Overflow Handler (8 bit)

Overview

Derivation

TDes8Overflow Abstract: 8 bit variant overflow handler.

Defined in e32des8.h

Description

A TDes8Overflow derived object is used by the AppendFormat( ) and AppendFormatList( ) member functions of 8 bit variant descriptors to handle descriptor overflow.

Overflow occurs if an attempt is made to append text to the descriptor when the descriptor is already at its maximum length.

The class is abstract and defines the pure virtual member function Overflow( ).

See e32.descriptors.TDes.appending.AppendFormat and e32 descriptors.TDes.appending.AppendFormatList.

Writing derived classes

A derived class must provide an implementation for the Overflow( ) member function.

Overflow Handling

Overflow( ) Overflow handler function virtual void Overflow(TDes8& Des);

Description

A pure virtual function.

The function is called by the AppendFormat( ) and the AppendFormatList( ) member functions of an 8bit variant descriptor if an attempt is made to append text to this descriptor when the descriptor is already at its maximum length.

A derived class must provide an implementation for this function.

Arguments

TDes8& aDes A reference to the 8 bit variant modifiable descriptor whose overflow has resulted in the call to this function TDes16Overflow Class Overflow Handler (16 bit)

Overview

Derivation

TDes16Overflow Abstract: 16 bit variant overflow handler.

Defined in e32des16.h

Description

A TDes16Overflow derived object is used by the AppendFormat( ) and AppendFormatList( ) member functions of 16 bit variant descriptors to handle descriptor overflow.

Overflow occurs if an attempt is made to append text to the descriptor when the descriptor is already at its maximum length.

The class is abstract and defines the pure virtual member function Overflow( ).

See e32.descriptors.TDes.appending.AppendFormat and e32.descriptors.TDes.appending.AppendFormatList.

Writing derived classes

A derived class must provide an implementation for the Overflow( ) member function.

Overflow Handling

Overflow( ) Overflow handler function virtual void Overflow(TDes16& aDes);

Description

A pure virtual function.

The function is called by the AppendFormat( ) and the AppendFormatList( ) member functions of an 16 bit variant descriptor if an attempt is made to append text to this descriptor when the descriptor is already at its maximum length.

A derived class must provide an implementation for this function.

Arguments

TDes16& aDes A reference to the 16 bit variant modifiable descriptor whose overflow has resulted in the call to this function TRadix enum Number System Representation e32.descriptors.TRadix Defined in e32std.h Description An enumeration whose enumerators govern the number system representation of signed and unsigned integers when converting them into character format.

The enumeration is used by the descriptor member functions e32.descriptors.TDes.integer-conversion.Numusi and e32.descriptors.TDes.appending.Appendnumusi.

Members

| | |
|---|---|
| EBinary | Conversion into binary character representation. |
| EOctal | Conversion into octal character representation. |
| EDecimal | Conversion into decimal character representation. |
| EHex | Conversion into hexadecimal character representation |

TAlign enum Alignment of data

Defined in e32std.h

Description

An enumeration whose enumerators govern the alignment of data within an area. The enumeration is used by the descriptor member functions e32.descriptors.TDes.copy-justify.justify, e32.descriptors.TDes.appending.appendjustify-anydesc, e32.descriptors.TDes.appending.appendjustify-fromadr and e32.descriptors.TDes.appending.appendjustify-zeroterm.

Members

| | |
|---|---|
| ELeft | Data is left aligned. |
| ERight | Data is right aligned. |
| ECenter | Data is centered. |

\_S macro Build independent string
Defined in
e32def.h
Description
if defined(\_UNICODE)
typedef Text16 TText;
. . .
define \_S(a) ((const TText *)L ## a)
else
typedef TText8 TText;
. . .
define \_S(a) ((const TText *)a)
endif
Notes
The definition of \_S in e32std.def is intertwined with the definition of \_L.
\_L macro Build independent literal
Defined in
e32def.h
Description
if defined( UNICODE)
typedef TText16 TText;
define \_L(a) (TPtrC((const TText *)L ## a))
. . .
else
typedef TText8 TText;
define \_L(a) (TPtrC((const TText *)(a)))
. . .
endif
Notes
The definition of \_L in e32std.def is intertwined with the definition of \_S.
\_S8 macro 8 bit string
Defined in
e32def.h
Description
define \_S8(a) ((const TText8 *)a)
\_L8 macro 8 bit literal
Defined in
e32def.h
Description
define L8(a) (TPtrC8((const TText8 *)(a)))
\_S16 macro 16 bit string
Defined in
e32def.h
Description
define S 16(a) ((const TText 16 *)L #a)
\_L16 macro 16 bit literal
Defined in
e32def.h
Description
define \_L16(a) (TPtrC16((const TText16 *)L ## a))

Glossary definitions

| Term | Aliases | Meaning | See Also |
|---|---|---|---|
| built-in type | n | Data types which are part of the C++ language; e.g. unsigned int, unsigned char etc | |
| descriptor | n | An object capable of representing contiguous data and providing member functions to operate on that data. | |
| huffman encode | v | A process of compressing data. | |
| huffman decode | v | A process of decompressing data which was originally compressed using Huffman encoding. | |
| length | n | The length of data currently represented by a descriptor. | |
| maximum length | n | The maximum length of data which a modifiable type descriptor is capable of holding. | |
| fold | v | The removal of differences between characters that are deemed unimportant for the purposes of inexact or case-insensitive matching. As well as ignoring differences of case, folding ignores any accent on a character. | |
| collate | v | The removal of differences between characters that are deemed unimportant for the purposes of ordering characters into their collating sequence | |
| unicode | | ISO 10646-1 defines a "universal character code" which uses either 2 or 4 bytes to represent characters from a large character set. Thus, Far Eastern character sets can be represented. In ERA, 2-byte UNICODE support is built deep into the system. | |

What is claimed is:

1. A computing device programmed to manipulate or access objects of the string class using an object oriented operating system, wherein the objects of the string class are derived from a single base class and the operating system handles all such objects of the string class according to one or more of the following requirements:
   (a) objects of the string class for literal text are handled as belonging to a class in which a pointer points to the memory location where the text string is stored;
   (b) objects of the string class for length limited text are handled as belonging to a class in which a buffer stores text of a predetermined length requiring a limited subset of available memory management functions; and
   (c) objects of the string class using heap memory are handled as belonging to a class requiring the full set of available memory management functions.

2. The computing device of claim 1, further comprising a program which interfaces with the operating system and which also handles objects according to one or more of the requirements.

3. The computing device of claim 1, wherein objects satisfying one or more of the requirements are flat structures.

4. The computing device of claim 1, wherein objects of the string class for length limited text are stored in particular memory locations at run time which are not part of the heap memory.

5. The computing device of claim 1, wherein the objects are polymorphic.

6. The device of claim 5, wherein polymorphism is achieved by providing a data field for each object which identifies its class, with a different action being associated with different data field values.

7. The computing device of claim 6, wherein the data field is a part of the representation of another data item within a machine word.

8. The computing device of claim 7, wherein the same source code is used, irrespective of the character code system and character code width being used, by using aliases for class names that are character code independent.

9. The computing device of claim 8, wherein the source code using text strings is written in a manner independent of the strings' actual ASCII or Unicode implementation by using a system of aliases for class names.

10. The computing device of claim 1, wherein objects have information on the length of the data they contain and hence have no '0' terminator.

11. A method of allowing objects of the string class to be manipulated or accessed by a program using an object oriented operating system, wherein the program handles all such objects according to one or more of the following requirements:
 (a) objects of the string class for literal text are handled as belonging to a class in which a pointer points to the memory location where the text string is stored;
 (b) objects of the string class for length limited text are handled as belonging to a class in which a buffer stores text of a predetermined length requiring a limited subset of available memory management functions; and
 (c) objects of the string class using heap memory are handled as belonging to a class requiring the full set of available memory management functions.

12. The method of claim 11, being performed by an operating system.

13. The method of claim 11, being performed by a program which interfaces with an operating system which itself also performs the method of claim 11.

14. The method of claim 11, wherein objects satisfying one or more of the requirements are flat structures.

15. The method of claim 11, wherein objects of the string class for length limited text are stored in particular memory locations at run time which are not part of the heap memory.

16. The method of claim 11, wherein the objects are polymorphic.

17. The method of claim 16, wherein polymorphism is achieved by providing a data field for each object which identifies its class, with a different action being associated with different data field values.

18. The method of claim 17, wherein the data field is a part of the representation of another data item within a machine word.

19. The method of claim 18, wherein the same source code is used, irrespective of the character code system and character code width being used, by using aliases for class names that are character code independent.

20. The method of claim 19, wherein the source code using text strings is written in a manner independent of the strings' actual ASCII or Unicode implementation by using a system of aliases for class names.

21. The method of claim 11, wherein objects have information on the length of the data they contain and hence have no '0' terminator.

22. Computer software which allows objects of the string class to be manipulated or accessed by a program using an object oriented operating system, wherein the program handles all such objects according to one or more of the following requirements:
 (a) objects of the string class for literal text are handled as belonging to a class in which a pointer points to the memory location where the text string is stored;
 (b) objects of the string class for length limited text are handled as belonging to a class in which a buffer stores text of a predetermined length requiring a limited subset of available memory management functions; and
 (c) objects of the string class using heap memory are handled as belonging to a class requiring the fall set of available memory management functions.

23. The computer software of claim 22, being an object oriented operating system.

24. The computer software of claims 23, further comprising a program which is capable of interfacing with the object oriented operating system.

25. The computer software of claim 22, wherein in which objects satisfying one or more of the requirements are flat structures.

26. The computer software of claim 22, wherein objects of the string class for length limited text are stored in particular memory locations at run time which are not pat of the heap memory.

27. The computer software of claim 22, wherein the objects are polymorphic.

28. The computer software of claim 27, wherein polymorphism is achieved by providing a data field for each object which identifies its class, with a different action being associated with different data field values.

29. The computer software of claim 28, wherein the data field is a part of the representation of another data item within a machine word.

30. The computer software of claim 29, wherein the same source code is used, irrespective of the character code system and character code width being used, by using aliases for class names that are character code independent.

31. The computer software of claim 30, wherein the source code using text strings is written in a manner independent of the strings' actual ASCII or Unicode implementation by using a system of aliases for class names.

32. The computer software of claim 22, wherein objects have information on the length of the data they contain and hence have no '0' terminator.

\* \* \* \* \*